United States Patent
Roh et al.

(10) Patent No.: US 9,934,755 B2
(45) Date of Patent: Apr. 3, 2018

(54) DISPLAY DEVICE TO RESPOND TO A COMMAND TO DISPLAY A STILL IMAGE OR VIDEO IMAGE AND METHOD FOR CONTROLLING THE SAME

(71) Applicant: Samsung Electronics Co., Ltd., Suwon-si (KR)

(72) Inventors: Hee Yuel Roh, Suwon-si (KR); Joo Ho Kim, Suwon-si (KR); Sang Cheol Moon, Gwangjin-gu (KR); Eung Yeoul Yoon, Suwon-si (KR); Jun Sung Chung, Seongnam-si (KR); Jin Seung Choi, Suwon-si (KR); In Hak Na, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 14/546,427

(22) Filed: Nov. 18, 2014

(65) Prior Publication Data
US 2015/0138214 A1 May 21, 2015

Related U.S. Application Data

(60) Provisional application No. 61/975,224, filed on Apr. 4, 2014.

(30) Foreign Application Priority Data

| Nov. 18, 2013 | (KR) | 10-2013-0140206 |
| Feb. 11, 2014 | (KR) | 10-2014-0015314 |
| Aug. 22, 2014 | (KR) | 10-2014-0109563 |

(51) Int. Cl.
*G09G 5/00* (2006.01)
*G06F 1/16* (2006.01)
(Continued)

(52) U.S. Cl.
CPC .......... *G09G 5/006* (2013.01); *G02B 27/0101* (2013.01); *G06F 1/1647* (2013.01); *G06F 3/1431* (2013.01); *G09G 3/3406* (2013.01); *G09G 3/36* (2013.01); *G02F 2201/44* (2013.01); *G09G 2300/023* (2013.01); *G09G 2300/0456* (2013.01); *G09G 2320/0626* (2013.01); *G09G 2320/10* (2013.01); *G09G 2330/021* (2013.01); *G09G 2360/04* (2013.01); *G09G 2360/144* (2013.01)

(58) Field of Classification Search
None
See application file for complete search history.

(56) References Cited

U.S. PATENT DOCUMENTS

| 5,608,837 A | 3/1997 | Tai et al. |
| 2007/0176847 A1* | 8/2007 | Shah ............... G06F 1/1616 345/1.1 |

(Continued)

FOREIGN PATENT DOCUMENTS

| KR | 10-2010-0025890 | 3/2010 |
| KR | 10-0995777 | 11/2010 |
| KR | 10-2011-0136324 | 12/2011 |

OTHER PUBLICATIONS

International Search Report dated Jun. 10, 2015 in International Patent Application No. PCT/KR2014/011072.

(Continued)

*Primary Examiner* — Maurice L McDowell, Jr.
*Assistant Examiner* — Donna J Ricks
(74) *Attorney, Agent, or Firm* — Staas & Halsey LLP

(57) ABSTRACT

A display device which may operate as a reflective display device which uses external light without separate power supply at an illumination level equal to or greater than a certain illumination level, and which may operate as a transmissive display device which uses internal light at an illumination level less than the certain illumination level to provide a clear image in an outdoor environment and a dark indoor environment. Power consumption may be minimized by automatically switching the display mode depending on the illumination level.

13 Claims, 51 Drawing Sheets

(51) Int. Cl.
*G06F 3/14* (2006.01)
*G09G 3/34* (2006.01)
*G09G 3/36* (2006.01)
*G02B 27/01* (2006.01)

(56) References Cited

U.S. PATENT DOCUMENTS

| | | |
|---|---|---|
| 2007/0188439 A1 | 8/2007 | Kimura et al. |
| 2008/0007486 A1 | 1/2008 | Fujinawa et al. |
| 2008/0204356 A1 | 8/2008 | Shim et al. |
| 2010/0333006 A1 | 12/2010 | Ostergard et al. |
| 2011/0124376 A1 | 5/2011 | Kim et al. |
| 2011/0310073 A1* | 12/2011 | Nagata ............... G06F 3/1423 345/207 |
| 2013/0169512 A1* | 7/2013 | Yang .................. G09G 3/3208 345/5 |
| 2014/0002365 A1* | 1/2014 | Ackley ............... G09G 5/006 345/168 |

OTHER PUBLICATIONS

Extended European Search report dated Feb. 23, 2017 in corresponding European Application No. 14861196.5.

\* cited by examiner

310b

DISPLAY DEVICE TO RESPOND TO A COMMAND TO DISPLAY A STILL IMAGE OR VIDEO IMAGE AND METHOD FOR CONTROLLING THE SAME

CROSS-REFERENCE TO RELATED APPLICATIONS

This application claims the priority benefit of Korean Patent Application No. 10-2013-0140206, filed on Nov. 18, 2013, Korean Patent Application No. 10-2014-0015314, filed on Feb. 11, 2014, Korean Patent Application No. 10-2014-0109563, filed on Aug. 22, 2014, in the Korean Intellectual Property Office, and U.S. Patent Application No. 61/975,224, filed on Apr. 4, 2014 in the United States Patent and Trademark Office, the disclosures of which are incorporated herein in their entirety by reference.

BACKGROUND

1. Field

Embodiments relate to a display device capable of improving visibility and a method for controlling the same.

2. Description of the Related Art

Display devices display visual and stereoscopic image information.

Currently, flat display devices having low restrictions in installation space due to their small weights and sizes compared to cathode ray tubes, capable of implementing a large screen and a flat panel, and having excellent performance, for example, high image quality, have been developed.

Representative examples of the flat display devices include a liquid crystal display (LCD), an electro-luminescent display (ELD), an organic light emitting diode (OLED), a field emission display (FED), a plasma display panel (PDP), a thin film transistor (TFT)-LCD, and a flexible display.

The display devices may be categorized into transmissive display devices and reflective display devices.

A transmissive display device may include, for example, a backlight unit having a light source therein and thus externally emit light generated by the light source. A representative example of the transmissive display device is an LCD.

The LCD has a high response speed to display a video image, has a low afterimage effect, and is capable of displaying various colors. However, the LCD has a short battery life depending on display brightness and has a dark visibility in an outdoor environment compared to sunlight.

Specifically, a portable device used anywhere without restriction of location is mostly used in an environment having bright external light, e.g., sunlight. However, the visibility of a display device is greatly reduced.

To prevent a reduction in visibility of a display device under bright external light, the luminance of the display device should be increased. However, power consumption of a portable device is increased. Since the portable device requires low power consumption to remain portable, the above technology may not be easily used.

Furthermore, a transmissive display device such as an LCD or an OLED has structural restrictions in that a light source should always be driven to display an image, and thus may not easily achieve minimized power consumption and excellent visibility in an outdoor environment at the same time.

A reflective display device displays certain information by reflecting external light. The reflective display device is capable of displaying a clear and bright image by reflecting bright light such as sunlight in an outdoor environment, but has a low refresh rate, has an afterimage effect, has low visibility in low light conditions, and is not capable of displaying various colors.

SUMMARY

In an aspect of one or more embodiments, there is provided a display device to drive one of a first display panel and a second display panel based on an illumination level, and a method for controlling the same.

In an aspect of one or more embodiments, there is provided a display device to drive one of a first display panel and a second display panel based on content information, and a method for controlling the same.

In an aspect of one or more embodiments, there is provided a display device having flexibility and including a first display panel having a color panel with RGB color cells to display an image using external light, and a second display panel to display an image using internal light.

In an aspect of one or more embodiments, there is provided a display device to drive one of a first display panel and a second display panel based on a power saving mode, and a method for controlling the same.

In an aspect of one or more embodiments, there is provided a display device to display an image displayed on a first display panel on a second display panel based on a power saving mode, and a method for controlling the same.

In an aspect of one or more embodiments, there is provided a display device to display an image on one of a projective first display unit and a reflective second display unit based on a power saving mode, the type of image, and an illumination level, and a method for controlling the same.

In an aspect of one or more embodiments, there is provided a display device includes a first display panel to display an image using internal light, a second display panel to display an image using external light, and a controller to determine whether an image display command is a video image display command, and control the first display panel to display a video image if the image display command is a video image display command.

The display device may further include a detector to detect an illumination level, and the controller may control the second display panel to display a still image if the image display command is a still image display command, compare the illumination level detected by the detector, to a reference illumination level, control the first display panel to generate auxiliary light if the detected illumination level is less than the reference illumination level, and control the first display panel not to be driven if the detected illumination level is equal to or greater than the reference illumination level.

The still image may include at least one of a photograph and a text image.

The first display panel may be a transmissive display panel, and the second display panel may be a reflective display panel.

The display device may further include a detector to detect an illumination level, and the controller may compare the illumination level detected by the detector, to a reference illumination level if the image display command is a still image display command, control the first display panel to display a still image if the detected illumination level is less than the reference illumination level, and control the second display panel to display the still image if the detected illumination level is equal to or greater than the reference illumination level.

The second display panel may be disposed on the first display panel, and the controller may control the second display panel to be in a transparent state upon determining that the first display panel displays an image.

The controller may control the second display panel to be in a transparent state upon determining that the second display panel is disposed on the first display panel in an overlapping mode and the first display panel displays an image.

The controller may control the first display panel to display a video image and control the second display panel to display a still image if the first and second display panels are disposed in an extended mode to respectively display images and the image display command is a video image and still image display command.

When a still image is displayed, the controller may apply a voltage to the second display panel and cut off the voltage applied to the second display panel if a certain period of time has passed.

In an aspect of one or more embodiments, there is provided a display device includes a first display panel to display an image using internal light, a second display panel to display an image using external light, a detector to detect an illumination level, and a controller to compare the illumination level detected by the detector, to a reference illumination level, control the first display panel to display an image if the detected illumination level is less than the reference illumination level, and control the second display panel to display an image if the detected illumination level is equal to or greater than the reference illumination level.

The first display panel may be a transmissive display panel, and the second display panel may be a reflective display panel.

The second display panel may be disposed on the first display panel, and the controller may control the second display panel to be in a transparent state if the detected illumination level is less than the reference illumination level.

The controller may control the second display panel to be in a transparent state if the second display panel is disposed on the first display panel in an overlapping mode and the detected illumination level is less than the reference illumination level.

The controller may control the first display panel not to be driven if the detected illumination level is equal to or greater than the reference illumination level.

In an aspect of one or more embodiments, there is provided a display device includes a first display panel to display an image using internal light, a second display panel to display an image using external light, and a refractive index compensation layer disposed between the first and second display panels to compensate a refractive index between the first and second display panels.

The first display panel may be a transmissive display panel, and the second display panel may be a reflective display panel.

The second display panel may include a first substrate, a second substrate spaced apart from the first substrate by a certain distance, a first electrode disposed on the first substrate, a second electrode disposed on the second substrate, and a liquid crystal layer disposed between the first and second electrodes and having cholesteric liquid crystals.

The liquid crystal layer may include red, green, and blue sub-cells and barriers to define the sub-cells, in a single layer.

The first and second electrodes may be disposed to cross each other.

The display device may further include a light source, and a light guide plate to guide light generated by the light source, to the second display panel.

The second display panel may be disposed on the first display panel.

The second display panel may be movable to have a variable relative position with respect to the first display panel.

In an aspect of one or more embodiments, there is provided a method for controlling a display device including a first display panel to display an image using internal light, and a second display panel to display an image using external light, includes determining whether an image display command is input, determining the type of image to be displayed based on the input image display command, and displaying a video image on the first display panel if the determined type of image includes the video image.

The method may further include displaying a still image on the second display panel if the determined type of image includes the still image, detecting an illumination level, comparing the detected illumination level to a reference illumination level, controlling the first display panel to generate auxiliary light if the detected illumination level is less than the reference illumination level, and controlling the first display panel not to be driven if the detected illumination level is equal to or greater than the reference illumination level.

The image may be determined as the still image if the type of image to be displayed includes at least one of a photograph and a text image.

The method may further include controlling the second display panel to be in a transparent state if the determined type of image includes the video image.

The method may further include determining whether the second display panel is disposed on the first display panel.

The displaying of the still image may include applying a voltage to the second display panel and cutting off the voltage applied to the second display panel if a certain period of time has passed.

In an aspect of one or more embodiments, there is provided a method for controlling a display device including a first display panel to display an image using internal light, and a second display panel to display an image using external light, includes determining whether an image display command is input, detecting an illumination level and comparing the detected illumination level to a reference illumination level, displaying an image on the first display panel if the detected illumination level is less than the reference illumination level, and displaying an image on the second display panel if the detected illumination level is equal to or greater than the reference illumination level.

The displaying of the image on the first display panel may include controlling the second display panel to be in a transparent state.

The displaying of the image on the first display panel may include determining whether the second display panel is disposed on the first display panel, and controlling the second display panel to be in a transparent state if the second display panel is disposed on the first display panel.

The displaying of the image on the second display panel may include controlling the first display panel not to be driven.

The displaying of the image on the second display panel may include determining whether the first display panel is disposed under the second display panel, and controlling the first display panel not to be driven if the first display panel is disposed under the second display panel.

In an aspect of one or more embodiments, there is provided a method for controlling a display device including a transmissive display panel and a reflective display panel, includes determining the type of image to be displayed or an external illumination level, and selecting one of the transmissive and reflective display panels to display an image based on a determination result.

The determining of the type of image to be displayed may include determining whether the type of image to be displayed includes a video image, displaying the image on the transmissive display panel if the type of image includes the video image, and displaying the image on the reflective display panel if the type of image does not include the video image.

The determining of the external illumination level may include detecting the external illumination level and comparing the external illumination level to a reference illumination level, displaying the image on the transmissive display panel if the detected illumination level is less than the reference illumination level, and displaying the image on the reflective display panel if the detected illumination level is equal to or greater than the reference illumination level.

The displaying of the image on the transmissive display panel may include controlling the reflective display panel to be in a transparent state, and controlling the transmissive display panel to be not driven if the reflective display panel displays the image.

The method for controlling the display device may further include detecting a charge amount of a battery, comparing the detected charge amount of the battery to a reference battery charge amount, and controlling the second display panel to display an image if the detected charge amount of the battery is less than the reference battery charge amount.

The method for controlling the display device may further include detecting a charge amount of a battery, comparing the detected charge amount of the battery to a reference battery charge amount, controlling the first display panel to display icon images of a main menu only if the detected charge amount of the battery is less than the reference battery charge amount, and controlling the second display panel to display a background image deleted from the first display panel.

The method for controlling the display device may further include controlling the second display panel to display a received text message if the text message is received.

In an aspect of one or more embodiments, there is provided a display device includes a projective first display unit to display an image, a reflective second display unit to display an image by reflecting external light, and a controller to determine whether an image display command is a video image display command, control the first display panel to display a video image if the image display command is a video image display command, and control the second display panel to display a still image if the image display command is a still image display command.

The display device may further include a detector to detect an illumination level. The controller may compare the illumination level detected by the detector to a reference illumination level and control the first display unit to display an image if the detected illumination level is less than the reference illumination level.

The still image may include at least one of a photograph and a text image.

The display device may further include a battery to supply power to the first display unit and the second display unit and a detector to detect a charge amount of the battery. The controller may compare the charge amount of the battery to a reference battery charge amount and control the second display unit to display an image if the detected charge amount of the battery is less than the reference battery charge amount.

The display device may further include a glasses-shaped body. The first display unit may be included in the body, and the second display unit may be included in the body and installed to be separated from the first display unit.

The first display unit may include a micro display panel and the second display unit may include a reflective display panel. The micro display panel may be disposed adjacent to the reflective display panel.

When the second display unit displays an image, the controller may apply a voltage to the second display unit and cut off the voltage applied to the second display unit if a certain period of time has passed.

In an aspect of one or more embodiments, there is provided a display device includes a glasses-shaped body, a projective first display unit included in the body to display an image, a light guide unit disposed adjacent to the first display unit to guide light of the image displayed on the first display unit to the user's eyes, a reflective second display unit disposed adjacent to the light guide unit to display an image by reflecting external light, and a controller to determine whether an image display command is a video image display command, control the first display unit to display a video image if the image display command is a video image display command, and control the second display unit to display a still image if the image display command is a still image display command.

The first display unit may include a light source, an optical unit to generate an image based on the light source and an image signal.

In an aspect of one or more embodiments, there is provided a display device includes a projective first display unit to display an image, a reflective second display unit to display an image by reflecting external light, a detector to detect an illumination level, and a controller to compare the illumination level detected by the detector to a reference illumination level, control the first display unit to display an image if the detected illumination level is less than the reference illumination level, and control the second display unit to display an image if the detected illumination level is equal to or greater than the reference illumination level.

The controller may control the second display unit to be in a transparent state if the detected illumination level is less than the reference illumination level.

The controller may control the first display unit not to be driven if the detected illumination level is equal to or greater than the reference illumination level.

In an aspect of one or more embodiments, there is provided a display device includes a projective first display unit to display an image, a reflective second display unit to display an image by reflecting external light, a battery to supply a driving power to the first and second display units, a detector to detect the charge amount of the battery, and a controller to compare the charge amount of the battery to a reference battery charge amount, control the second display unit to display an image if the detected charge amount of the battery is less than the reference battery charge amount, and control the first display unit to display an image if the detected charge amount of the battery is equal to or greater than the reference battery charge amount.

In an aspect of one or more embodiments, there is provided a method for controlling a display device including a projective first display unit to display an image and a reflective second display unit to display an image by reflecting external light, includes determining whether an image display command is input, determining the type of image to be displayed based on the input image display command, controlling the first display unit to display a video image if the determined type of image includes a video image, and controlling the second display unit to display a still image if the determined type of image includes a still image only.

The method for controlling the display device may further include detecting an illumination level, comparing the detected illumination level to a reference illumination level, controlling the first display unit to display an image if the detected illumination level is less than the reference illumination level, and controlling the second display unit to display an image if the detected illumination level is equal to or greater than the reference illumination level.

The image may be determined as a still image if the type of image to be displayed includes at least one of a photograph and a text image.

The method for controlling the display device may further include controlling the second display unit to be in a transparent state if the determined type of image to be displayed includes a video image.

The controlling of the first display unit to display the image may include applying a voltage to the second display unit and cutting off the voltage applied to the second display unit if a certain period of time has passed.

The controlling of the first display unit to display the image may include detecting an illumination level, comparing the detected illumination level to a reference illumination level, stopping driving of the first display unit if the detected illumination level is less than the reference illumination level, and controlling the second display unit to display an image.

The method for controlling the display device may further include detecting a charge amount of the battery, comparing the charge amount of the battery to a reference battery charge amount, and controlling the second display unit to display an image if the detected charge amount of the battery is less than the reference battery charge amount.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
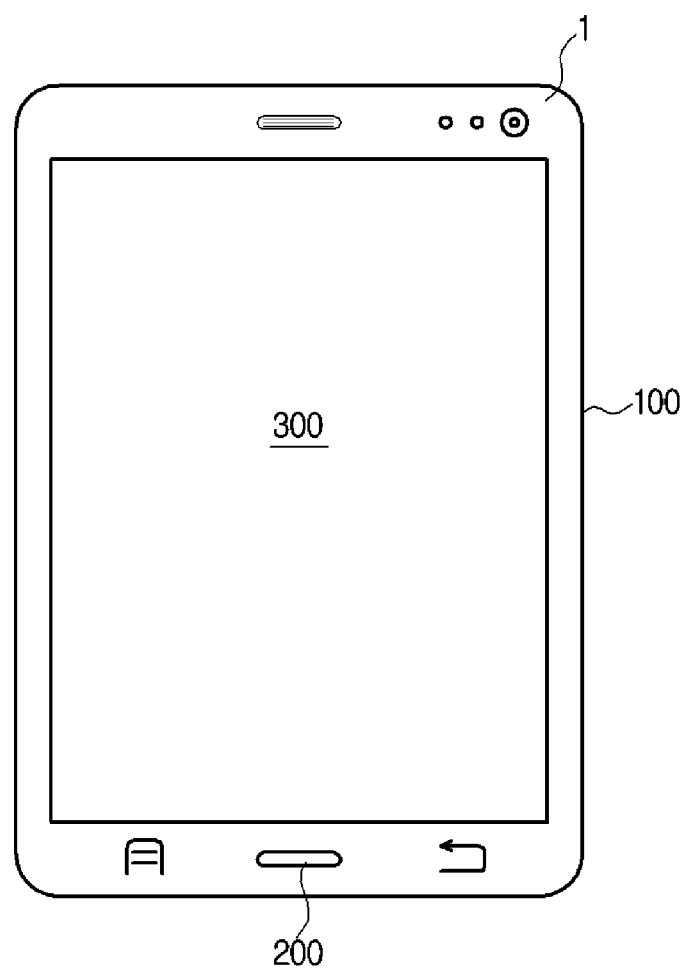
FIG. 1 is a schematic view of a terminal device having a display device according to an embodiment.

Reference will now be made in detail to embodiments, examples of which are illustrated in the accompanying drawings, wherein like reference numerals refer to like elements throughout.

Figure 2:
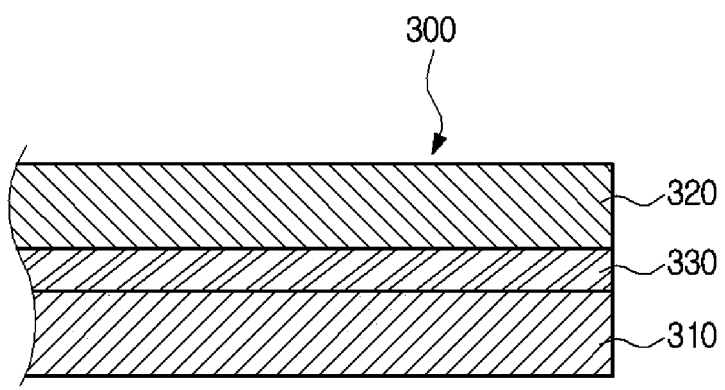
FIG. 2 is a schematic view of the display device of FIG. 1.

FIG. 1 is a schematic view of a terminal device having a display device 300 according to an embodiment. FIG. 2 is a schematic view of the display device 300 of FIG. 1. FIGS. 3 to 8 are schematic views of a first display panel 310 and a second display panel 320 of the display device 300 of FIG. 2.

Display devices such as a television and a monitor are devices to display images. In addition, display devices may be included in mobile communication devices such as a mobile phone, a tablet personal computer (tablet PC), computer, a personal digital assistant (PDA), portable media player (PMP), digital camera, laptop computer, notebook computer, portable game player, and wearable device to display images related to unique functions of the devices, or may be included in home appliances such as a refrigerator and an air conditioner to display images related to unique functions and additional functions of the devices.

Among such display devices, a display device included in a smartphone having computer-supported functions such as Internet communication and information retrieval is now described.

As illustrated in FIG. 1, a smartphone 1 includes a main body 100 and an input unit 200, and further includes the display device 300.

The main body 100 forms the exterior of the smartphone 1 which is a terminal device, and includes a bezel to cover edges of the input unit 200 and the display device 300.

The input unit 200 and the display device 300 are disposed on the main body 100 and a drive module 400-1 (see FIG. 9) to control operation of the smartphone 1 is disposed in the main body 100.

The input unit 200 receives input of a user command and transmits an input signal to the drive module 400-1. The input unit 200 may operate in at least one of a button mode and a touch mode. When the input unit 200 operates in a touch mode, the smartphone 1 further includes a touch panel (not shown) which may be disposed on the display device 300.

The display device 300 displays a call image related to a phone call, a menu image related to an icon such as an application (APP), a content execution image, etc. according to a drive command of the drive module 400-1.

These images may be divided into a still image such as a photograph, which is displayed still for a certain period of time or more by outputting a single frame repeatedly, or a video image displayed in a continuously moving state.

The terminal device may output sound in addition to image display.

As illustrated in FIG. 2, the display device 300 includes the first display panel 310 to display an image using internal light, the second display panel 320 to display an image using external light, and a refractive index compensation layer 330 disposed between the first and second display panels 310 and 320 to compensate a refractive index between the first and second display panels 310 and 320. Here, the refractive index compensation layer 330 includes an optical medium capable of compensating a refractive index.

The display device 300 displays an image according to a drive command of the drive module 400-1 on any one of the first and second display panels 310 and 320. A description of the drive module 400-1 will be given below.

Here, the first display panel 310 is a transmissive display panel and the second display panel 320 is a reflective display panel.

The first display panel 310 of the display device 300 included in the smartphone 1 may be implemented as any one of a liquid crystal display (LCD) panel 310a to generate internal light using a separate light source and to display an image using the generated light, and an organic light emitting diode (OLED) panel 310b to display an image using self-emitted light.

The LCD and OLED panels 310a and 310b are formed in a general structure and a brief description thereof is now given.

Figure 3:
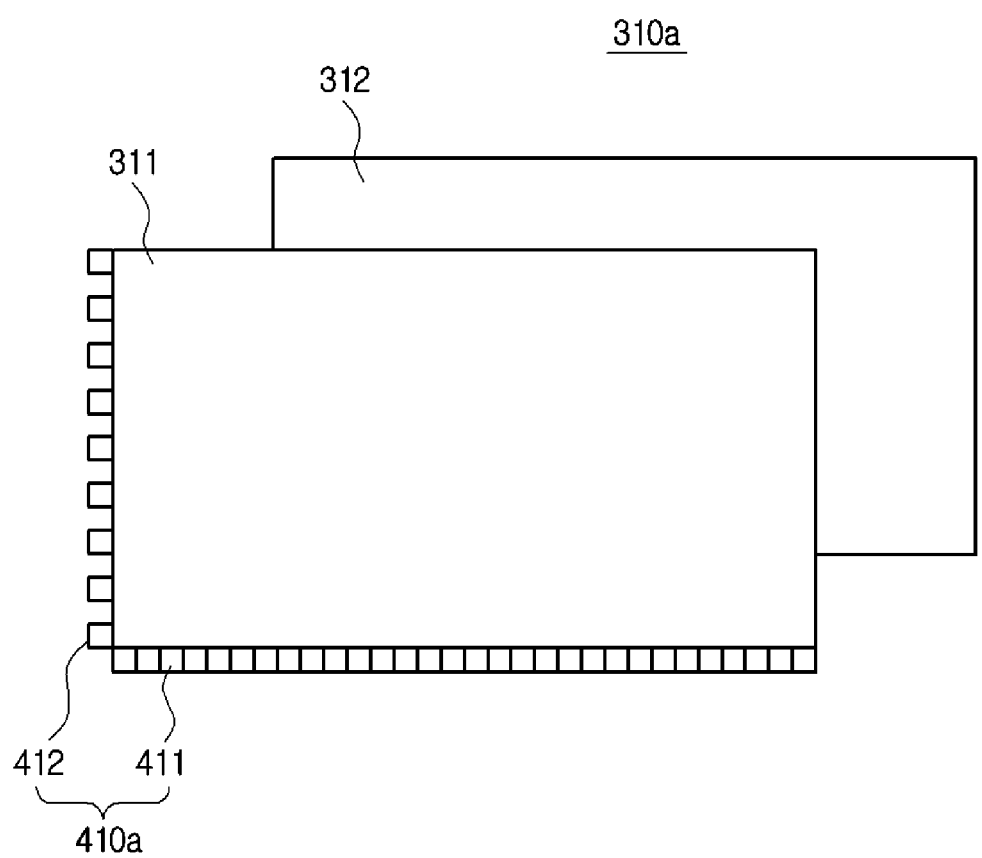
FIG. 3 is a schematic view of a first display panel of the display device of FIG. 2.

As illustrated in FIG. 3, the LCD panel 310a includes a liquid crystal panel 311 and a backlight unit 312.

For example, the liquid crystal panel 311 includes a first substrate and a second substrate spaced apart from each other, and a liquid crystal layer sealed between the first and second substrates, also includes a first polarization plate disposed at an outer side of the first substrate, a second polarization plate disposed at an outer side of the second substrate, a first electrode disposed between the first substrate and the liquid crystal layer, a second electrode disposed between the second substrate and the liquid crystal layer, and a color panel disposed between the second substrate and the second electrode, and further includes a first orientation layer disposed between the first electrode and the liquid crystal layer, and a second orientation layer disposed between the second electrode and the liquid crystal layer.

The first and second substrates of the liquid crystal panel 311 are formed of glass or plastic, and are flexible.

The liquid crystal panel 311 generates contrast by changing the orientation of molecules of liquid crystals injected between two thin substrates and having properties between those of solid and those of liquid, due to an external electric field, and thus displays an image.

Unlike an OLED, the liquid crystal panel 311 is a non-emissive type and thus not usable without a separate light emitter (light emitting unit). As such, the liquid crystal panel 311 requires the backlight unit 312 as a surface light source capable of maintaining a whole screen at uniform brightness.

That is, the backlight unit 312 is a device to emit light toward the liquid crystal panel 311 using a light source (e.g., light emitting diode (LED)), and includes a direct type to radiate light by aligning a plurality of light sources under the liquid crystal panel 311, and an edge type to radiate light by disposing a light guide plate under the liquid crystal panel 311 and aligning a plurality of light sources on at least one side of the light guide plate.

The LCD panel 310a displays an image to be viewed on the liquid crystal panel 311 by adjusting the transmittance of light emitted from the backlight unit 312. Here, the transmittance of light passed through the liquid crystal layer is adjustable according to the level of applied voltage.

According to a driving method, the LCD panel 310a is divided into a passive matrix (PM) type to drive liquid crystals located at a cross point of horizontal and vertical electrodes by applying a voltage to each electrode, and an active matrix (AM) type to control each pixel using a thin film transistor (TFT).

The PM-LCD panel displays a desired image using a principle that, when a voltage is applied to the first and second electrodes, an electric field is formed between the two electrodes, an orientation angle of liquid crystals of the liquid crystal panel 311 is changed due to the electric field, and the transmittance of light is changed according to the changed orientation angle.

The AM-LCD panel further includes a TFT array panel (not shown) spaced apart from the color panel and including a plurality of gate lines, data lines, and pixel electrodes.

Figure 9:
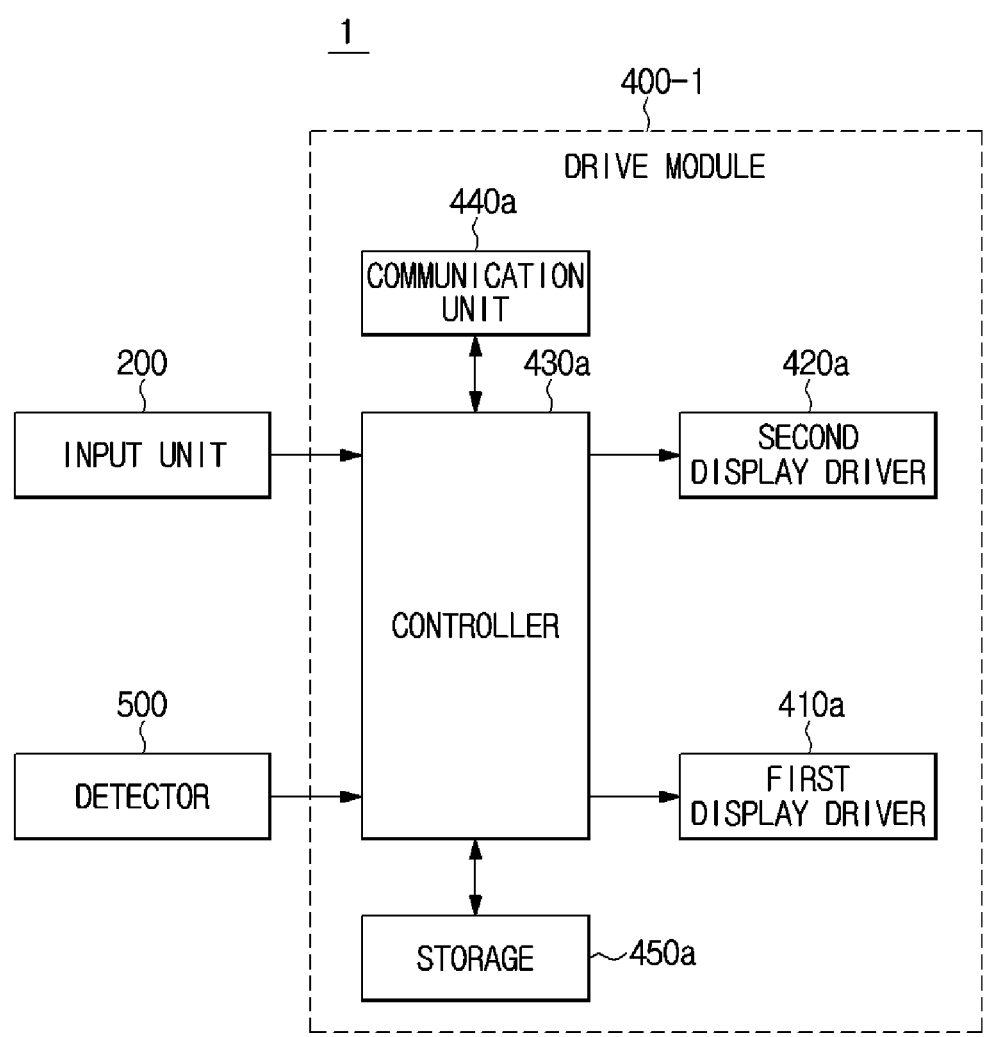
FIG. 9 is a block diagram showing control of the display device, according to an embodiment.

The AM-LCD panel 310a is electrically connected to a first display driver 410a (see FIG. 9).

The first display driver 410a includes a first driver 411 to drive an X electrode, and a second driver 412 to drive a Y electrode. Here, the X electrode is a source electrode and the Y electrode is a gate electrode.

The first driver 411 selects a grayscale voltage for each data line based on image data, and transmits the selected grayscale voltage through the data line to the liquid crystal layer.

The second driver 412 transmits an on/off signal generated based on the image data, through a scan line to the TFT which is a switching device, and thus switches the TFT on or off.

That is, when the first driver 411 supplies a voltage corresponding to each color value, the second driver 412 receives the voltage and opens the voltage to a corresponding pixel.

A source electrode of the TFT is connected to a data line, a gate electrode of the TFT is connected to a scan line, and a drain electrode of the TFT is connected to a pixel electrode formed of indium tin oxide (ITO). The TFT is switched on when a scan signal is supplied to the scan line and supplies a data signal supplied from the data line to the pixel electrode.

The OLED panel 310b implements full colors using characteristics that organic materials emit RGB light when a voltage is applied.

According to a driving method, the OLED panel 310b is divided into a PM type and an AM type.

The PM-OLED panel includes anodes and cathodes respectively aligned in columns and rows and a scan signal is supplied from a row driving circuit to the cathode. In this example, only one of a plurality of rows is selected. A column driving circuit inputs a data signal to each pixel.

The AM-OLED panel controls a signal input to each pixel, using a TFT.

The AM-OLED panel is exemplarily described.

Figure 4A:
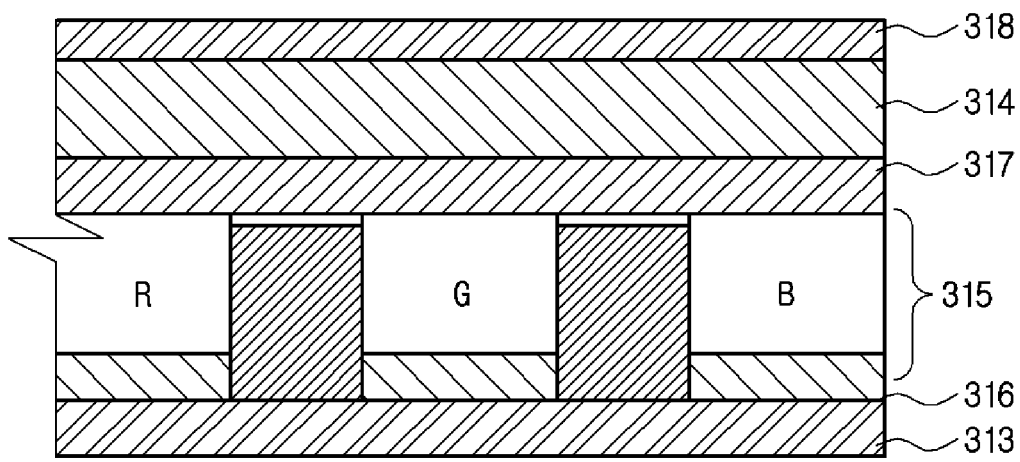
FIGS. 4A and 4B are views of another first display panel of the display device of FIG. 2.

As illustrated in FIG. 4A, the OLED panel 310b includes a first substrate 313, a second substrate 314 spaced apart from the first substrate 313 by a certain distance, an organic layer 315 disposed between the first and second substrates 313 and 314, a TFT array panel 316 disposed between the first substrate 313 and the organic layer 315, a cathode layer 317 disposed between the second substrate 314 and the organic layer 315, and a polarization panel 318 disposed at an outer side of the second substrate 314.

The first and second substrates 313 and 314 are formed of glass or plastic, and are flexible.

The first and second substrates 313 and 314 completely block the organic layer 315 from an external environment, i.e., package the organic layer 315, to prevent deterioration due to reaction with moisture or oxygen.

Figure 4B:
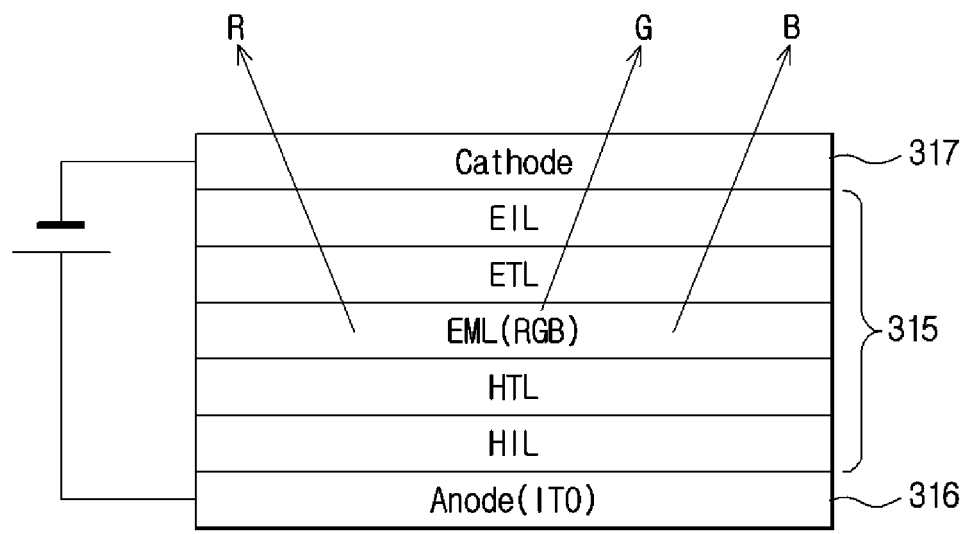

As illustrated in FIG. 4B, the organic layer 315 is disposed between the first electrode (i.e., anode) disposed in the TFT array panel 316, and the second electrode (i.e., cathode) disposed in the cathode layer 317, and is an OLED in which holes are injected from the first electrode, electrons are injected from the second electrode, and the electrons and holes are recombined in an organic emission material layer to emit light. The organic layer 315 includes a hole injection layer HIL to facilitate injection of the holes, a hole transfer layer HTL to facilitate movement of the injected holes, an electron injection layer EIL to facilitate injection of the electrons, an electron transfer layer ETL to facilitate movement of the injected electrons, and a functional organic layer such as an emission material layer EML. Here, the hole injection layer HIL, the hole transfer layer HTL, the electron injection layer EIL, and the electron transfer layer ETL are referred to as common layers.

The injected electrons and holes are combined in the emission material layer EML to emit light. The emission material layer EML is formed of a host which determines the durability of an organic material and expresses a display color, and an impurity (dopant) which determines color and efficiency.

The emission material layer EML needs to emit light externally and thus uses a transparent electrode (e.g., ITO) having light transmission characteristics.

Specifically, the organic layer 315 emits light due to a potential barrier between the two electrodes and the organic material. That is, when a direct current (DC) voltage is applied to the anode and cathode, holes (+) generated from the anode move from the first electrode (i.e., anode) toward the emission material layer EML through the hole transport layer HTL, and electrons (−) generated from the second electrode (i.e., cathode) moves toward the emission material layer EML through the electron transport layer ETL. In this example, light corresponding to an energy gap caused when the holes and electrons are recombined in the emission material layer EML is generated.

In the organic layer 315, when a voltage is applied to the two electrodes, holes are injected and transported from the first electrode, electrons are injected and transported from the second electrode, the holes and electrons respectively generate positive and negative polarons due to interaction with phonons in the emission material layer EML, and these polarons meet and are recombined to generate excitons.

These excitons drop to a low-energy state, releasing energy in the process, and thus light of a specific wavelength is generated. In this example, the color of light is changed according to the organic material of the organic layer 315.

The TFT array panel 316 of the OLED panel 310b supplies a certain current such that the organic layer 315 emits light. The TFT array panel 316 controls signal input to each pixel.

That is, when a TFT of the TFT array panel 316 is switched on, drive current is applied to the first electrode, holes are injected from the first electrode, and electrons are injected from the second electrode.

The polarization panel 318 outputs image light, which is emitted from the second substrate 314, in any one direction.

The OLED panel 310b is electrically connected to a second display driver 420a (see FIG. 9).

Here, the second display driver 420a passes current between the two electrodes by switching the TFT of the TFT array panel 316 on or off.

The OLED panel 310b which is a transmissive display panel has a single layer of RGB sub-cells and has a resolution equal to or higher than that of the second display panel 320 which is a reflective display panel.

Figure 5:
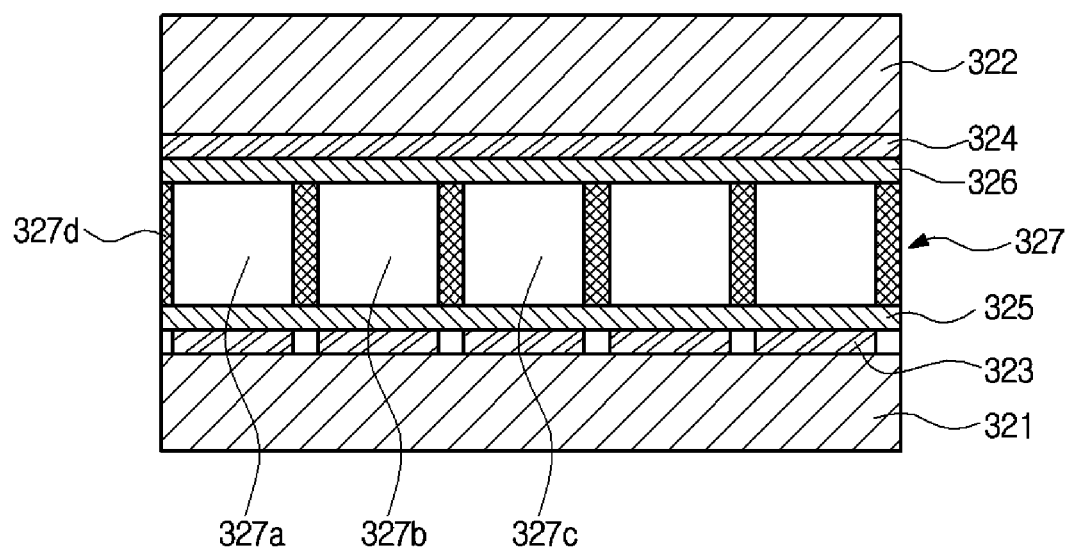
FIG. 5 is a schematic view of a second display panel of the display device of FIG. 2.

FIG. 5 is a schematic view of the second display panel 320 of the display device 300 of FIG. 2.

As illustrated in FIG. 5, the second display panel 320 includes a first substrate 321, a second substrate 322 spaced apart from the first substrate 321 by a certain distance, a first electrode 323 disposed on a surface of the first substrate 321, a second electrode 324 disposed on a surface of the second substrate 322, a first orientation layer 325 disposed at a side of the first electrode 323 for orientation of liquid crystal molecules, a second orientation layer 326 disposed at a side of the second electrode 324 for orientation of liquid crystal molecules, and a liquid crystal layer 327 disposed between the first and second orientation layers 325 and 326.

Here, the first and second substrates 321 and 322 are formed of glass or a transparent plastic having flexibility. When plastic is used, the display device 300 may have small thickness and weight and may be freely bent or curved and thus applied to new devices in various fields based on freedom of design.

The first and second electrodes 323 and 324 use transparent electrodes to increase the transmittance of the second display panel 320.

Figure 6:
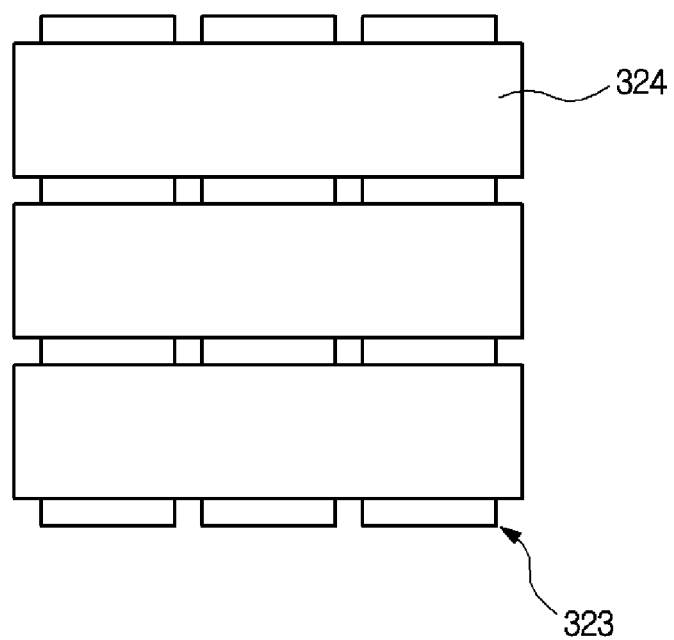
FIG. 6 is a schematic view showing the structure of electrodes formed on the second display panel of the display device of FIG. 2.

As illustrated in FIG. 6, the first and second electrodes 323 and 324 are disposed in the form of lines parallel to the first and second substrates 321 and 322, respectively. In this example, the two electrodes perpendicularly cross each other and a cross point therebetween forms a pixel.

The second display panel 320 may be easily processed and driven by aligning the two electrodes to be driven in a passive mode as described above.

Alternatively, the second display panel 320 may include a transistor at each pixel and thus driven in an active mode.

That is, a TFT array panel (not shown) including transistors for pixel driving may be formed on the first substrate 321 of the second display panel 320.

The TFT array panel includes transistors (not shown) to switch individual pixels on or off. In this example, a common electrode (not shown) to form an electric field in the liquid crystal layer 327 together with an output voltage of the transistor may be formed in the second substrate 322.

Here, the common electrode may be formed of a transparent conductive material such as indium tin oxide (ITO), indium zinc oxide (IZO), or aluminum doped zinc oxide (ZAO).

The liquid crystal layer 327 includes nematic liquid crystals, a chiral dopant, and a photopolymer cured to fix a cholesteric helical pitch.

Here, cholesteric liquid crystals are formed by mixing the nematic liquid crystals with the chiral dopant which induces a cyclic helical structure.

Figure 7:
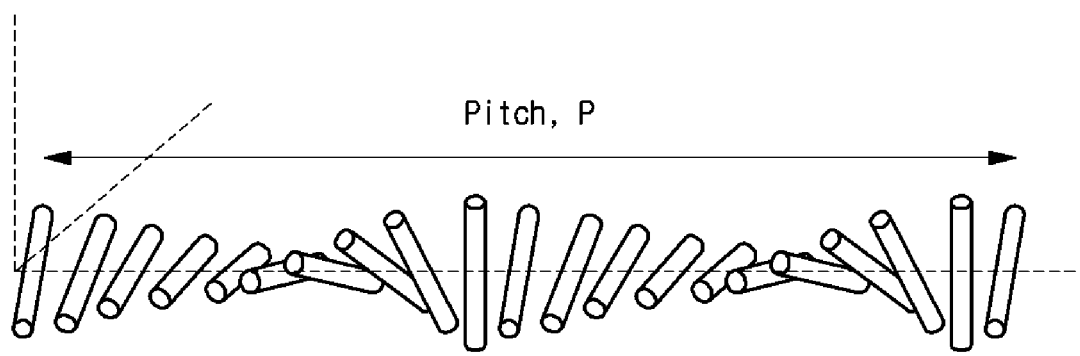
FIG. 7 is a schematic view of a liquid crystal layer formed on the second display panel of the display device of FIG. 2.

As illustrated in FIG. 7, cholesteric liquid crystal molecules are repeatedly twisted in a certain cycle. In this example, the cycle of repetition is called a pitch p, and selective light reflection occurs according to a twisted direction and the pitch p of the cholesteric liquid crystal molecules.

A reflection wavelength band is determined according to the pitch p. A wavelength $\lambda$ at which maximum reflection occurs is determined as $\lambda = n \cdot p$ when an average refractive index of the cholesteric liquid crystal molecules is n.

Here, the pitch p is adjusted according to the content of the chiral dopant. If the content of the chiral dopant is high, the pitch p is reduced and the reflection wavelength band is lowered.

The liquid crystal layer 327 reflects external light based on Bragg's law. In this example, color is displayed by artificially adjusting chiral properties to reflect a specific wavelength of a visible light band.

The liquid crystal layer 327 forms texture of the cholesteric liquid crystals in three states, e.g., planar, focal conic, and homeotropic, due to an applied electric field.

That is, the liquid crystal layer 327 may be in the planar or focal conic state to reflect or scatter light without an electric field due to bistability, and may be in the homeotropic state to transmit light when a sufficient electric field is applied. The cholesteric liquid crystals of the liquid crystal layer 327 may be switched between the focal conic and planar states.

Here, the planar state refers to a state in which a helical axis of the cholesteric liquid crystals is oriented perpendicular to a substrate, e.g., the first substrate 321, and the focal conic state refers to a state in which the helical axis of the cholesteric liquid crystals is oriented parallel to the first substrate 321.

For example, when a voltage is applied to the cholesteric liquid crystals in the planar state, the helical axis perpendicular to the first substrate 321 is changed to be parallel to the first substrate 321 and thus the texture of the cholesteric liquid crystals becomes the focal conic state.

When a higher voltage is applied to the cholesteric liquid crystals in the focal conic state, the helical structure is untwisted and thus becomes the homeotropic state in which the liquid crystal molecules are oriented in a direction of an electric field. In this example, the liquid crystal molecules may return to the focal conic state if the electric field is gradually removed, or return to the planar state if the electric field is rapidly removed.

Each state of the liquid crystal layer 327 is now described with reference to FIGS. 8A, 8B, and 8C.

Figure 8A:
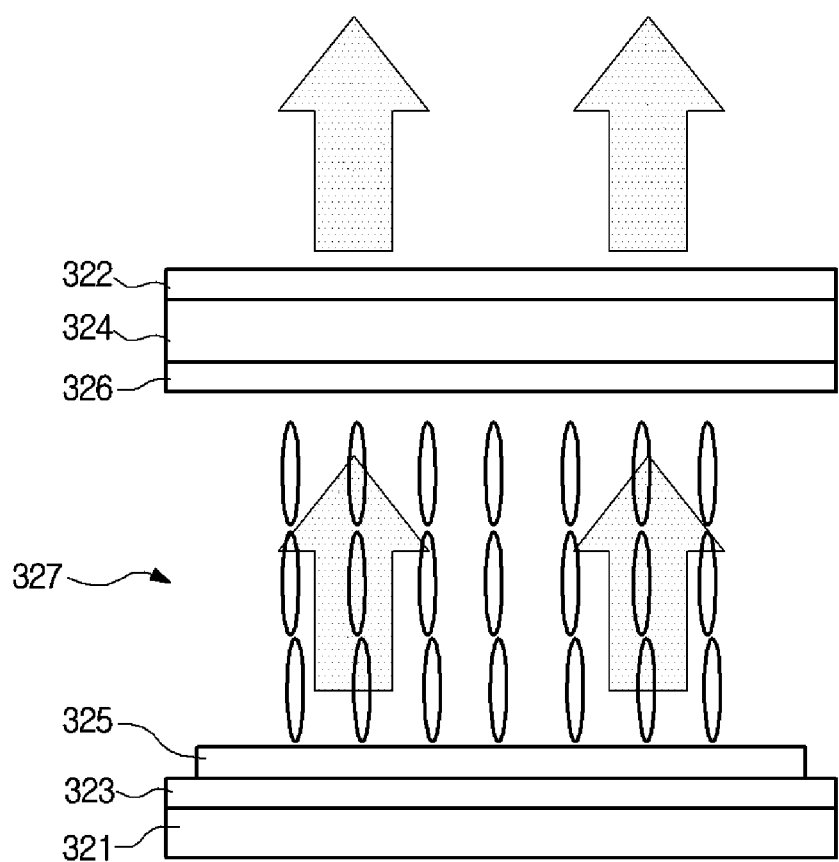
FIG. 8A is a schematic view showing light transmission of the liquid crystal layer formed on the second display panel of the display device of FIG. 2.

FIG. 8A shows the orientation of liquid crystals in the homeotropic state.

The liquid crystals in the homeotropic state correspond to an orientation achieved when a high electric field is applied to the cholesteric liquid crystal layer 327, and have light transmission characteristics.

Figure 8B:
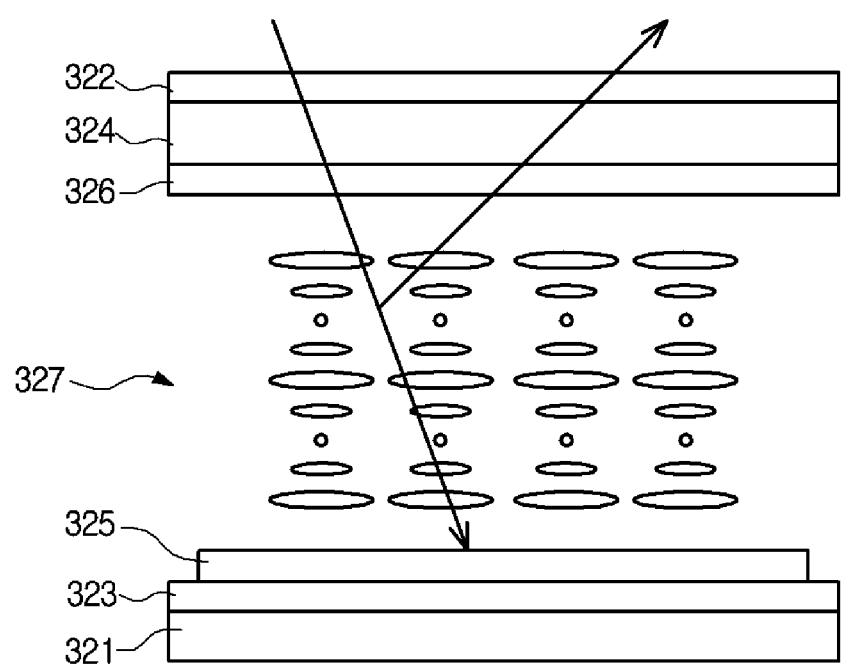
FIG. 8B is a schematic view showing light reflection of the liquid crystal layer formed on the second display panel of the display device of FIG. 2.

FIG. 8B shows the orientation of liquid crystals in the planar state.

The liquid crystals in the planar state correspond to an orientation achieved when a high electric field applied to liquid crystals in the homeotropic state is rapidly reduced. In the planar state, the axes of helical structures are at right angles to a surface of the second display panel 320.

In this example, if a twisted degree of the helical structure is adjusted, i.e., if the helical pitch is adjusted, cholesteric liquid crystals form colors by reflecting different colors such as RGB.

As described above, the cholesteric liquid crystals reflect a specific wavelength of light which is incident on a plane. In this example, the specific wavelength is determined according to helical pitch of the helical structure of the cholesteric liquid crystals. That is, since a wavelength of light to be reflected may be determined by adjusting the helical pitch, the color of light to be reflected may be controlled by adjusting the helical pitch of the cholesteric liquid crystals.

Figure 8C:
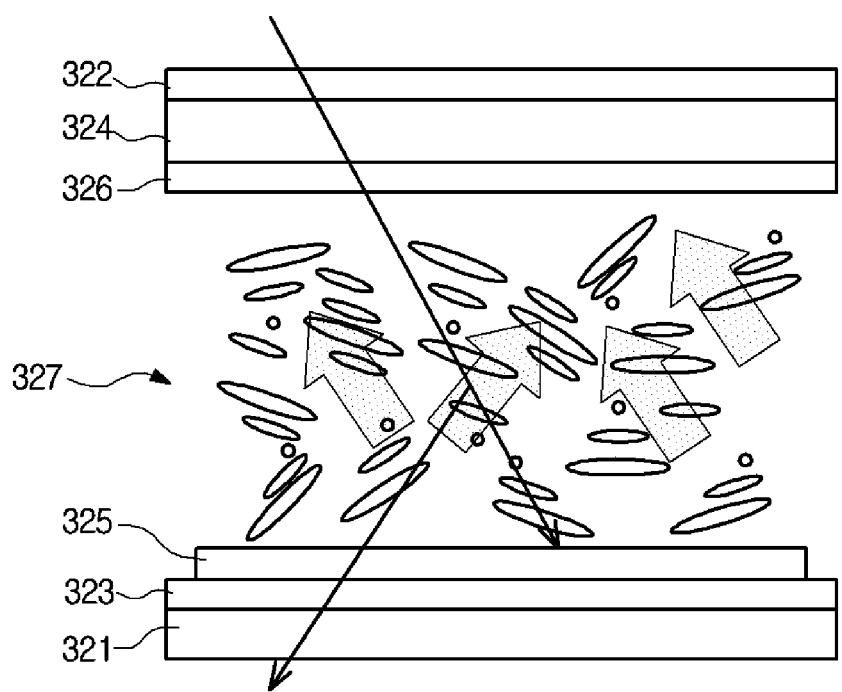
FIG. 8C is a schematic view showing light scattering of the liquid crystal layer formed on the second display panel of the display device of FIG. 2.

FIG. 8C shows the orientation of liquid crystals in the focal conic state.

The liquid crystals in the focal conic state correspond to an orientation achieved when a high electric field applied to liquid crystals in the homeotropic state is gradually reduced and have light scattering characteristics.

In the focal conic state, helical structures have no or multiple orientations. Since the liquid crystals are transparent, light passes through the liquid crystals and is absorbed by the first display panel 310 which displays black.

The liquid crystal layer 327 is partitioned into a plurality of sub-cells having cholesteric liquid crystal molecules of different helical pitches to implement different colors.

Here, the sub-cells include a first sub-cell 327a, a second sub-cell 327b, and a third sub-cell 327c, and a group of the first to third sub-cells 327a to 327c forms a basic pixel.

That is, the liquid crystal layer 327 includes a plurality of basic pixels which are repeatedly aligned in two dimensions. The sub-cells of the liquid crystal layer 327 are formed in a single layer.

The first sub-cell 327a may be a red sub-pixel cell to reflect a wavelength band corresponding to red light R, the second sub-cell 327b may be a green sub-pixel cell to reflect a wavelength band corresponding to green light G, and the third sub-cell 327c may be a blue sub-pixel cell to reflect a wavelength band corresponding to blue light B.

The first to third sub-cells 327a to 327c may be a magenta sub-pixel cell, a yellow sub-pixel cell, and a cyan sub-pixel cell, respectively.

The liquid crystal layer 327 further includes barriers 327d to partition the sub-cells. Here, the barriers 327d are used to maintain liquid crystal orientation or cell gap against an external factor.

The second display panel 320 may implement colors by forming RGB sub-cells in a single layer of the liquid crystal layer 327 using reflection characteristics and bistability of cholesteric liquid crystals so as to achieve a display device having no power consumption and may transmit an image of the first display panel 310 using a homeotropic state.

The second display panel 320 requires a light absorption layer to absorb light not used to form an image when the liquid crystal layer 327 is in the planar state or the focal conic state.

The first display panel 310 is used as the light absorption layer of the second display panel 320.

That is, the first display panel 310 operates to display black while the second display panel 320 is operating. In this example, the first display panel 310 functions as the light absorption layer of the second display panel 320.

Here, the first display panel 310 stops operating when the second display panel 320 displays an image, by displaying black in a standby mode or a power off mode.

The second display panel 320 allows an image of the first display panel 310 to be displayed externally in a homeotropic state.

As described above, light transmitted through the liquid crystal layer 327 of the second display panel 320, i.e., light other than light of a reflection wavelength band, is absorbed by the first display panel 310 and not reflected toward a display surface, and thus the purity of colors displayed on the display surface may be increased.

FIG. 9 is a block diagram showing control of the smartphone 1 including the display device 300, according to an embodiment. The smartphone 1 includes the input unit 200, the drive module 400-1, and a detector 500.

The input unit 200 receives input of a user command and transmits an input signal to the drive module 400-1. The input unit 200 may operate in at least one of a button mode and a touch mode.

Examples of the command input to the input unit 200 include a search command, a call command, a content execute command, etc.

The drive module 400-1 controls operations of the first and second display panels 310 and 320 based on the command input to the input unit 200 and information detected by the detector 500.

Here, the detector 500 detects an illumination level of the display device 300 and generates and transmits a signal corresponding to the detected illumination level to the drive module 400-1.

The drive module 400-1 includes the first display driver 410a, the second display driver 420a, a controller 430a, a communication unit 440a, and a storage 450a.

The first display driver 410a drives the first display panel 310 to display an image based on a command of the controller 430a. In this example, the image displayed on the first display panel 310 includes at least one of a still image, a text image, and a video image.

If the first display panel 310 is driven in a passive mode, the first display driver 410a controls a voltage to be applied to the first and second electrodes of the first display panel 310, based on image information.

If the first display panel 310 is driven in an active mode, the first display driver 410a drives the first display panel 310 to display a desired image by respectively applying a gate driving signal and a data driving signal based on a gate control signal, a data control signal, and a data signal related thereto, to a gate line and a data line formed on the TFT array panel of the first display panel 310.

The second display driver 420a drives the second display panel 320 to display an image based on a command of the controller 430a. In this example, the image displayed on the second display panel 320 includes at least one of a still image and a text image.

If the second display panel 320 is driven in a passive mode, the second display driver 420a controls a voltage to be applied to the first and second electrodes 323 and 324 of the second display panel 320, based on image information.

If the second display panel 320 is driven in an active mode, the second display driver 420a drives the second display panel 320 to display a desired image by respectively applying a gate driving signal and a data driving signal based on a gate control signal, a data control signal, and a data signal related thereto, to a gate line and a data line formed on the TFT array panel of the second display panel 320.

The controller 430a compares the illumination level detected by the detector 500 to a reference illumination level, controls operation of the first display panel 310 to display an image if the detected illumination level is less than the reference illumination level, and controls operation of the second display panel 320 to display an image if the detected illumination level is equal to or greater than the reference illumination level.

Alternatively, to display an image at an illumination level less than the reference illumination level, the controller 430a may control operation of the first display panel 310 to generate auxiliary light and control operation of the second display panel 320 to display an image.

In this example, the first display panel 310 functions as an absorption layer of the second display panel 320 while providing auxiliary light to the second display panel 320.

Alternatively, auxiliary light may be provided to the second display panel 320 using a separate auxiliary light source (not shown) instead of the first display panel 310.

When an image display command is input to the input unit 200, the controller 430a determines the type of image to be displayed, determines whether the type of image includes a video image, and controls operation of the first display panel 310 upon determining that the type of image includes a video image. When a content execute command or a text display command is input to the input unit 200, or upon determining that the type of image includes a still image only, the controller 430a controls operation of the second display panel 320.

Here, the first display panel 310 displays at least one of a still image, a text image, and a video image, and the second display panel 320 displays at least one of a still image and a text image.

In addition, the controller 430a may control operations of the first and second display panels 310 and 320 based on the command input to the input unit 200 and the illumination level detected by the detector 500.

Specifically, when the type of image to be displayed is a text image (=>국문에는 "텍스트 출력 명령"으로 기재) or a still image, the controller 430a compares the illumination level detected by the detector 500 to the reference illumination level, controls operation of the second display panel 320 and controls operation of the first display panel 310 to provide auxiliary light to the second display panel 320 (=>국문에는 "제1디스플레이 패널로부터 보 조광을 제공받 도록"으로 기재) if the detected illumination level is less than the reference illumination level, and controls operation of the second display panel 320 if the detected illumination level is equal to or greater than the reference illumination level.

In addition, when a still image is displayed, the controller 430a applies a voltage for image display to the first and second electrodes 323 and 324 of the second display panel 320 and cuts off the voltage applied to the first and second electrodes 323 and 324 of the second display panel 320 after a certain period of time has passed.

The second display panel 320 may display a 0 state screen and then constantly maintain the 0 state screen without additional application of voltage, and may be switched to a 1 state screen upon application of another voltage and then constantly maintain the 1 state screen.

As described above, the second display panel 320 has an image memory function and thus may maintain an image to be displayed even when a voltage applied to the two electrodes is cut off.

The communication unit 440a performs at least one of wired communication and wireless communication.

The communication unit 440a may access the Internet directly using a wireless Internet protocol or access the Internet using various browsing programs.

The communication unit 440a may receive various types of content information from an external server (not shown) through Internet protocol communication, and transmit internal information of a terminal device to the outside of the terminal device.

The storage 450a stores the reference illumination level, APP information, and the content information.

The storage 450a may also store information about a voltage applied to the first and second electrodes 323 and 324 of the second display panel 320 when a still image is displayed.

Figure 10:
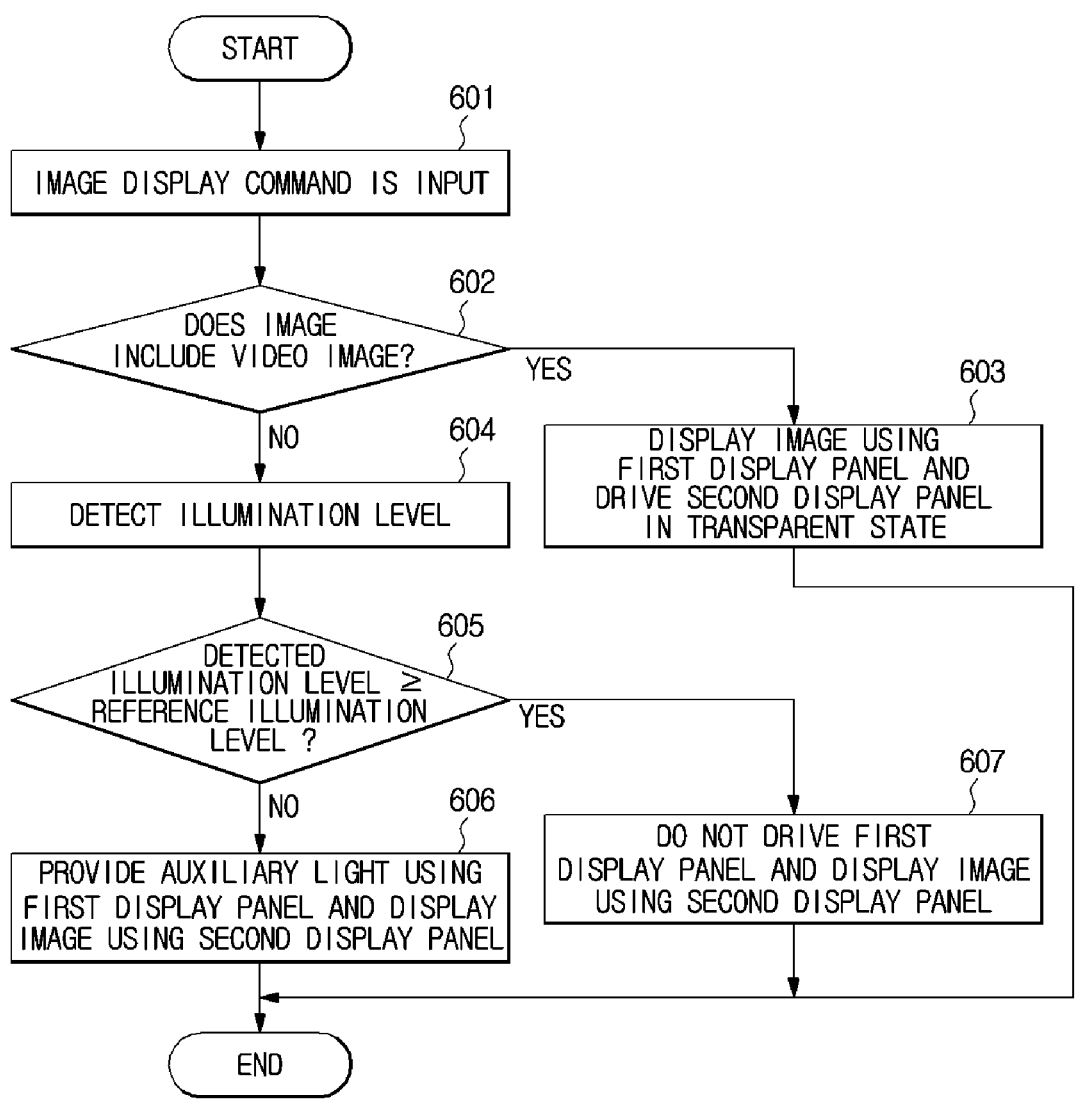
FIG. 10 is a flowchart of a method for controlling the display device, according to an embodiment.

FIG. 10 is a flowchart of a method for controlling the smartphone 1 including the display device 300, according to an embodiment. The method of FIG. 10 is now described in conjunction with FIGS. 11 to 13.

When the smartphone 1 is powered on and is not in use by a user, the display device 300 of the smartphone 1 executes a standby mode. When the smartphone 1 is powered off, the display device 300 of the smartphone 1 executes a power off mode.

When a power button is manipulated in a standby mode or a power off mode, the display device 300 of the smartphone 1 generates a signal corresponding to the manipulated power button and displays an initial image of an operation mode.

Here, the initial image is a still image to be displayed for a certain period of time or more, for example, a main screen, a standby screen, or a lock screen.

The display device 300 of the smartphone 1 detects a current illumination level using the detector 500 immediately before the initial image is displayed, compares the detected illumination level to a reference illumination level, and operates the first and second display panels 310 and 320 if the detected illumination level is less than the reference illumination level. In this example, the first display panel 310 generates and provides auxiliary light to the second display panel 320, and the second display panel 320 displays the initial image using auxiliary light provided from the first display panel 310.

Here, the first display panel 310 functions as an absorption layer of the second display panel 320 while providing auxiliary light to the second display panel 320.

Alternatively, the display device 300 may provide auxiliary light to the second display panel 320 using a separate auxiliary light source. In this example, the first display panel 310 only functions as an absorption layer of the second display panel 320.

If the detected illumination level is less than the reference illumination level, the display device 300 may display the initial image on the first display panel 310 and operate the second display panel 320 in a transparent state. In this example, the second display panel 320 may be driven in a transparent state such that the image of the first display panel 310 is viewed through the transparent second display panel 320.

Otherwise, if the detected illumination level is equal to or greater than the reference illumination level, the display device 300 drives the second display panel 320 to display the initial image. In this example, the first display panel 310 is in a power off mode or a standby mode to be maintained black and thus absorbs light incident on the second display panel 320 but not used as image forming light.

Upon determining that the initial image includes a video image, the display device 300 drives the first display panel 310 to display the initial image. In this example, the second display panel 320 is driven in a transparent state which is a homeotropic state.

If there is no input signal while the initial image is being displayed, the display device 300 is switched to a standby mode and stops operations of the first and second display panels 310 and 320.

Otherwise, if a signal is input to the input unit 200 while the initial image is being displayed, the display device 300 determines whether a command corresponding to the input signal is an image display command (601), determines the type of image to be displayed upon determining that the input command is an image display command, and determines whether the type of image includes a video image (602).

Alternatively, the display device 300 may check the type of content to be executed.

Here, the checking of the type of content includes checking whether the content is still image content or text content.

In this example, upon determining that the command input by the user is a content execute command, the display device 300 may determine whether an image to be displayed according to content execution includes a video image.

Upon determining that the type of image includes a video image, the display device 300 drives the first and second display panels 310 and 320 to display the video image.

Figure 11:
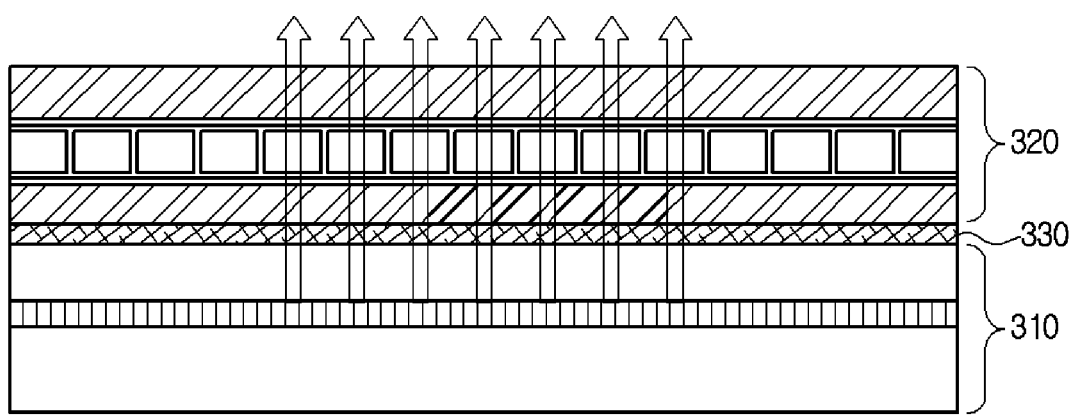
FIGS. 11 to 13 are schematic views showing image display of the display device, according to an embodiment.

Operations of the first and second display panels 310 and 320 to display a video image are now described in conjunction with FIG. 11. The first display panel 310 displays a video image and the second display panel 320 is driven in a transparent state which is a homeotropic state (603). As such, the video image displayed on the first display panel 310 passes through the second display panel 320 and is displayed on a display surface of the display device 300.

Otherwise, upon determining that the type of image to be displayed does not include a video image but includes a still image only, the display device 300 controls operation of the detector 500 to detect a current illumination level (604), and compares the detected illumination level to the reference illumination level. In this example, the display device 300 determines whether the detected illumination level is equal to or greater than the reference illumination level (605).

If the detected illumination level is less than the reference illumination level, the display device 300 operates the first and second display panels 310 and 320 to display the still image. Here, the still image includes a photograph, an advertisement, a text image, etc.

The determining of whether the type of image includes a still image only includes determining whether a command input to the input unit 200 includes a command to execute an APP to input/output text such as news, articles, or notes, a command to display a keypad to execute a call command, or a command to display photos, or determining whether the type of content is still image content.

Figure 12:
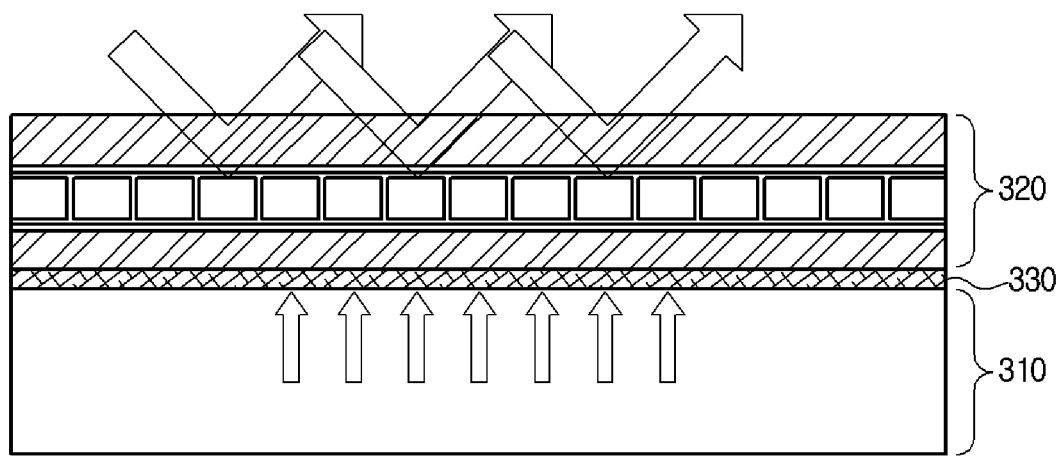

Operations of the first and second display panels 310 and 320 to display a still image at an illumination level less than the reference illumination level are now described in conjunction with FIG. 12. The first display panel 310 generates and provides auxiliary light to the second display panel 320, and the second display panel 320 displays the still image using auxiliary light provided from the first display panel 310 (606).

Here, the first display panel 310 functions as an absorption layer of the second display panel 320 while providing auxiliary light to the second display panel 320.

When the still image is displayed at an illumination level less than the reference illumination level, the display device 300 displays the still image on the second display panel 320 by applying a voltage to the first and second electrodes 323 and 324 of the second display panel 320 based on image information to be displayed, and cuts off the voltage applied to the first and second electrodes 323 and 324 of the second display panel 320 if a certain period of time has passed after the still image is displayed on the second display panel 320. In this example, the first display panel 310 continuously provides auxiliary light.

Alternatively, when the detected illumination level is less than the reference illumination level, the display device 300 may provide auxiliary light to the second display panel 320 using an auxiliary light source (not shown).

In this example, the first display panel 310 only functions as an absorption layer of the second display panel 320.

Alternatively, when a still image is to be displayed, if the detected illumination level is less than the reference illumination level, the display device 300 may operate the first and second display panels 310 and 320 in the same manner as when displaying a video image.

That is, the display device 300 may drive the first and second display panels 310 and 320 in such a manner that the first display panel 310 displays a still image and the second display panel 320 is driven in a transparent state which is a homeotropic state, and thus the still image displayed on the first display panel 310 may pass through the second display panel 320 to be displayed on a display surface of the display device 300.

Otherwise, if the detected illumination level is equal to or greater than the reference illumination level, the display device 300 operates the first and second display panels 310 and 320 to display a still image.

Figure 13:
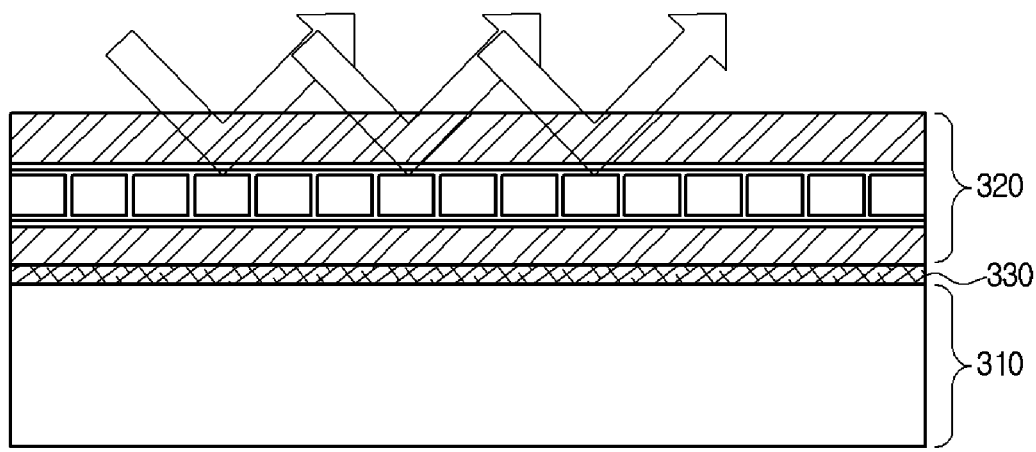

Operations of the first and second display panels 310 and 320 to display a still image at an illumination level equal to or greater than the reference illumination level are now described in conjunction with FIG. 13. The second display panel 320 displays a still image using an external light source and the first display panel 310 is not driven (607).

Here, the first display panel 310 only functions as an absorption layer of the second display panel 320.

When a still image is displayed at an illumination level equal to or greater than the reference illumination level, the display device 300 displays the still image on the second display panel 320 by applying a voltage to the first and second electrodes 323 and 324 of the second display panel 320 based on image information to be displayed, and cuts off the voltage applied to the first and second electrodes 323 and 324 of the second display panel 320 if a certain period of time has passed after the still image is displayed on the second display panel 320.

Then, if the user inputs a command to terminate a currently executed program, the display device 300 switches the first and second display panels 310 and 320 to a standby mode.

That is, if the user inputs a command to display another image or inputs a termination command while a video image is being displayed using the first display panel 310, the display device 300 cuts off a voltage applied to the first display panel 310.

Otherwise, if the user inputs a command to display another image or inputs a termination command while a still image is being displayed using the second display panel 320, the display device 300 changes the level of a voltage applied to the first and second electrodes 323 and 324 of the second display panel 320 to change the orientation of the liquid crystal layer 327 of the second display panel 320, thereby changing or terminating display of the still image displayed on the second display panel 320.

When light of the first display panel 310 is used as auxiliary light, a voltage applied to the first display panel 310 is also cut off to block light provided from the first display panel 310.

As described above, since a reflective display panel is driven when the display device 300 is exposed to external light, image visibility may be improved and energy consumption may be reduced. In addition, since liquid crystals are not stacked in multiple layers nor is an intermediate film used, transmittance may be improved.

Furthermore, since the liquid crystal layer 327 of the second display panel 320 is formed in a single layer to implement RGB, transmittance may be improved to 80% or above.

As such, the display device 300 is applicable to home appliances such as a refrigerator and information technology (IT) devices such as a printer as well as mobile communication devices which require a high level of transmittance to view inside.

FIGS. 14A to 14E are schematic views of the display device 300 according to an embodiment.

The display device 300 includes the first display panel 310, and the second display panel 320 disposed at a side of and slidably combined with the first display panel 310.

Here, the first display panel 310 is a transmissive display panel and the second display panel 320 is a reflective display panel.

The first display panel 310 may be implemented as any one of a non-emissive display panel to generate internal light using a separate light source and to display an image using the generated light, and a self-emissive display panel to display an image using self-emitted light.

Figure 18:
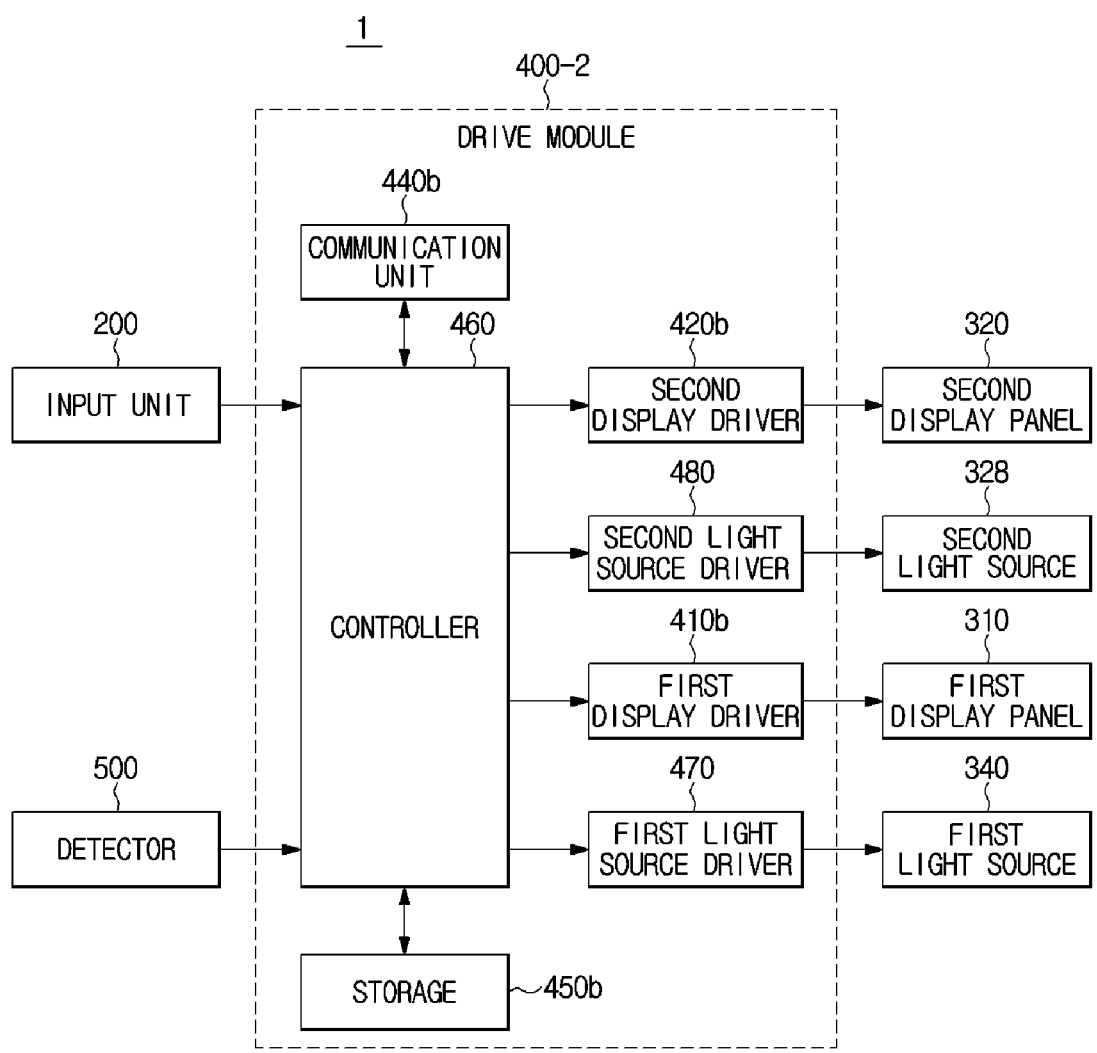
FIG. 18 is a block diagram showing control of the display device, according to an embodiment.

That is, the non-emissive first display panel 310 further includes a first light source 340 (see FIG. 18).

The first and second display panels 310 and 320 may have overlapping display surfaces, or the display surface of the second display panel 320 may not overlap with the display surface of the first display panel 310 to extend a display area.

Figure 14A:
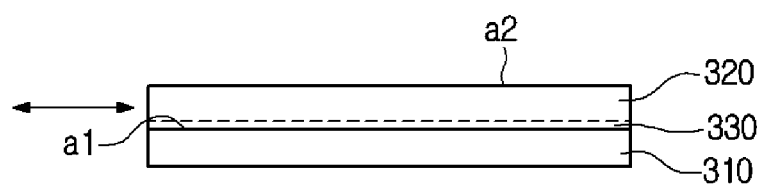
FIGS. 14A to 14E are schematic views of a display device according to an embodiment.

As illustrated in FIG. 14A, a first display surface a1 of the first display panel 310 and a second display surface a2 of the second display panel 320 form a stacked structure. In this example, the display device 300 displays an image on any one of the first and second display panels 310 and 320.

Accordingly, when an image is displayed on the first display panel 310, the image displayed on the first display surface a1 of the first display panel 310 passes through the second display panel 320 and then is exposed externally. When an image is displayed on the second display panel 320, the image displayed on the second display surface 320a of the second display panel 320 is directly exposed externally.

Figure 14B:
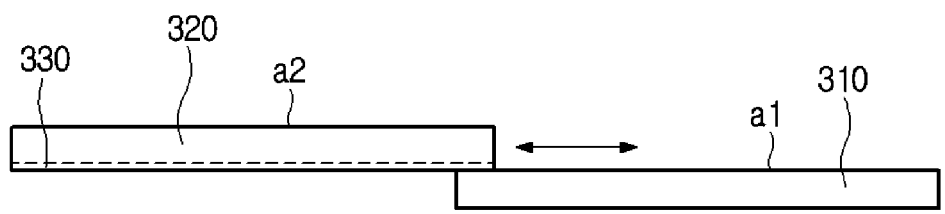
Figure 14C:
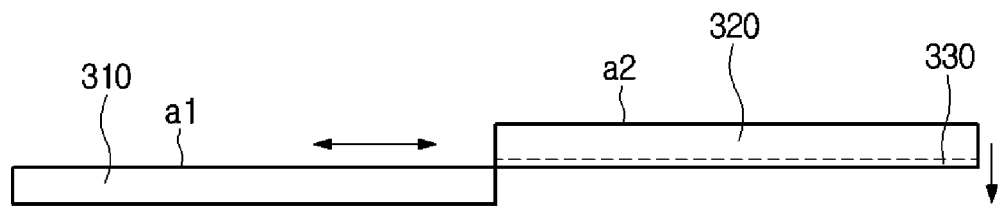

As illustrated in FIGS. 14B and 14C, the second display panel 320 slides from the first display panel 310.

The second display panel 320 moves in a first direction of the first display panel 310, e.g., from right to left. Alternatively, the second display panel 320 may move in a second direction opposite to the first direction, e.g., from left to right.

As described above, since the second display panel 320 slides from the first display panel 310, the first and second display panels 310 and 320 are disposed horizontally in parallel to each other.

In this example, the display device 300 displays an image on at least one of the first and second display panels 310 and 320.

That is, the display device 300 may display an image on the first display panel 310, the second display panel 320, or both the first and second display panels 310 and 320.

Figure 14D:
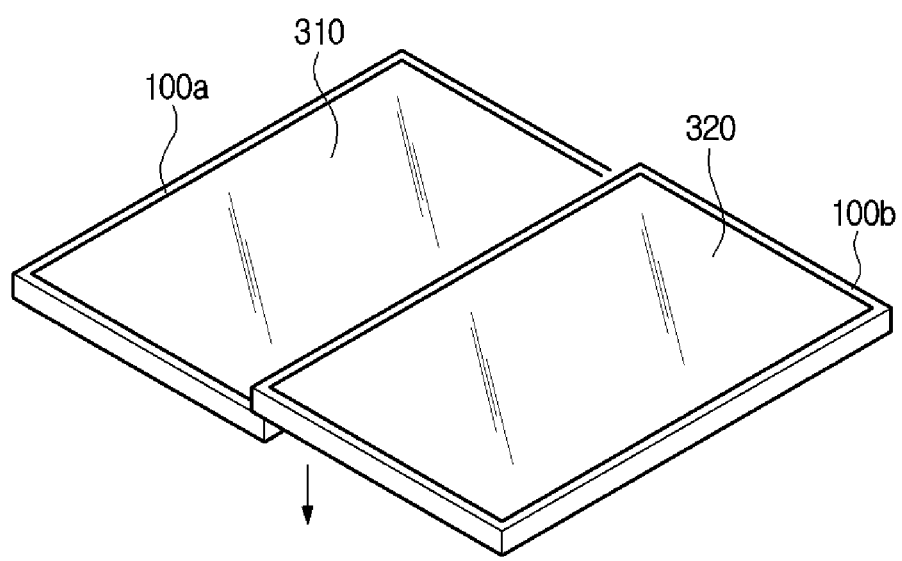

As illustrated in FIG. 14D, the first and second display panels 310 and 320 respectively have bezels 100a and 100b surrounding edges thereof, and are mechanically and slidably connected to each other through the adjacent bezels 100a and 100b.

For example, an upper part of the bezel 100a of the first display panel 310 and a lower part of the bezel 100b of the second display panel 320 are formed in a rail shape, and the two rail-shaped bezels 100a and 100b are engaged with each other such that the second display panel 320 is slidably combined with the first display panel 310.

Figure 14E:
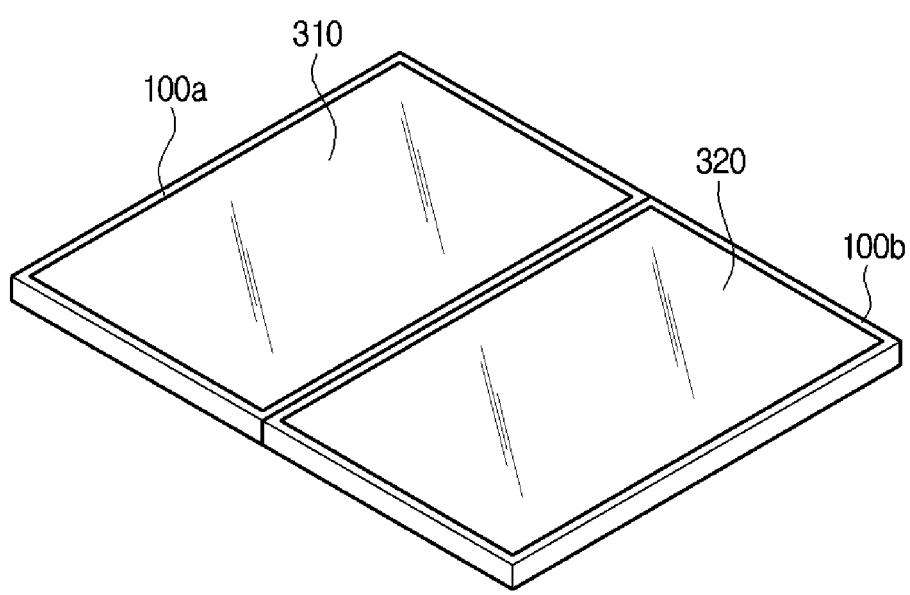

As illustrated in FIG. 14E, the second display panel 320 may horizontally slide on the first display panel 310 and then vertically slide along a side surface of the bezel 100a after opposite side surfaces of the two bezels 100a and 100b meet each other.

As such, the first and second display panels 310 and 320 may be placed on the same plane.

That is, the first and second display panels 310 and 320 may be connected to each other in such a manner that, when opposite side surfaces of the two bezels 100a and 100b of the overlapping first and second display panels 310 and 320 contact each other due to sliding of the second display panel 320, the side surface of the second display panel 320 may slide downward along the side surface of the first display panel 310.

When the second display panel 320 returns to an overlapping state, the second display panel 320 slides upward along the side surface of the bezel 100a of the first display panel 310.

The display device 300 further includes the refractive index compensation layer 330 disposed between the first and second display panels 310 and 320 to compensate a refractive index between the first and second display panels 310 and 320. Here, the refractive index compensation layer 330 includes an optical medium capable of compensating a refractive index.

Here, the refractive index compensation layer 330 is formed integrally with the first display panel 310 or the second display panel 320.

Figure 15A:
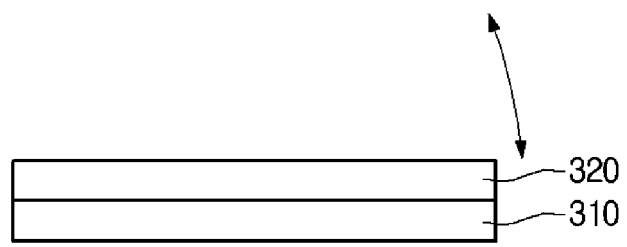
FIGS. 15A and 15B are views of a display device according to an embodiment.
Figure 15B:
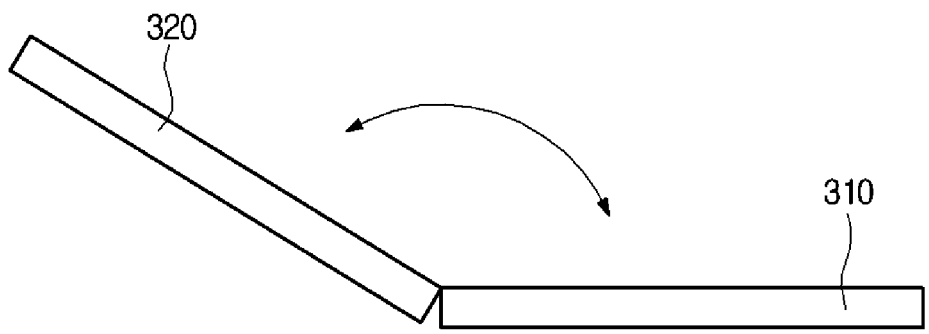

FIGS. 15a and 15b are schematic views of the display device 300 according to an embodiment.

FIG. 15A shows the display device 300 in an overlapping state and FIG. 15B shows the display device 300 in a spread state.

The display device 300 includes the first display panel 310, and the second display panel 320 disposed at a side of and foldably combined with the first display panel 310.

That is, the first and second display panels 310 and 320 are connected to each other by a rotation member (not shown) and thus overlap or spread.

Here, the rotation member includes a hinge, a flexible member, etc.

The display device 300 may have an extended display area when the first and second display panels 310 and 320 are in a spread state.

The display device 300 displays an image on any one of the first and second display panels 310 and 320 in an overlapping state, and displays an image on at least one of the first and second display panels 310 and 320 in a spread state.

Figure 16:
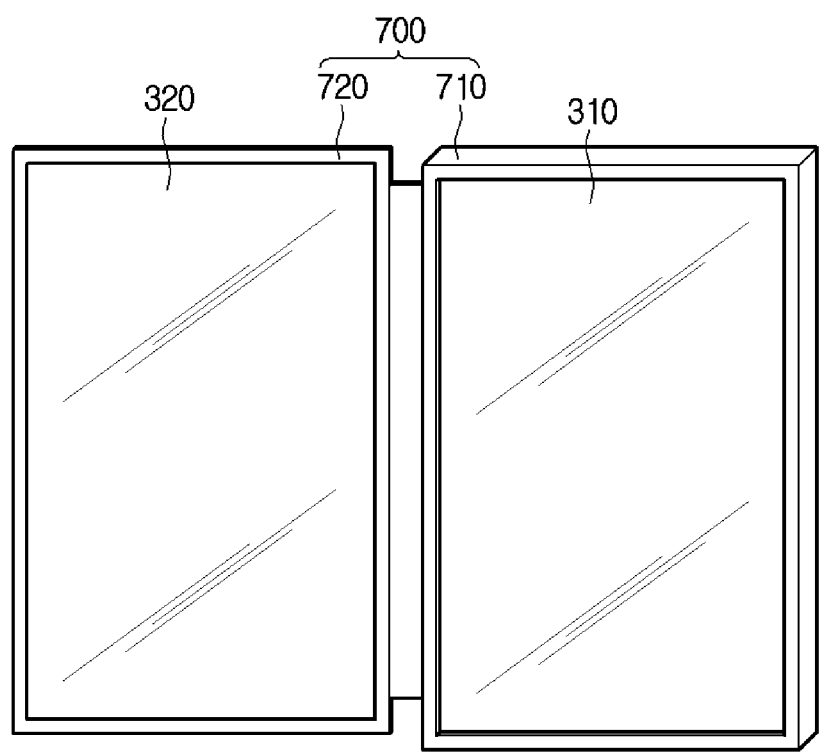
FIG. 16 is a schematic view of a display device according to an embodiment.

FIG. 16 is a schematic view of the display device 300 according to an embodiment.

The display device 300 includes the first display panel 310, and the second display panel 320 disposed at a side of and foldably combined with the first display panel 310.

The display device 300 includes a cover member 700 including a mounting part 710 to accommodate and protect the first display panel 310, and a protection part 720 rotatable from the first display panel 310, having the second display panel 320 disposed thereon, and surrounding edges of the second display panel 320.

That is, the second display panel 320 disposed on the cover member 700 is rotatably mounted on one side surface of the first display panel 310 and overlaps with or spreads from the first display panel 310 to open or close a display surface of the first display panel 310.

The second display panel 320 is mechanically and electrically connected to the first display panel 310 through the cover member 700.

The display device 300 may have an extended display area when the first and second display panels 310 and 320 are in a spread state.

The display device 300 displays an image on any one of the first and second display panels 310 and 320 in an overlapping state, and displays an image on at least one of the first and second display panels 310 and 320 in a spread state.

Figure 17:
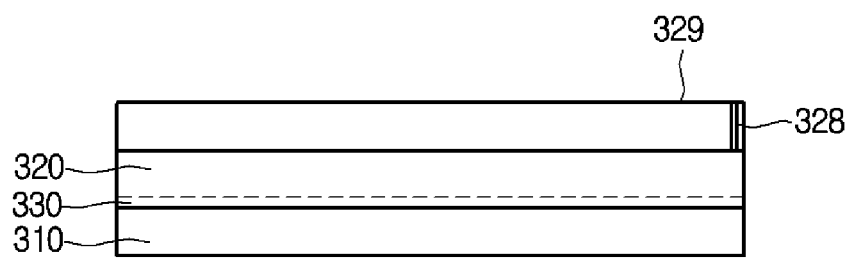
FIG. 17 is a schematic view of a display device according to an embodiment.

FIG. 17 is a schematic view of the display device 300 according to an embodiment. The display device 300 further includes a second light source 328 and a light guide plate 329 in addition to the first display panel 310, the second display panel 320, and the refractive index compensation layer 330.

Here, the second light source 328 and the light guide plate 329 are also applicable to the display device 300 of FIG. 1, the display device 300 of FIGS. 14A to 14D, and the display device 300 of FIGS. 15a and 15b.

The second light source 328 is disposed at a side of the second display panel 320 and is an auxiliary light source which emits light when an illumination level of external light is less than a reference illumination level.

The light guide plate 329 is disposed in parallel to a display surface of the second display panel 320 and transfer light emitted from the second light source 328 uniformly over the whole surface of the second display panel 320.

When the second display panel 320 displays an image using external light, if the illumination level of external light is less than the reference illumination level, the second display panel 320 displays the image using auxiliary light provided from the second light source 328. That is, light generated by the second light source 328 is transferred to the light guide plate 329 and light incident on the light guide plate 329 is transferred to the second display panel 320.

FIG. 18 is a block diagram showing control of the smartphone 1 including the display device 300, according to an embodiment. The smartphone 1 includes the input unit 200, the drive module 400-2, and the detector 500.

The input unit 200 receives input of a user command and transmits an input signal to the drive module 400-2. The input unit 200 may operate in at least one of a button mode and a touch mode.

Examples of the command input to the input unit 200 include a search command, a call command, a message compose and send command, a content execute command, etc.

The drive module 400-2 controls operation of at least one of the first and second display panels 310 and 320 based on the command input to the input unit 200 and information detected by the detector 500.

Here, the detector 500 includes an illumination level detector to detect an illumination level of the display device 300, and to generate and transmit a signal corresponding to the detected illumination level, to the drive module 400-2.

The detector 500 may further include a mode detector to detect whether two display surfaces are in an overlapping mode or an extended mode according to the positions of the first and second display panels 310 and 320 of the display device 300.

That is, the mode detector includes a sensor to detect a disposition mode of the first and second display panels 310 and 320.

Alternatively, the display device 300 may directly receive input of an overlapping mode or an extended mode through the input unit 200.

The drive module 400-2 of the display device 300 according to an embodiment includes the first display driver 410b, the second display driver 420b, the communication unit 440b, the storage 450b, a controller 460, a first light source driver 470, and a second light source driver 480. A description thereof is now given in conjunction with the display device 300 illustrated in FIG. 16.

The first display driver 410b drives the first display panel 310 to display an image based on a command of the controller 460. In this example, the image displayed on the first display panel 310 includes at least one of a still image, a text image, and a video image.

The second display driver 420b drives the second display panel 320 to display an image based on a command of the controller 460. In this example, the image displayed on the second display panel 320 includes at least one of a still image and a text image.

The communication unit 440b performs at least one of wired communication and wireless communication.

The communication unit 440b may access the Internet directly using a wireless Internet protocol or access the Internet using various browsing programs.

The communication unit 440b may receive various types of content information from an external server (not shown) through Internet communication, and transmit internal information of a terminal device to the outside of the terminal device.

The storage 450b stores a reference illumination level, APP information, and the content information.

The storage 450b may also store information about a voltage applied to the first and second electrodes 323 and 324 of the second display panel 320 when a still image is displayed.

The controller 460 determines whether the command input to the input unit 200 is a content execute command, a text display command, or a still image display command.

When a still image is displayed, the controller 460 applies a voltage for image display to the first and second electrodes 323 and 324 of the second display panel 320 and cuts off the voltage applied to the first and second electrodes 323 and 324 of the second display panel 320 after a certain period of time has passed.

As described above, the second display panel 320 has an image memory function and thus may maintain an image to be displayed even when a voltage applied to the two electrodes is cut off.

The controller 460 controls operations of the first and second light sources 340 and 328 and operations of the first and second display panels 310 and 320 based on at least one of the illumination level detected by the illumination level detector, the disposition mode, and the type of image.

A detailed description thereof is now given.

If the disposition mode is an overlapping mode and the type of image to be displayed includes a video image, the controller 460 controls operation of the first display panel 310 to display the video image.

If the disposition mode is an overlapping mode and the type of image to be displayed includes a still image only, the controller 460 compares the current illumination level to the reference illumination level, controls operations of the second light source 328 and the second display panel 320 to display the still image if the detected illumination level is less than the reference illumination level, and controls only operation of the second display panel 320 to display the still image if the detected illumination level is equal to or greater than the reference illumination level. As described above, when the detected illumination level is less than the reference illumination level, the still image may be displayed using the first display panel 310.

If the disposition mode is an extended mode and a video image is to be displayed, the controller 460 controls operation of the first display panel 310 to display the video image.

If the disposition mode is an extended mode and a still image is to be displayed, the controller 460 compares the current illumination level to the reference illumination level, controls operations of the second light source 328 and the second display panel 320 to display the still image if the detected illumination level is less than the reference illumination level, and controls only operation of the second display panel 320 to display the still image if the detected illumination level is equal to or greater than the reference illumination level.

If the disposition mode is an extended mode and an image to be displayed includes a video image and a still image, the controller 460 controls the first display panel 310 to display the video image, and controls the second display panel 320 to display the still image. In this example, the controller 460 compares the current illumination level to the reference illumination level, controls operations of the second light source 328 and the second display panel 320 if the detected illumination level is less than the reference illumination level, and controls only operation of the second display panel 320 if the detected illumination level is equal to or greater than the reference illumination level.

Alternatively, if the disposition mode is an extended mode and a still image is to be displayed, the controller 460 may control the first display panel 310 to operate in an off mode or to provide auxiliary light and control the second display panel 320 to display the still image.

When an image is displayed on the first display panel 310, the first light source driver 470 drives the first light source 340 provided with the first display panel 310. When the first display panel 310 is a self-emissive display panel, the first light source 340 and the first light source driver 470 may be omitted.

When an image is displayed on the second display panel 320 at an illumination level less than the reference illumination level, the second light source driver 480 drives the second light source 328 provided at a side of the second display panel 320.

Figure 19:
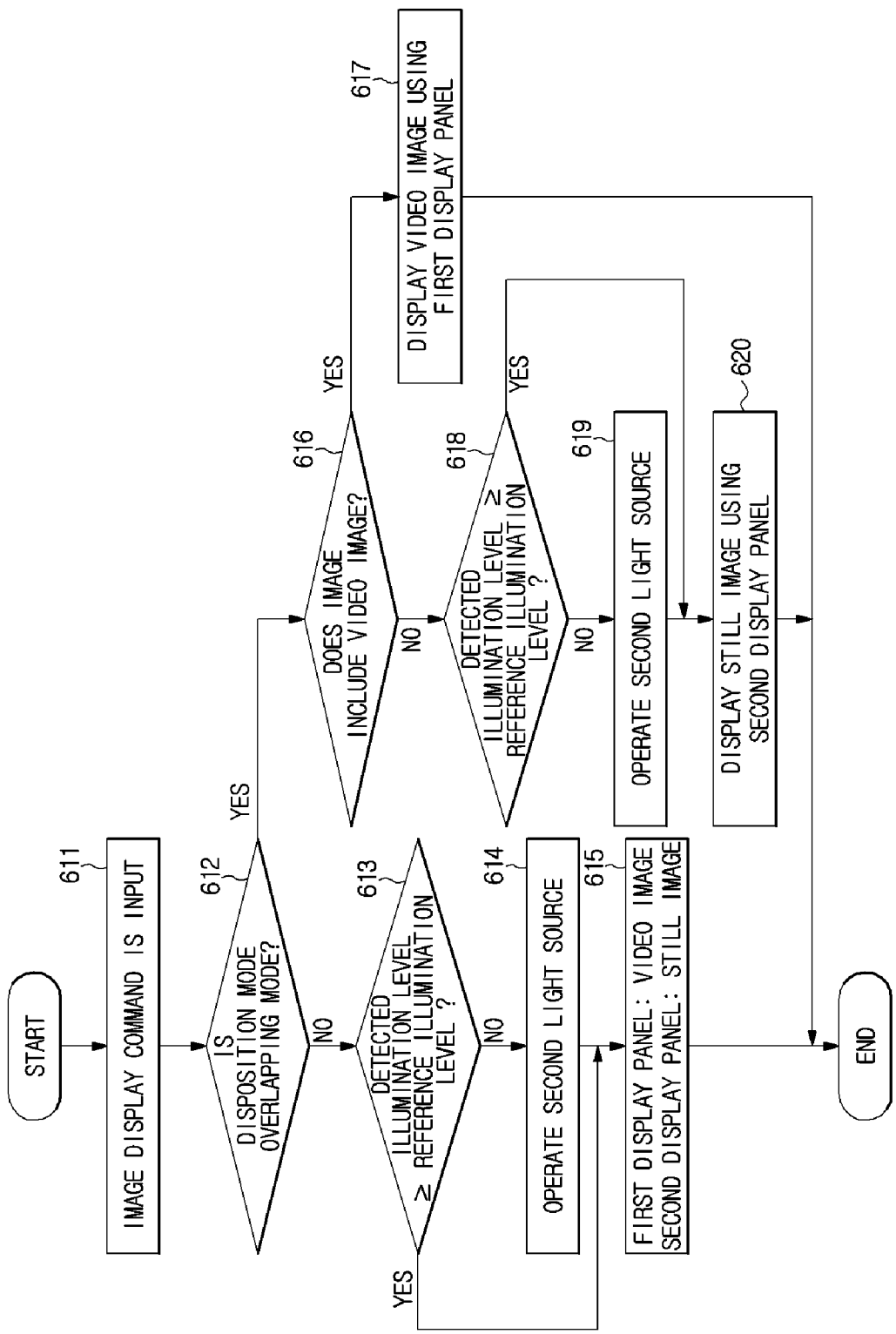
FIG. 19 is a flowchart of a method for controlling the display device, according to an embodiment.

FIG. 19 is a flowchart of a method for controlling the smartphone 1 including the display device 300, according to an embodiment. The method of FIG. 19 is now described in conjunction with FIGS. 20 and 21.

When the smartphone 1 is powered on and is not in use by a user, the display device 300 of the smartphone 1 executes a standby mode. When the smartphone 1 is powered off, the display device 300 of the smartphone 1 executes a power off mode.

When a power button is manipulated in a standby mode or a power off mode, the display device 300 of the smartphone 1 generates a signal corresponding to the manipulated power button and displays an initial image of an operation mode. In this example, a disposition mode of the first and second display panels 310 and 320 is an overlapping mode.

Here, the initial image is a still image to be displayed for a certain period of time or more, for example, a main screen, a standby screen, or a lock screen.

The display device 300 of the smartphone 1 detects a current illumination level using the detector 500 immediately before the initial image is displayed, compares the detected illumination level to a reference illumination level, operates the second light source 328 if the detected illumination level is less than the reference illumination level, and displays the initial image on the second display panel 320 using light generated by the second light source 328.

Otherwise, if the detected illumination level is equal to or greater than the reference illumination level, the display device 300 displays the initial image on the second display panel 320 using an external light source.

When the initial image is displayed on the second display panel 320, the first display panel 310 executes a power off mode or a standby mode to maintain its display surface black and thus absorbs light incident on the second display panel 320 but not used as image forming light.

As described above, the display device 300 may minimize a display surface thereof for a lock screen or a standby screen by disposing the first and second display panels 310 and 320 in an overlapping mode, and reduce power consumption by displaying a user-designated initial image on the second display panel 320.

Furthermore, upon determining that the initial image includes a video image, the display device 300 drives the first display panel 310 to display the initial image. In this example, the second display panel 320 operates in a transparent state which is a homeotropic state.

The display device 300 may execute a standby mode in an extended mode.

If there is no input signal while the initial image is being displayed, the display device 300 is switched to a standby mode and stops operations of the first and second display panels 310 and 320.

Otherwise, if an image display command is input to the input unit 200 (611) while the initial image is being displayed, the display device 300 determines whether the disposition mode of the first and second display panels 310 and 320 is an overlapping mode (612).

Then, upon determining that the disposition mode is not an overlapping mode, the display device 300 determines whether an image to be displayed includes a video image or includes a still image only.

Here, the determining of whether a still image is to be displayed includes determining whether a command input to the input unit 200 includes a command to execute an APP to input/output text such as news, articles, or notes, a command to display a keypad to execute a call command, or a command to display photos, or determining whether the type of content is still image content.

The display device 300 displays an image on at least one of the first and second display panels 310 and 320 based on a result of determining the type of image.

Specifically, if two images are to be displayed in an extended mode and if one is a video image and the other is a still image, the display device 300 displays the video image on the first display panel 310 and displays the still image on the second display panel 320 (615). In this example, when the still image is displayed on the second display panel 320, the controller 460 controls operation of the detector 500 to detect a current illumination level, and compares the detected illumination level to the reference illumination level. In this example, the display device 300 determines whether the detected illumination level is equal to or greater than the reference illumination level (613).

Then, if the detected illumination level is less than the reference illumination level, the display device 300 operates the second light source 328 (614), and displays the still image on the second display panel 320 using light generated by the second light source 328. Otherwise, if the detected illumination level is equal to or greater than the reference illumination level, the display device 300 displays the still image on the second display panel 320 using external light, and displays the video image on the first display panel 310 (615).

In this example, when the still image is displayed at an illumination level less than the reference illumination level, the display device 300 displays the still image on the second display panel 320 by applying a voltage to the first and second electrodes 323 and 324 of the second display panel 320 based on image information to be displayed, and cuts off the voltage applied to the first and second electrodes 323 and 324 of the second display panel 320 if a certain period of time has passed after the still image is displayed on the second display panel 320.

Figure 20:
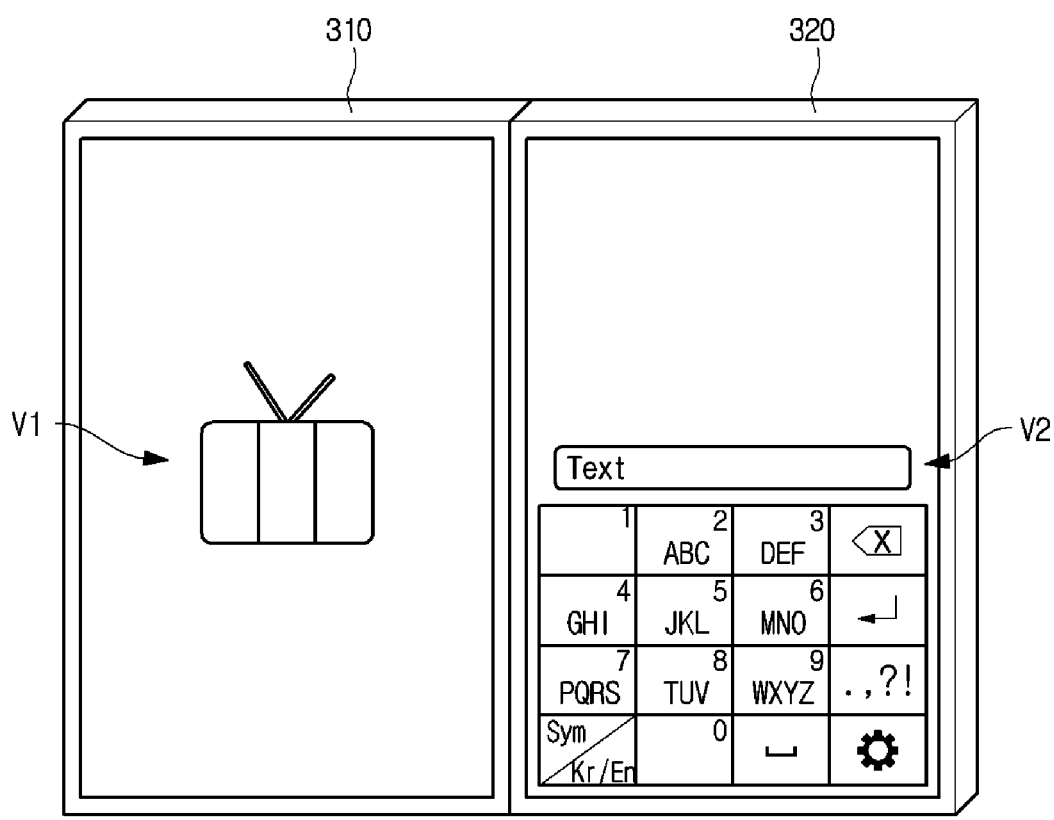
FIGS. 20 and 21 are schematic views showing image display of the display device, according to an embodiment.

As illustrated in FIG. 20, if an image to be displayed includes a digital multimedia broadcasting (DMB) image V1 which is a video image, and a keyboard image V2 for text input, which is a still image, the DMB image V1 is displayed on the first display panel 310 and the keyboard image V2 is displayed on the second display panel 320.

Figure 21:
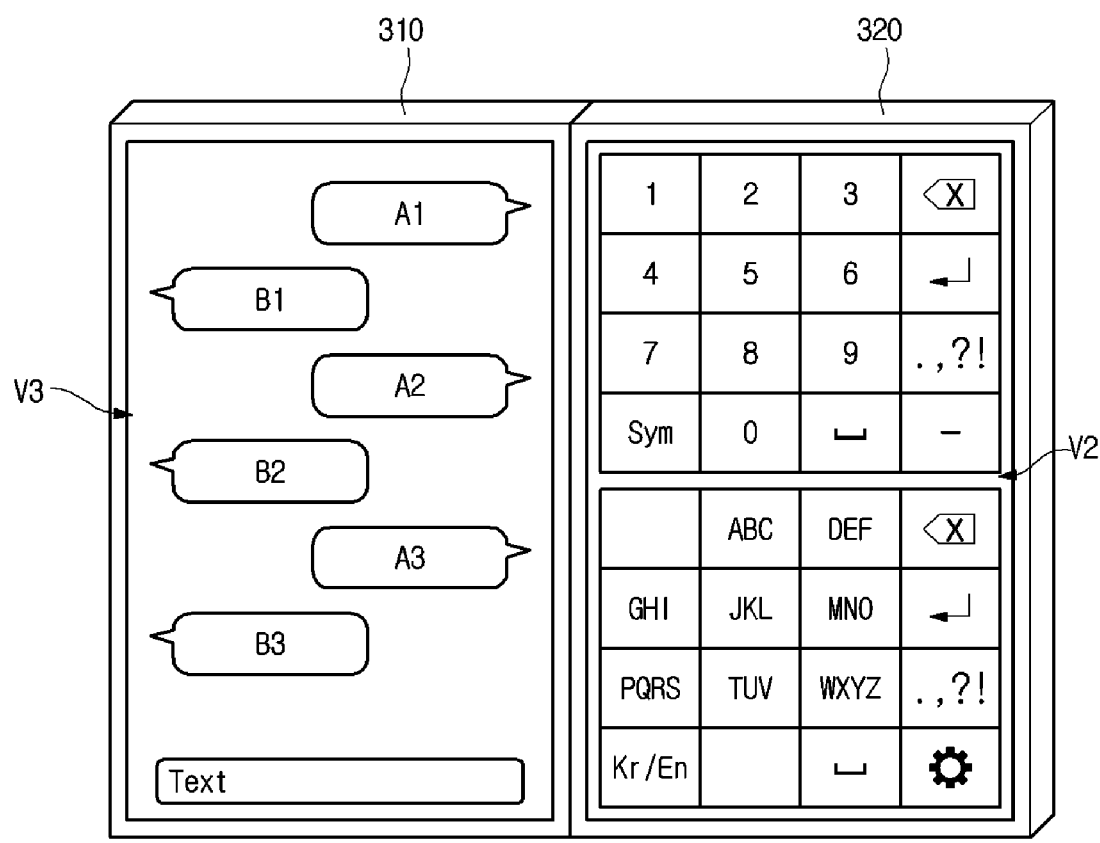

Alternatively, as illustrated in FIG. 21, an image to be displayed includes a chat window image V3 to display input text in real time, and the keyboard image V2. The chat window image V3 is displayed on the first display panel 310 and the keyboard image V2 is displayed on the second display panel 320.

As described above, the second display panel 320 is a reflective display panel having an image memory function and thus may maintain a schedule, note, or keyboard image to be displayed without driving a transmissive display panel.

Alternatively, display surfaces of the first and second display panels 310 and 320 may be pivoted to locate the first display panel 310 at an upper side and the second display panel 320 at a lower side, and then a video image may be displayed on the first display panel 310 and a QWERTY-type keyboard image may be displayed on the second display panel 320.

As such, text may be easily input.

If a video image is to be displayed, the display device 300 displays the video image on the first display panel 310. In this example, the second display panel 320 operates in a transparent state which is a homeotropic state.

Otherwise, if a still image is to be displayed, the display device 300 controls operation of the detector 500 to detect a current illumination level, compares the detected illumination level to the reference illumination level, operates the second light source 328 if the detected illumination level is less than the reference illumination level, and displays the still image on the second display panel 320 using light generated by the second light source 328.

As described above, if a still image is to be displayed, the display device 300 displays the still image on the second display panel 320. In this example, the display device 300 determines whether to operate the second light source 328, based on the detected illumination level, and displays the still image on the second display panel 320 using the second light source 328 or external light.

If a video image is to be displayed, the display device 300 displays the video image using the first display panel 310.

Upon determining that the disposition mode is an overlapping mode, the display device 300 determines whether the type of image to be displayed includes a video image or includes a still image only (616), and displays the image on any one of the first and second display panels 310 and 320 based on a result of determination.

The determining of whether a still image is to be displayed includes determining whether a command input to the input unit 200 includes a command to execute an APP to input/output text such as news, articles, or notes, a command to display a keypad to execute a call command, or a command to display photos, or determining whether the type of content is still image content.

Specifically, if the type of image to be displayed includes a video image, the display device 300 displays the video image on the first display panel 310 (617). In this example, the second display panel 320 operates in a transparent state which is a homeotropic state.

Otherwise, if the type of image to be displayed includes a still image only, the display device 300 controls operation of the detector 500 to detect a current illumination level, and compares the detected illumination level to the reference illumination level. In this example, the display device 300 determines whether the detected illumination level is equal to or greater than the reference illumination level (618).

Then, if the detected illumination level is less than the reference illumination level, the display device 300 operates the second light source 328 (619) and displays the still image on the second display panel 320 using light generated by the second light source 328 (620).

Otherwise, if the detected illumination level is equal to or greater than the reference illumination level, the display device 300 displays the still image on the second display panel 320 using external light.

If the type of image to be displayed includes a video image, the display device 300 displays the video image on the first display panel 310. In this example, the second display panel 320 is driven in a transparent state which is a homeotropic state. As such, the video image displayed on the first display panel 310 passes through the second display panel 320 and is displayed on a display surface of the display device 300.

Otherwise, if the type of image to be displayed is a still image, the display device 300 controls operation of the detector 500 to detect a current illumination level, compares the detected illumination level to the reference illumination level, operates the second light source 328 if the detected illumination level is less than the reference illumination level, and displays the still image on the second display panel 320 using light generated by the second light source 328.

As described above, if a still image is to be displayed, the display device 300 displays the still image on the second display panel 320. In this example, the display device 300 determines whether to operate the second light source 328, based on the detected illumination level, and displays the still image on the second display panel 320 using the second light source 328 or external light.

Then, if the user inputs a command to terminate a currently executed program, the display device 300 switches the first and second display panels 310 and 320 to a standby mode.

That is, if the user inputs a command to display another image or inputs a termination command while a video image is being displayed using the first display panel 310, the display device 300 cuts off a voltage applied to the first display panel 310.

Otherwise, if the user inputs a command to display another image or inputs a termination command while a still image is being displayed using the second display panel 320, the display device 300 changes the level of a voltage applied to the first and second electrodes 323 and 324 of the second display panel 320 to change the orientation of the liquid crystal layer 327 of the second display panel 320, thereby changing or terminating display of the still image displayed on the second display panel 320.

Furthermore, if the second display panel 320 operates using light of the second light source 328, the display device 300 switches off the second light source 328.

As described above, when a still image is displayed on the display device 300, driving power may be reduced by displaying the still image using a reflective display panel.

Figure 22:
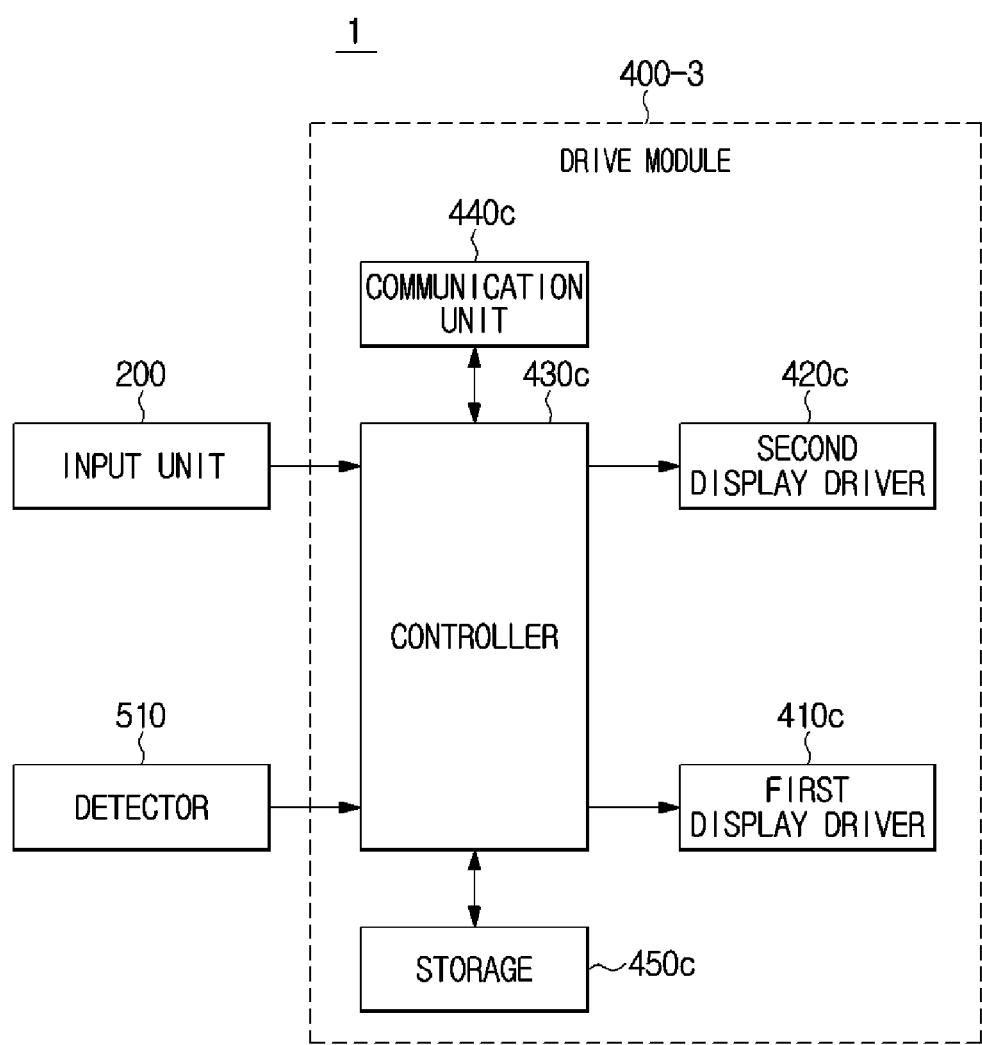
FIG. 22 is a block diagram showing control of the display device, according to an embodiment.

FIG. 22 is a block diagram showing control of the smartphone 1 including the display device 300, according to an embodiment. The smartphone 1 includes the input unit 200, a drive module 400-3, and a detector 510.

The input unit 200 receives input of a user command and transmits an input signal to the drive module 400-3. The input unit 200 may operate in at least one of a button mode and a touch mode.

Examples of the command input to the input unit 200 include a search command, a call command, a content execute command, etc.

The input unit 200 may directly receive input of a power saving mode from the user.

Here, the power saving mode is an operation mode to reduce power consumed for driving of the display device 300, and is executed by the command input to the input unit 200 or is automatically executed when a charge amount of a battery is less than a reference battery charge amount.

The drive module 400-3 controls operations of the first display panel 310 and the second display panel 320 based on the command input to the input unit 200 and information detected by the detector 510.

Here, the detector 510 detects the charge amount of the battery included in the display device 300 and generates and transmits a signal corresponding to the detected charge amount of the battery to the drive module 400-3.

The detector 510 may include a voltage detector to detect a voltage of the battery and detect a remaining charge amount of the battery.

The detector 510 may further include an illumination level detector to detect an illumination level of the display device 300.

The drive module 400-3 includes the first display driver 410c, the second display driver 420c, a controller 430c, a communication unit 440c, and a storage 450c.

Since the first display driver 410c, the second display driver 420c, and the communication unit 440c according to an embodiment are the same as the first display driver 410a, the second display driver 420a, and the communication unit 440a according to an embodiment, a description thereof is omitted.

The controller 430c compares the charge amount of the battery detected by the detector 510 to the reference battery charge amount and executes a power saving mode if the detected charge amount of the battery is less than the reference battery charge amount.

The controller 430c controls operation of the first display panel 310 to display an image when a power saving mode is executed.

The controller 430c executes a normal mode if the charge amount of the battery is equal to or greater than the reference battery charge amount and controls operation of the second display panel 320 to display an image when a normal mode is executed.

The controller 430c switches from an operation mode to a power saving mode if the power saving mode is input to the input unit 200 and controls operation of the second display panel 320 to display an image when a power saving mode is executed.

Alternatively, when a normal mode is executed, the controller 430c may compare an illumination level detected by the detector 510 to a reference illumination level, control operation of the first display panel 310 to display an image if the detected illumination level is less than the reference illumination level, and control operation of the second display panel 320 to display an image if the detected illumination level is equal to or greater than the reference illumination level.

The controller 430c may control operation of the second display panel 320 to display an image even if the detected illumination level is equal to or greater than the reference illumination level when a power saving mode is executed.

Alternatively, when a power saving mode is executed, to display an image at an illumination level less than the reference illumination level, the controller 430 may control operation of the first display panel 310 to generate auxiliary light and control operation of the second display panel 320 to display an image.

In this example, the first display panel 310 functions as an absorption layer of the second display panel 320 while providing auxiliary light to the second display panel 320.

Alternatively, auxiliary light may not be provided to the second display panel 320 by the first display panel 310 but provided by using a separate auxiliary light source (not shown).

The storage 450c stores the reference battery charge amount, the reference illumination level, APP information, and content information.

The storage 450c may also store information about a voltage applied to the first and second electrodes 323 and 324 of the second display panel 320 when a still image is displayed.

Figure 23:
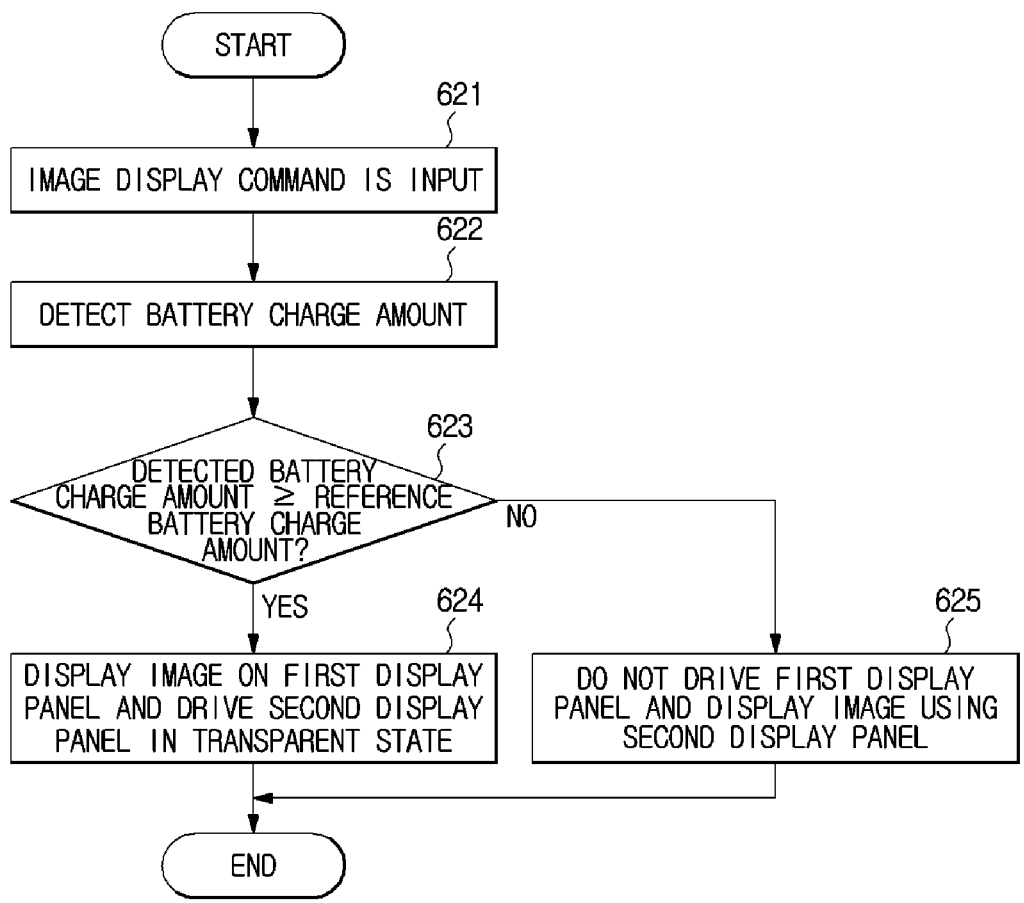
FIG. 23 is a flowchart of a method for controlling the display device, according to an embodiment.

FIG. 23 is a flowchart of a method for controlling the smartphone 1 including the display device 300, according to an embodiment. The method of FIG. 23 is now described in conjunction with FIGS. 24 to 26B.

When the smartphone 1 is powered off, the display device 300 of the smartphone 1 executes a power off mode. When the smartphone 1 is powered on, the display device 300 of the smartphone 1 executes a standby mode until a physical button (e.g. a power button and a home button) is manipulated.

When a power button is manipulated in a standby mode or a power off mode, the display device 300 of the smartphone 1 generates a signal corresponding to the manipulated power button and displays an initial image. When the user selects at least one program within a certain time after displaying the initial image, the display device 300 of the smartphone 1 executes the selected program. In this example, the display device 300 displays an image of the executed program.

Here, the initial image includes a main screen, a standby screen, or a lock screen, and the program selected by the user includes an APP, a call, text, etc.

If an image display command according to an initial image display command or a program execute command is input (621), the display device 300 controls operations of the first display panel 310 and the second display panel 320 based on the charge amount of the battery.

A detailed description thereof is now given.

If the image display command is input (621), the display device 300 detects the charge amount of the battery using the detector 510 (622), and compares the detected charge amount of the battery to the reference battery charge amount. In this example, the display device 300 determines whether the detected charge amount of the battery is equal to or greater than the reference battery charge amount (623).

Figure 24A:
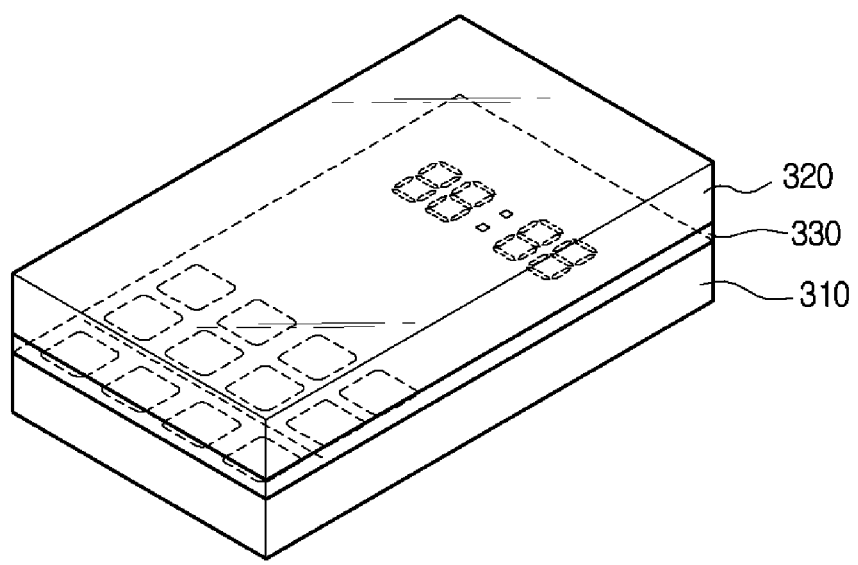
FIGS. 24A and 24B show views showing image display of the display device corresponding to the control flow of the display device illustrated in FIG. 23, according to an embodiment.

As illustrated in FIG. 24A, the display device 300 displays a still image on the first display panel 310 if the detected charge amount of the battery is equal to or greater than the reference battery charge amount. In this example, the second display panel 320 is driven in a transparent state (624).

Otherwise, if the detected charge amount of the battery is less than the reference battery charge amount, the display device 300 switches the operation mode from a normal mode to a power saving mode.

Figure 24B:
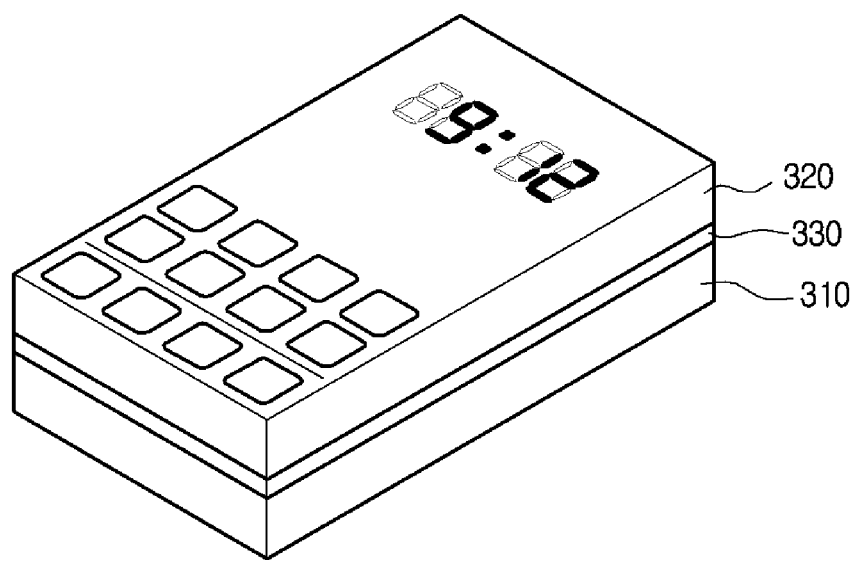

As illustrated in FIG. 24B, when a power saving mode is executed, the display device 300 drives the second display panel 320 to display a still image, and does not drive the first display panel 310 (625).

That is, the first display panel 310 in a power off mode or a standby mode is maintained to be black and thus absorbs light incident on the second display panel 320, which is not used as image forming light.

The above described method may be applicable to a television or a monitor of a personal computer (PC).

That is, when a power saving mode is executed, the television or the monitor of the PC may display a standby image using the second display panel 320 which is a reflective display panel, in a power saving mode.

Figure 25:
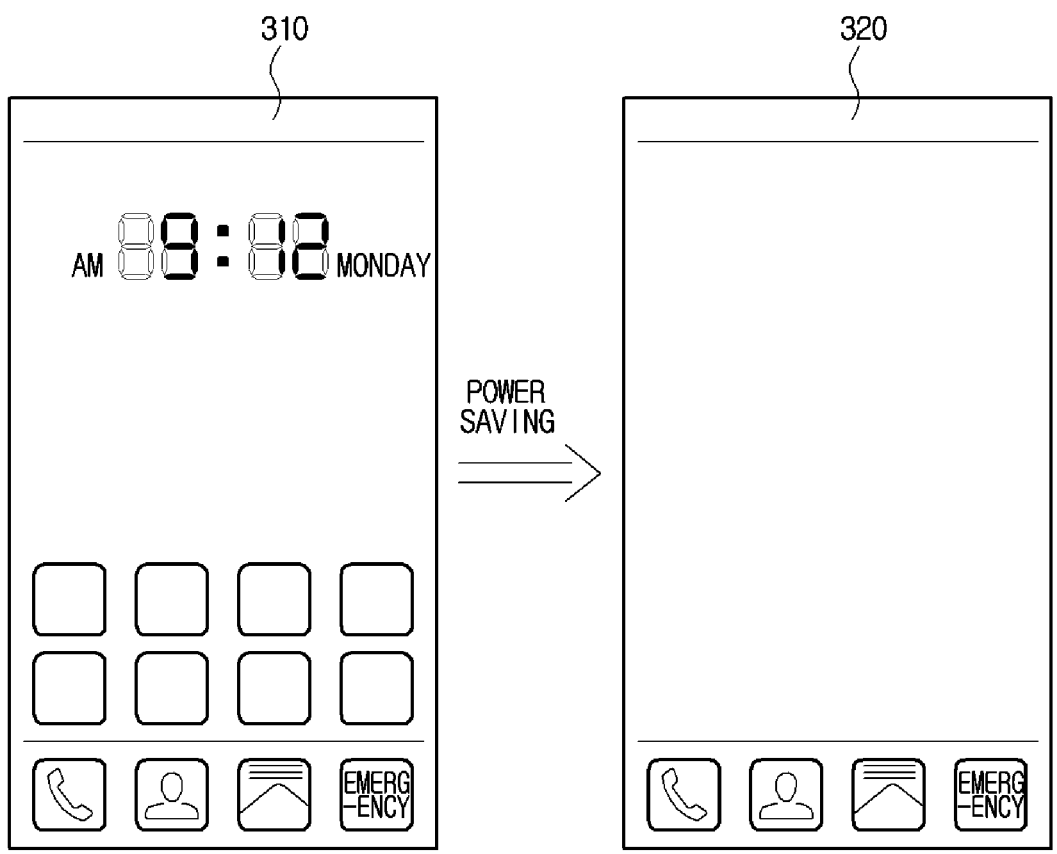
FIGS. 25, 26A and 26B are schematic views showing image display of the display device, according to an embodiment.
Figure 26A:
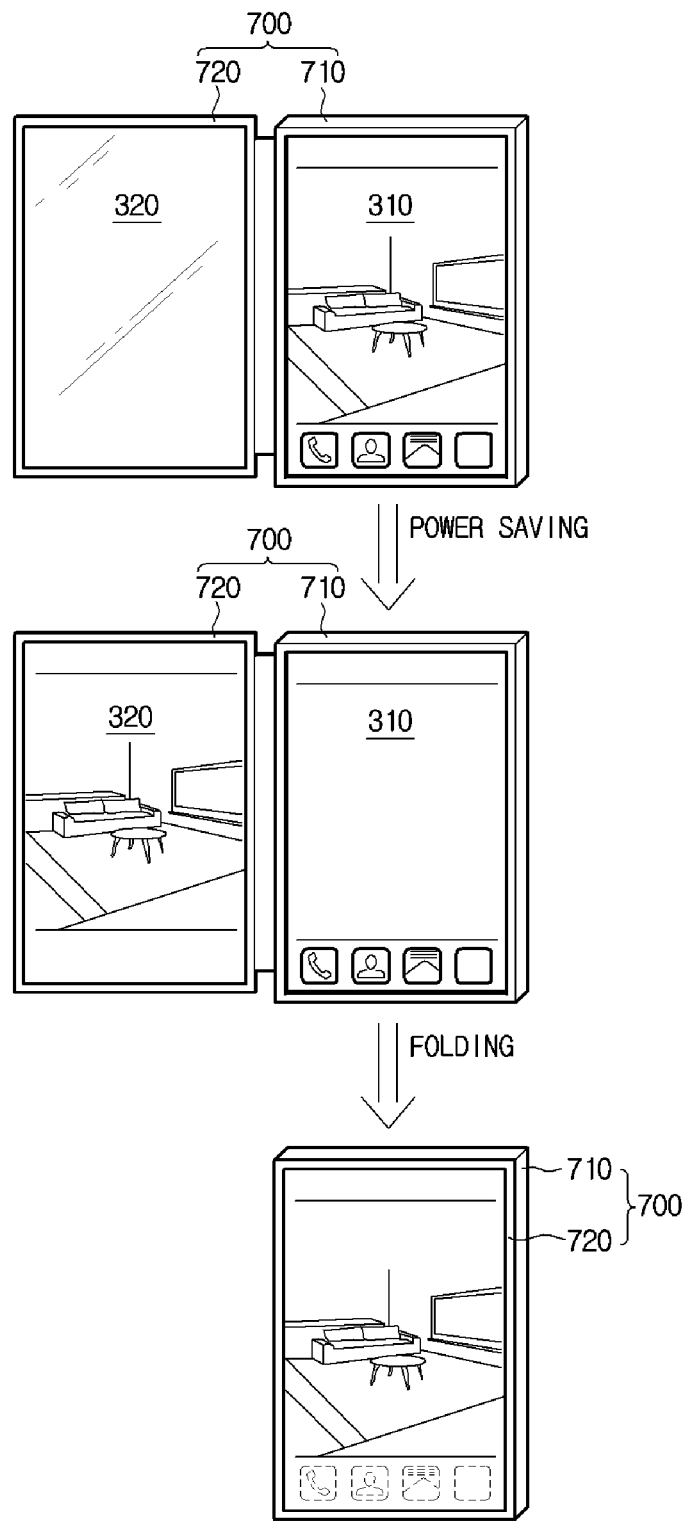
Figure 26B:
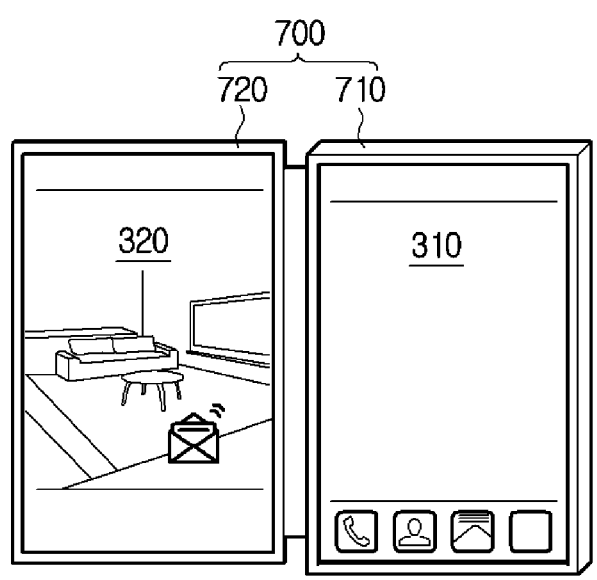

FIGS. 25, 26A and 26B are schematic views showing image display of the display device 300 in a power saving mode, according to an embodiment.

As illustrated in FIG. 25, the display device 300 forms a structure in which the first display panel 310 and the second display panel 320 are stacked.

The display device 300 displays a background image and icon images of a main menu on the first display panel 310 if the detected charge amount of the battery is equal to or greater than the reference battery charge amount. In this example, the second display panel 320 is driven in a transparent state.

Otherwise, the display device 300 displays only the icon images of the main menu needed by the user on the second display panel 320 if the detected charge amount of the battery is less than the reference battery charge amount. In this example, the first display panel 310 is not driven.

The display devices 300 of FIGS. 26A and 26B each are examples in which the first display panel 310 and the second display panel 320, which are separately mounted. The first display panel 310 and the second display panel 320 are mounted on different regions of a cover 700.

In this example, the first display panel 310 is detachably mounted on a first region 710 of the cover 700, and the second display panel 320 is fixedly mounted on a second region 720 of the cover 700.

Here, the first region 710 and the second region 720 of the cover 700 are foldable.

That is, the second display panel 320 may be placed on the first display panel 310 due to a folding operation of the cover 700.

As illustrated in FIG. 26A, the display device 300 displays the background image and the icon images of the main menu on the first display panel 310 if the detected charge amount of the battery is equal to or greater than the reference battery charge amount. In this example, the second display panel 320 is driven in a transparent state to function as a transparent cover.

Otherwise, the display device 300 executes a power saving mode if the detected charge amount of the battery is less than the reference battery charge amount. In this example, the display device 300 displays only the icon images of the main menu needed by the user on the first display panel 310 and displays the background image (e.g. a home image, a lock image, etc.) on the second display panel 320.

When displaying the background image on the second display panel 320, the display device 300 displays an inverse image of the background image which is displayed on the first display panel 310 on the second display panel 320 such that it may easily be recognized by the user.

When the user executes an operation for covering the cover 700, that is, when the second display panel 320 is located on the first display panel 310, in a power saving mode, the display device 300 may display both the background image and the icon images on the same space.

As illustrated in FIG. 26B, the display device 300 may check whether or not a text message, a social network service (SNS), or the like has been received, in a power saving mode, and display the background image of the second display panel 320 by overlaying received information in text or an icon if the text message or the SNS is received.

Figure 27:
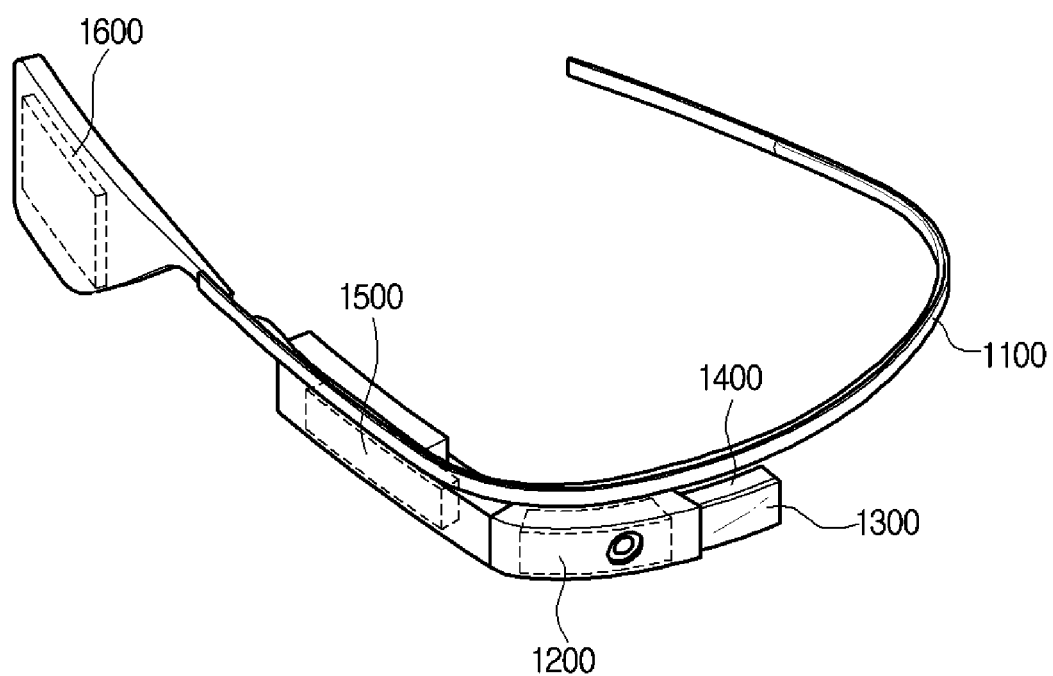
FIG. 27 is a schematic view of a display device according to an embodiment.

FIG. 27 is a schematic view of a display device 1000 according to an embodiment.

The display device 1000 illustrated in FIG. 27 is a head mounted display (HMD) device which is mountable on a head of a user. A description thereof is now given in conjunction with FIGS. 28 to 30.

The display device 1000 receives an image signal from an external device, generates image light based on the received image signal, and then outputs the generated image light to the user's eyes.

Further, the display device 1000 may receive a audio signal from the external device, and output the received audio signal.

The display device 1000 includes a glasses-shaped body 1100 having a mountable structure to be mounted on the head of the user, a first display unit 1200 provided at a side of the body 1100 to output the image light, a second display unit 1300 provided adjacent to the first display unit 1200 to display an image, and a light guide unit 1400 provided adjacent to the first display unit 1200 to guide light of the image displayed on the first display unit 1200 to the user's eyes.

Further, the display device 1000 includes a drive module 1500 to drive selectively the first display unit 1200 and the second display unit 1300, and a power supply 1600 which is a battery to supply driving power to the first display unit 1200, the second display unit 1300, and the drive module 1500.

The body 1100 may have elasticity.

The first display unit 1200 may include a projector to output the image light in a projection method.

The first display unit 1200 includes a housing, a light source disposed inside the housing, and an optical unit to generate image light using the light source and an image signal and to enlarge and project the generated image light.

The optical unit includes an optical modulator to form an image by applying colors to the light of the light source and a projection lens to enlarge and project the image.

Displaying methods of the first display unit 1200 may be divided into a liquid crystal display (LCD) method, a digital light processing (DLP) method, and a liquid crystal on silicon (LCoS) method according to a type of a spatial light modulator (SLM) in the optical unit.

The first display unit 1200 may display the image using the LCD method, the DLP method, or the LCoS method.

Here, the LCD method enlarges and projects light generated from the light source to the projection lens through an LCD panel formed by a plurality of mirrors and prisms.

The DLP method outputs the image light using a digital micro mirror device (DMD), and more specifically, forms a black-and-white image while reflecting the light at different reflection angles of tens of thousands of tiny mirrors (DMD) according to an image signal, and forms a color image while sequentially adding up the colors using a color wheel.

The LCoS method forms an image by reflecting light by a mirror in the device using a polarization phenomenon of the liquid crystal.

The second display unit 1300 includes a reflective display panel which may be stacked on the light guide unit 1400.

Thus, the light of the image displayed on the second display unit 1300 may be guided to the user's eyes through a light path of the light guide unit 1400.

Here, since the reflective display panel is the same as the reflective display panel according to an embodiment, a description thereof is omitted.

The light guide unit 1400 has a reflector 1400a thereinside which is a transparent prism.

The light guide unit 1400 forms the light path of the image displayed on the first display unit 1200 and the second display unit 1300, and then guides the light of the image to the user's eyes.

Figure 28:
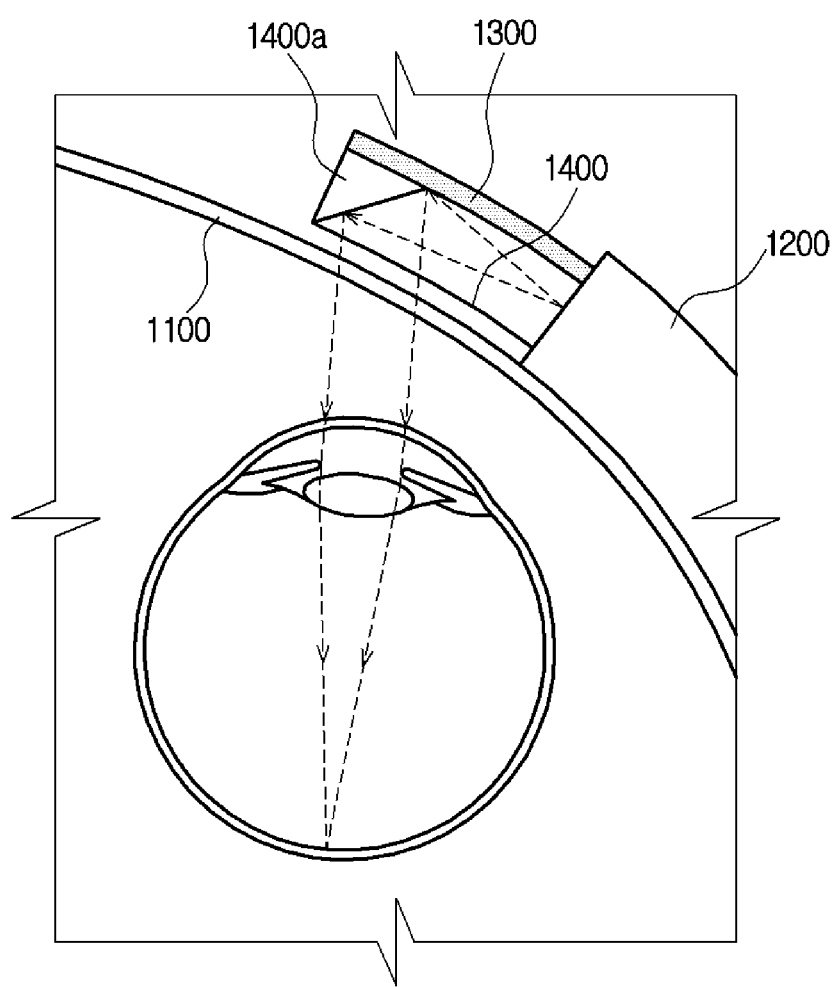
FIGS. 28 to 30 are views showing light paths of the display device illustrated in FIG. 27, according to an embodiment.

As illustrated in FIG. 28, if the light of the image displayed on the first display unit 1200 is incident, the light guide unit 1400 reflects the incident light of the image by the reflector 1400a, and then guides the reflected light to the user's eyes.

In this example, the second display unit 1300 is driven in a transparent state or a non-transparent state in which the image is not displayed. Alternatively, opacity of the second display unit 1300 may be adjusted when driven in a non-transparent state.

The second display unit 1300 transmits external light to the light guide unit 1400 when driven in a transparent state and blocks the external light transmitted to the light guide unit 1400 when driven in a non-transparent state.

Figure 29A:
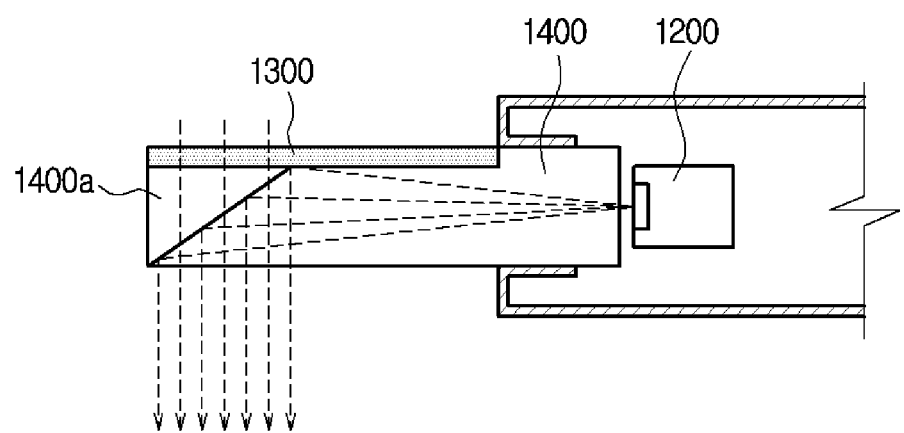

As illustrated in FIG. 29A, when an image is displayed on the first display unit 1200, light of the image displayed on the first display unit 1200 is incident on the light guide unit 1400 and the light guide unit 1400 reflects the incident light using the reflector 1400a such that the reflected light is transmitted to the user's eyes.

In this example, the light guide unit 1400 guides the external light transmitted to the second display unit 1300 to the user's eyes.

Figure 29B:
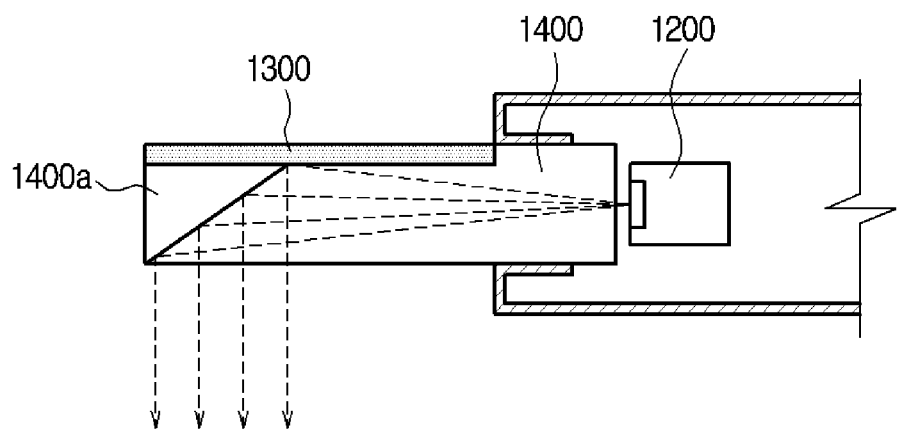

As illustrated in FIG. 29B, when the second display unit 1300 is driven in a non-transparent state, the light guide unit 1400 blocks the external light incident thereinside and guides only the light of the image displayed on the first display unit 1200 to the user's eyes.

Figure 30:
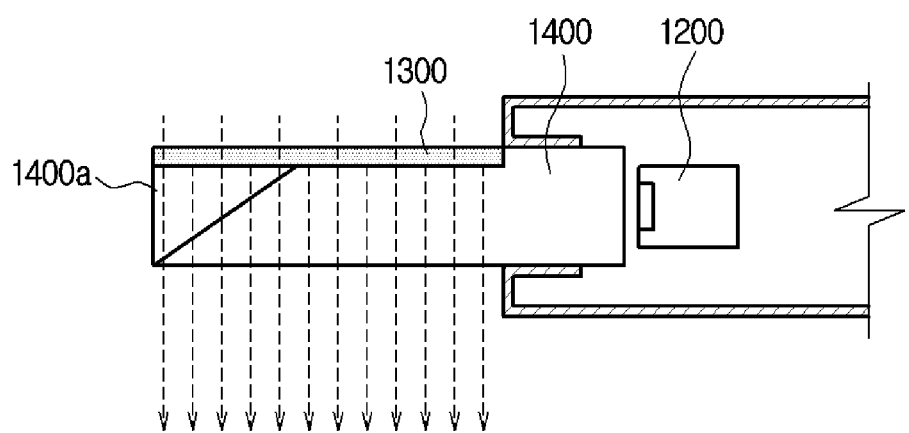

As illustrated in FIG. 30, when the image is not displayed on the first display unit 1200 and is displayed on the second display unit 1300, the light guide unit 1400 guides the light of the image displayed on the second display unit 1300 to the user's eyes.

The light guide unit 1400 also guides the external light incident through a transparent part of the second display unit 1300 to the user's eyes.

The drive module 1500 is disposed inside the housing, is supplied power from the power supply 1600, and drives the first display unit 1200 and the second display unit 1300. A description thereof is given below.

The power supply 1600 is disposed in the body 1100 to supply power to the first display unit 1200, the second display unit 1300, and the drive module 1500.

Figure 31:
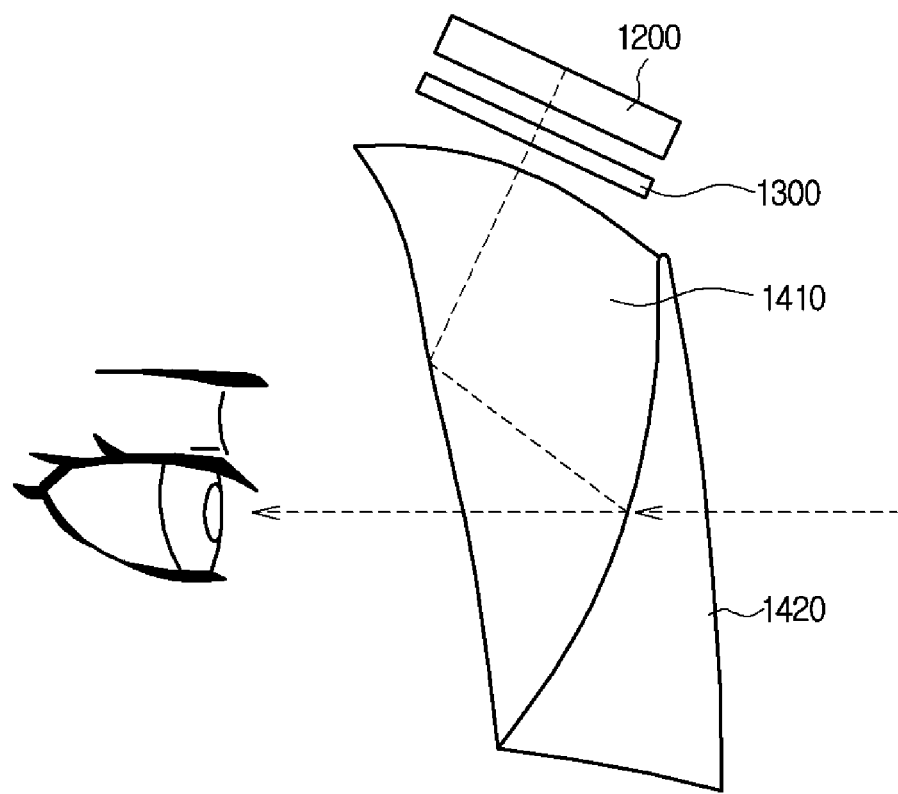
FIG. 31 is a schematic view of a display device according to an embodiment.

FIG. 31 is a schematic view of a display device according to an embodiment.

The display device illustrated in FIG. 31 is a HMD device which is mountable on a head of a user. The display device includes a light guide unit 1410 disposed adjacent to a first display unit 1200 and a second display unit 1300 disposed between the first display unit 1200 and the light guide unit 1410.

The display device may further include an auxiliary lens 1420, which is disposed adjacent to the light guide unit 1410 and external light is incident thereon.

The first display unit 1200 may include a projector to output image light in a projection method.

The first display unit 1200 includes a housing, a light source disposed inside the housing, and an optical unit to generate image light using the light source and an image signal and to enlarge and project the generated image light.

The optical unit includes an optical modulator to form an image by applying colors to light of the light source and a projection lens to enlarge and project the image.

The optical modulator may be a micro display.

The second display unit 1300 includes a reflective display panel.

Since the reflective display panel is the same as the reflective display panel according to an embodiment, a description thereof is omitted.

The light guide unit 1410 includes a transparent prism.

The light guide unit 1410 forms a light path of an image displayed on the first display unit 1200 or the second display unit 1300, and then guides the light of the image to the user's eyes.

More specifically, when the light of the image displayed on the first display unit 1200 is incident, the light guide unit 1410 reflects the incident light of the image to move to the user's eyes. In this example, the second display unit 1300 is driven in a transparent state.

That is, light of an actual environment and the light of the image displayed on the first display unit 1200 pass through the light guide unit 1410 and then the light is transmitted to the user's eyes.

When the image is displayed on the second display unit 1300, the light guide unit 1410 guides light of the image displayed on the second display unit 1300 to the user's eyes.

Alternately, the light of the actual environment may pass through a transparent part of the second display unit 1300 and the light guide unit 1410 and then the light may be transmitted to the user's eyes. In this example, the first display unit 1200 is not driven and does not display the light of the image.

Figure 32:
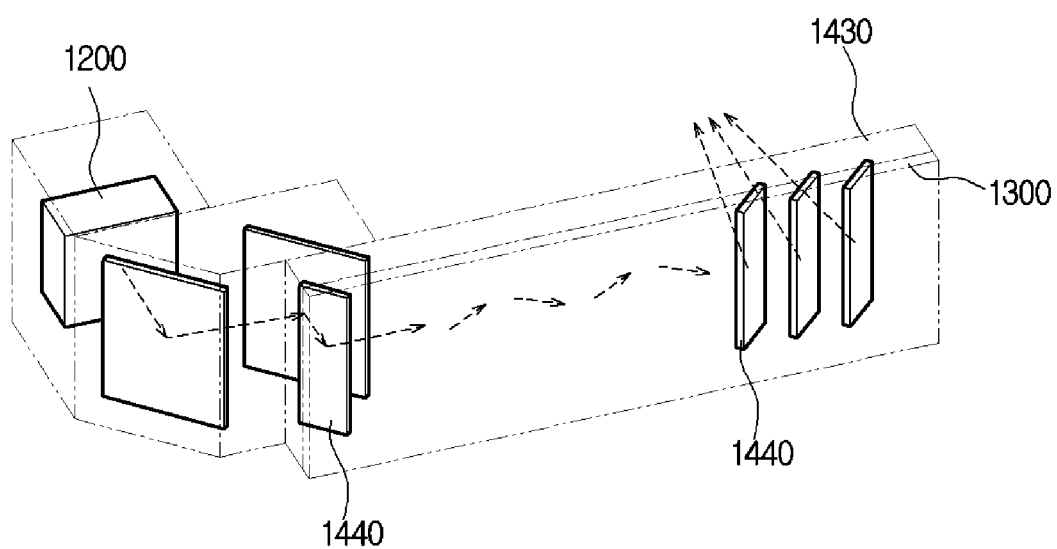
FIG. 32 is a schematic view of a display device according to an embodiment.

FIG. 32 is a schematic view of a display device according to an embodiment.

The display device illustrated in FIG. 32 includes a first display unit 1200 to display an image in a projection method, a light guide unit 1430 formed in a plate shape to guide light of the image displayed on the first display unit 1200 to the user's eyes, a plurality of mirrors 1440 disposed in the light guide unit 1430 to form a light path of the image light, and a second display unit 1300 stacked on the light guide unit 1430 and having a reflective display panel.

The reflective display panel is the same as the reflective display panel according to an embodiment, a description thereof is omitted.

The first display unit 1200 forms an image using a light source provided thereinside, and the second display unit 1300 forms an image by reflecting external light.

The first display unit 1200 includes a micro display panel. For example, the micro display panel is an LCoS device.

When an image is formed on the first display unit 1200, the display device guides light of the image formed on the first display unit 1200 to the user's eyes through the light guide unit 1430, and thus the user may view the image formed on the first display unit 1200.

In this example, the second display unit 1300 is driven in a transparent state or a non-transparent state in which the image is not displayed. Alternatively, opacity of the second display unit 1300 may be adjusted when driven in a non-transparent state.

When the image is not displayed on the first display unit 1200 and is displayed on the second display unit 1300, the display device guides light of the image displayed on the second display unit 1300 to the user's eyes through the light guide unit 1430, and thus the user may view the image displayed on the second display unit 1300.

Figure 33:
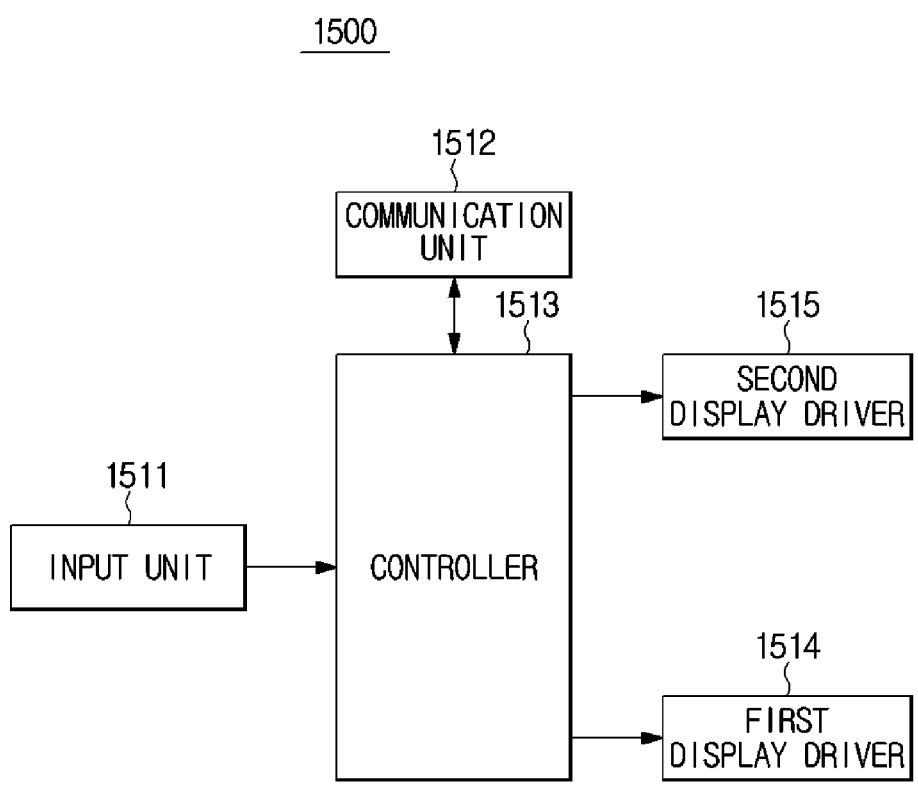
FIG. 33 is a block diagram showing control of the display device, according to an embodiment.

FIG. 33 is a block diagram showing control of the display device, according to an embodiment. The display device is applicable to a display device having a projective first display unit and a reflective second display unit, such as the display device illustrated in FIG. 27, the display device illustrated in FIG. 31, and the display device illustrated in FIG. 32.

The display device includes a drive module 1500 to drive the first display unit 1200 and the second display unit 1300 based on a command input to an input unit 1511. The drive module 1500 includes a communication unit 1512, a controller 1513, a first display driver 1514, and a second display driver 1515.

The input unit 1511 receives input of a user command and transmits an input signal to the drive module 1500. The input unit 1511 may operate in at least one of a button mode and a touch mode.

Examples of the command input to the input unit 1511 include a power on/off command, a function execute command, a content execute command, etc.

The drive module 1500 controls operations of the first display unit 1200 and the second display unit 1300 based on the command input to the input unit 1511 and information transmitted to the communication unit 1512.

The communication unit 1512 performs at least one of wired communication and wireless communication based on the user command or a command of the controller 1513.

The communication unit 1512 may receive various types of content information from an external device (not shown) through Internet protocol communication, and transmit information stored in a storage (not shown) to the outside of the storage.

When an operation command is input to the input unit 1511 or to the communication unit 1512, the controller 1513 controls execution of the operation command.

When an image display command is input to the input unit 1511 or to the communication unit 1512, the controller 1513 determines the type of image to be displayed, determines whether the type of image includes a video image, controls operation of the first display unit 1200 upon determining that the type of image includes the video image, and controls operation of the second display unit 1300 upon determining that the type of image includes a still image.

Further, the controller 1513 controls operation of the second display unit 1300 upon determining that the type of image includes only a text image or a still image.

Here, the first display unit 1200 displays at least one of a still image, a text image, and a video image and the second display unit 1300 displays at least one of a still image and a text image.

The first display driver 1514 drives the first display unit 1200 to display an image based on a command of the controller 1513. In this example, the image displayed on the first display unit 1200 includes at least one of a still image, a text image, and a video image.

The second display driver 1515 drives the second display unit 1300 to display an image based on a command of the controller 1513. In this example, the image displayed on the second display unit 1300 includes at least one of a still image and a text image.

The drive module 1500 may further include the storage (not shown) to store APP information and content information.

Figure 34:
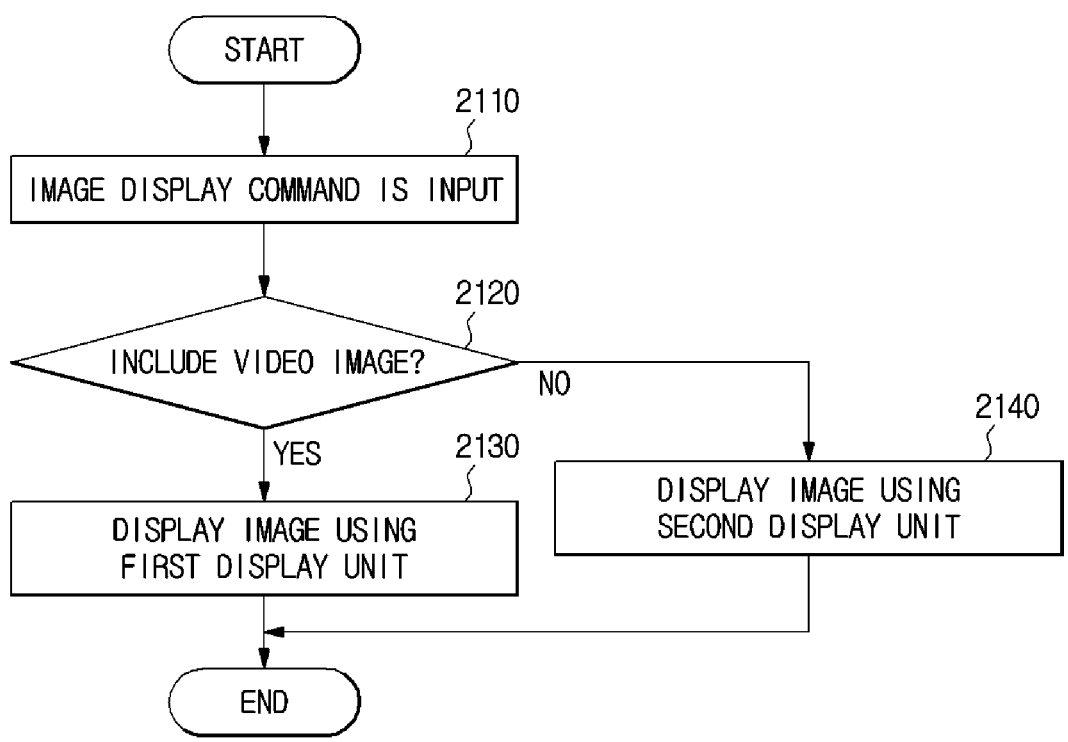
FIG. 34 is a flowchart of a method for controlling the display device illustrated in FIG. 33, according to an embodiment.

FIG. 34 is a flowchart of a method for controlling the display device illustrated in FIG. 33, according to an embodiment.

When the display device is powered on, and an operation command is input to the input unit or to the communication unit, the display device executes the operation command.

Here, the operation command includes a function execute command such as real-time location check, Internet, music listening, time, temperature check, voice message, text message, video recording, or the like and a content execute command.

The display device drives any one of the first display unit 1200 and the second display unit 1300 to display an image related to the operation command and guides light of the image displayed on the display unit in operation to the user's eyes.

More specifically, when the operation command is input, the display device determines that the command to display an image is input (2110), determines the type of image to be displayed based on the operation command, and determines whether a video image is included in the determined type of image (2120).

Upon determining that the type of image to be displayed includes the video image, the display device drives the first display unit 1200 and the second display unit 1300 to display the video image.

In this example, the first display unit 1200 displays the video image and the second display unit 1300 is driven in a transparent state which is a homeotropic state (2130).

Thus, light of the video image displayed on the first display unit 1200 is reflected by the light guide unit 1400 and then guided to the user's eyes, external light is transmitted to the second display unit 1300, and thus the user may view the image.

Alternatively, the display device may drive the second display unit 1200 in a non-transparent state when the image is displayed on the first display unit 1200. In this example, the second display unit 1300 blocks the external light incident on the light guide unit, and thus resolution of the image, which is displayed on the first display unit 1200 and transmitted to the user's eyes, may be improved.

Otherwise, upon determining that the type of image to be displayed does not include a video image but includes a still image only, the display device stops driving of the first display unit 1200 and displays the image on the second display unit 1300 (2140).

In this example, light of the image displayed on the second display unit 1300 passes through the light guide unit 1400 and then the light is transmitted to the user's eyes.

When external light is transmitted through a transparent part of the second display unit 1300, the user may view an image and an actual environment together.

Figure 35:
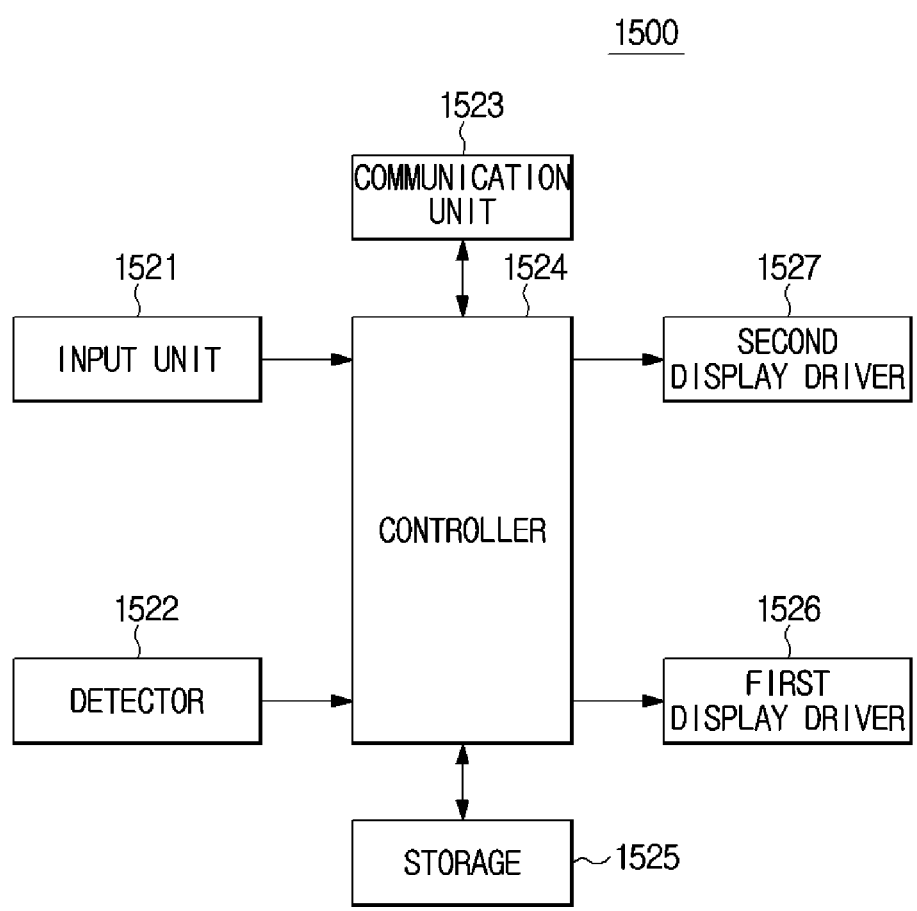
FIG. 35 is a block diagram showing control of the display device, according to an embodiment.

FIG. 35 is a block diagram showing control of the display device, according to an embodiment. The display device is applicable to a display device having a projective first display unit and a reflective second display unit, such as the display device illustrated in FIG. 27, the display device illustrated in FIG. 31, and the display device illustrated in FIG. 32.

The display device includes a drive module 1500 to drive the first display unit 1200 and the second display unit 1300 based on a command input to an input unit 1521 and detection information detected by the detector 1522. The drive module 1500 includes a communication unit 1523, a controller 1524, a storage 1525, a first display driver 1526, and a second display driver 1527.

The input unit 1521 receives input of a user command and transmits an input signal to the drive module 1500. The input unit 1521 may operate in at least one of a button mode and a touch mode.

Examples of the command input to the input unit 1521 include a power on/off command, an operation command, etc.

The detector 1522 detects an illumination level of the display device and generates and transmits a signal corresponding to the detected illumination level to the drive module 1500.

The drive module 1500 controls operations of the first display unit 1200 and the second display unit 1300 based on a command input to the input unit 1521 and information transmitted to the communication unit 1523.

The communication unit 1523 performs at least one of wired communication and wireless communication.

The communication unit 1523 may receive various types of content information from an external device (not shown) through Internet protocol communication, and transmit information stored in the storage 1525 to the outside of the storage 1525.

When an operation command is input to the input unit 1521 or to the communication unit 1523, the controller 1524 controls execution of the operation command.

When an image display command is input to the input unit 1521 or to the communication unit 1523, the controller 1524 determines the type of image to be displayed, determines whether the type of image includes a video image, controls operation of the first display unit 1200 upon determining that the type of image includes the video image, and controls operation of the second display unit 1300 upon determining that the command input to the input unit 1521 is a text display command or a command to display the still image only.

Here, the first display unit 1200 displays at least one of a still image, a text image, and a video image, and the second display unit 1300 displays at least one of a still image and a text image.

The controller 1524 compares the illumination level detected by the detector 1522 to a reference illumination level, controls operation of the first display unit 1200 to display an image if the detected illumination level is less than the reference illumination level, and controls operation of the second display unit 1300 to display the image if the detected illumination level is equal to or greater than the reference illumination level.

If the type of image to be displayed is a text image or a still image, the controller 1524 may control on/off operation of the first display unit 1200 based on the detected illumination level.

If the type of image to be displayed is a video image, the controller 1524 may adjust opacity of the second display unit 1300 based on the detected illumination level.

The storage 1525 stores the reference illumination level, APP information, and content information.

The first display driver 1526 drives the first display unit 1200 to display an image based on a command of the controller 1524. In this example, the image displayed on the first display unit 1200 includes at least one of a still image, a text image, and a video image.

The second display driver 1527 drives the second display unit 1300 to display an image based on a command of the controller 1524. In this example, the image displayed on the second display unit 1300 includes at least one of a still image and a text image.

Figure 36:
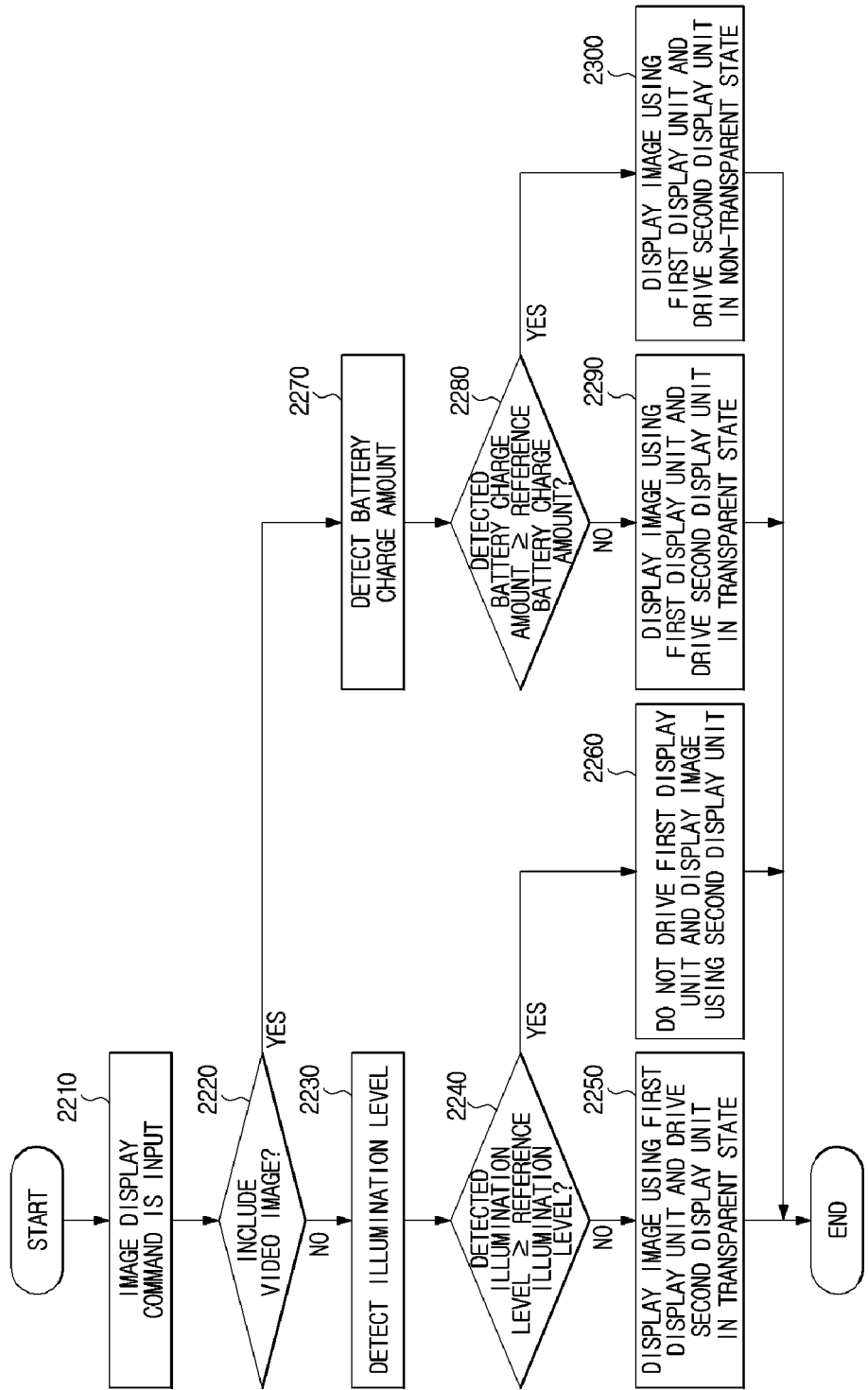
FIG. 36 is a flowchart of a method for controlling the display device illustrated in FIG. 35, according to an embodiment.

FIG. 36 is a flowchart of a method for controlling the display device shown in FIG. 35, according to an embodiment.

When the display device is powered on, and an operation command is input to the input unit or to the communication unit, the display device executes the operation command.

Here, the operation command includes a function execute command such as real-time location check, Internet, music listening, time, temperature check, voice message, text message, video recording, and the like, and a content execute command.

The display device drives any one of the first display unit 1200 and the second display unit 1300 to display an image related to the operation command and guides light of the image displayed on the display unit in operation to the user's eyes.

More specifically, when the operation command is input, the display device determines that the command to display an image is input (2210), determines the type of image to be displayed based on the operation command, and determines whether a video image is included in the determined type of image (2220).

Upon determining that the type of image to be displayed does not include a video image but includes a still image only, the display device controls operation of the detector to detect a current illumination level (2230) and compares the detected illumination level to a reference illumination level.

In this example, the display device determines whether the detected illumination level is equal to or greater than the reference illumination level (2240).

Upon determining that the detected illumination level is less than the reference illumination level, the display device drives the first display unit 1200 to display a still image. In this example, the second display unit 1300 is driven in a transparent state (2250).

As described above, the display device drives the second display unit 1300 in a transparent state, and thus external light is transmitted to the light guide unit to be guided to the user's eyes.

Here, since an amount of external light is insufficient to operate the second display unit 1300, the image is displayed using the first display unit 1200.

The still image includes a still picture, an advertisement image, a text image, etc.

Alternatively, the determining of whether or not the type of image includes a still image only includes determining whether a command input to the input unit 1521 includes a command to execute an APP to input/output text such as news, articles, or notes, determining whether a command to display photos is input, and determining whether the type of content is still image content.

Otherwise, if the type of image to be displayed includes a still image only and the detected illumination level is less than the reference illumination level, the display device does not drive the first display unit 1200, and displays the image on the second display unit 1300 (2260).

In this example, light of the image displayed on the second display unit 1300 of the display device passes through the light guide unit and then the light is transmitted to the user's eyes.

Upon determining that the type of image to be displayed includes a video image, the display device displays the image on the first display unit 1200.

In this example, the light of the video image displayed on the first display unit 1200 is reflected by the light guide unit 1400 to be guided to the user's eyes.

Alternatively, the display device may control the second display unit 1300 in a transparent state or a non-transparent state based on the illumination level.

More specifically, upon determining that the type of image to be displayed includes a video image, the display device detects the illumination level (2270) and compares the detected illumination level to the reference illumination level. In this example, the display device determines whether the detected illumination level is equal to or greater than the reference illumination level (2280).

Upon determining that the detected illumination level is less than the reference illumination level, the display device drives the first display unit 1200 to display the video image and drives the second display unit 1300 in a transparent state (2290).

Otherwise, if the detected illumination level is equal to or greater than the reference illumination level, the display device drives the first display unit 1200 to display the video image and drives the second display unit 1300 in a non-transparent state (2300) to block external light which is incident inside the light guide unit.

As such, the display device may improve resolution of the video image displayed on the first display unit 1200.

The display device may adjust opacity of the second display unit 1200 based on the detected illumination level if the detected illumination level is equal to or greater than the reference illumination level.

That is, the display device checks a difference between the detected illumination level and the reference illumination level, sets the opacity of the second display unit 1300 higher as the checked difference is increased, and thus drives an amount of external light blocked by the second display unit 1300 to increase as a current illumination level is increased.

As such, the display device drives the amount of external light incident on the light guide unit to reduce as the illumination level is increased, and thus reduces effects on the light of the image displayed on the first display unit 1200 by the external light and increases resolution of the image.

Alternatively, when the image is displayed on the first display unit 1200, the display device may preset the second display unit 1300 to be driven in a non-transparent mode.

Figure 37:
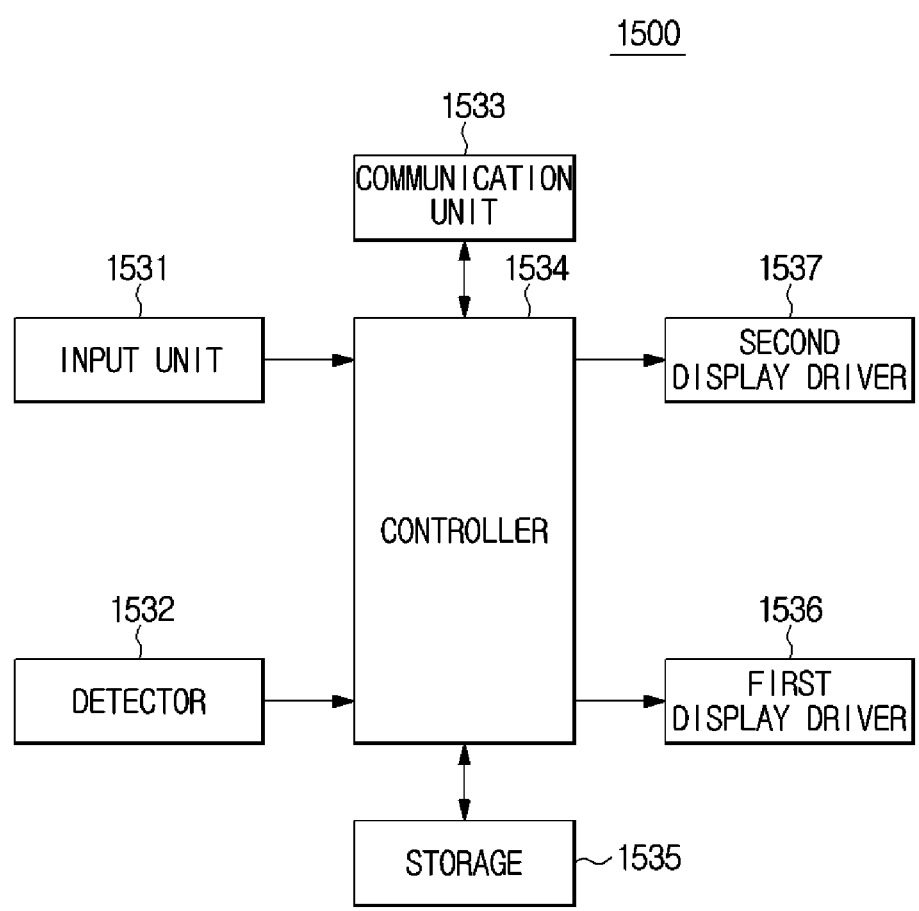
FIG. 37 is a block diagram showing control of the display device, according to an embodiment.

FIG. 37 is a block diagram showing control of the display device, according to an embodiment. The display device is applicable to a display device having a projective first display unit and a reflective second display unit, such as the display device illustrated in FIG. 27, the display device illustrated in FIG. 31, and the display device illustrated in FIG. 32.

The display device includes a drive module 1500 to drive the first display unit 1200 and the second display unit 1300 based on a command input to an input unit 1531 and detection information detected by a detector 1532. The drive module 1500 includes a communication unit 1533, a controller 1534, a storage 1535, a first display driver 1536, and a second display driver 1537.

The input unit 1531 receives input of a user command and transmits an input signal to the drive module 1500. The input unit 1521 may operate in at least one of a button mode and a touch mode.

Examples of the command input to the input unit 1531 include a power on/off command, an operation command, etc.

Alternatively, the input unit 1531 may receive input of a power saving mode from the user.

The detector 1532 detects a charge amount of a battery. The detector 1532 includes a voltage detector to detect a voltage of the battery and detect a remaining charge amount of the battery.

The detector 1532 may further include an illumination level detector to detect an external illumination level.

The drive module 1500 controls operations of the first display unit 1200 and the second display unit 1300 based on a command input to the input unit 1531 and information transmitted to the communication unit 1533.

The communication unit 1533 performs at least one of wired communication and wireless communication.

The communication unit 1533 may receive various types of content information from an external device (not shown) through Internet protocol communication, and transmit information stored in the storage 1535 to the outside of the storage 1535.

When an operation command is input to the input unit 1531 or to the communication unit 1533, the controller 1534 controls execution of the operation command.

The controller 1534 controls operations of the first display unit 1200 and the second display unit 1300 based on at least one of the detected illumination level and the detected charge amount of the battery.

More specifically, when an image display command is input to the input unit 1531 or to the communication unit 1533, the controller 1534 compares the charge amount of the battery detected by the detector 1532 to the reference battery charge amount, controls operation of the second display unit 1300 to display the image if the detected charge amount of the battery is less than the reference battery charge amount, and controls operation of the first display unit 1200 to display the image if the detected charge amount of the battery is equal to or greater than the reference battery charge amount.

When an image display command is input to the input unit 1531 or to the communication unit 1533, the controller 1534 determines the type of image to be displayed, determines whether the type of image includes a video image, controls operation of the first display unit 1200 upon determining that the type of image includes the video image, and controls operation of the second display unit 1300 upon determining that the command input to the input unit 1521 includes a text image or a still image. The controller 1534 compares the charge amount of the battery detected by the detector 1532 to the reference battery charge amount to control switching of a display of the first display unit 1200.

Here, the first display unit 1200 displays at least one of a still image, a text image, and a video image, and the second display unit 1300 displays at least one of a still image and a text image.

The controller 1534 compares the charge amount of the battery detected by the detector 1532 to the reference battery charge amount, controls operation of the second display unit 1300 to display an image if the detected charge amount of the battery is less than the reference battery charge amount, controls operation of the first display unit 1200 to display the image if the detected charge amount of the battery is equal to or greater than the reference battery charge amount. The controller 1534 compares the charge amount of the battery detected by the detector 1532 to the reference battery charge amount to control opacity of the second display unit 1300.

The storage 1535 stores the reference battery charge amount and the reference illumination level, APP information, and content information.

The first display driver 1536 drives the first display unit 1200 to display the image based on a command of the controller 1534. In this example, the image displayed on the first display unit 1200 includes at least one of a still image, a text image, and a video image.

The second display driver 1537 drives the second display unit 1300 to display the image based on a command of the controller 1534. In this example, the image displayed on the second display unit 1300 includes at least one of a still image and a text image.

Figure 38:
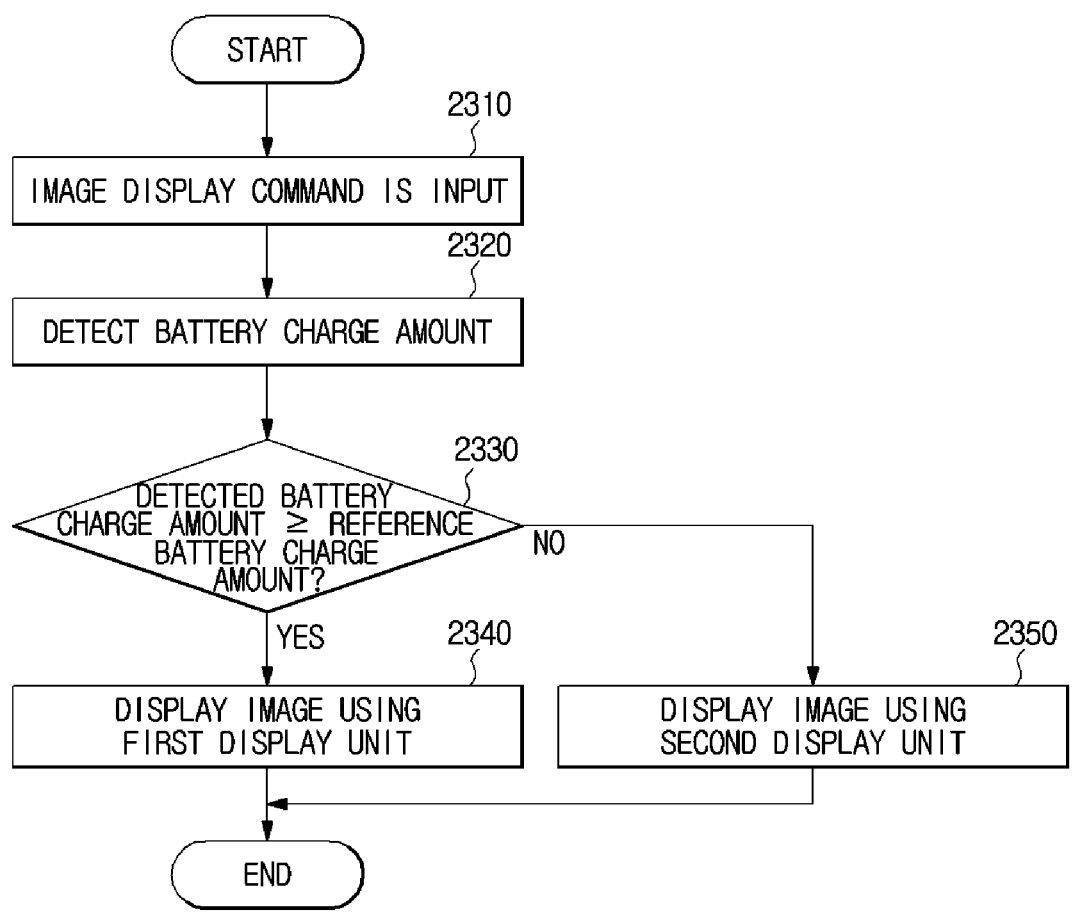
FIGS. 38 to 40 are flowcharts of methods for controlling the display device illustrated in FIG. 37, according to an embodiment.

FIG. 38 is a flowchart of a method for controlling the display device shown in FIG. 37, according to an embodiment.

When the display device is powered on, and an operation command is input to the input unit or to the communication unit, the display device executes the operation command.

Here, the operation command includes a function execute command such as real-time location check, Internet, music listening, time, temperature check, voice message, text message, video recording, and the like, and a content execute command.

The display device drives any one of the first display unit 1200 and the second display unit 1300 to display an image related to the operation command and guides light of the image displayed on the display unit in operation to the user's eyes.

More specifically, when the operation command is input, the display device determines that the command to display an image is input (2310), controls operation of the detector 1532 to detect a current charge amount of the battery (2320), and compares the detected charge amount of the battery to the reference battery charge amount (2320).

In this example, the display device determines whether the detected charge amount of the battery is equal to or greater than the reference battery charge amount (2330).

If the detected charge amount of the battery is equal to or greater than the reference battery charge amount, the display device displays the image on the first display unit 1200 (2340).

The display device drives the second display unit 1300 in a transparent state or a non-transparent state.

That is, the display device of FIG. 31 may drive the second display unit in a transparent state and the display devices of FIGS. 27 and 32 may drive the second display unit in a transparent state or a non-transparent state.

In this example, light of the image displayed on the first display unit 1200 is moved along a guidance path of the light guide unit and then the light is transmitted to the user's eyes.

Otherwise, if the detected charge amount of the battery is less than the reference battery charge amount, the display device does not drive the first display unit 1200 and drives the second display unit 1300 to display the image (2350).

In this example, the light of the image displayed on the second display unit 1300 passes through the light guide unit and then the light is transmitted to the user's eyes.

Figure 39:
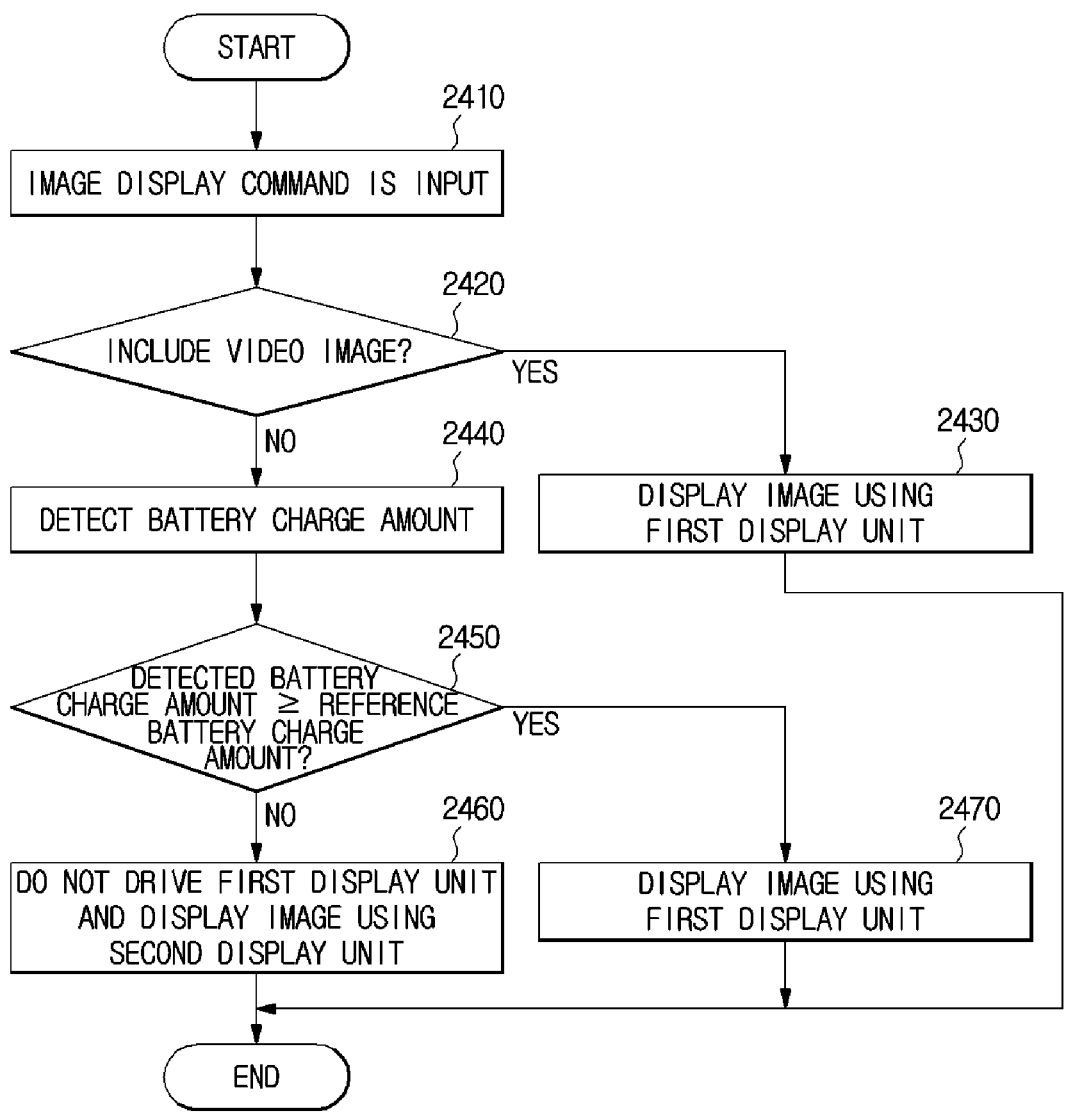

FIG. 39 is a flowchart of another method for controlling the display device shown in FIG. 37, according to an embodiment.

When the display device is powered on, and an operation command is input to the input unit or to the communication unit, the display device executes the operation command.

The display device drives any one of the first display unit 1200 and the second display unit 1300 to display an image related to the operation command and guides light of the image displayed on the display unit in operation to the user's eyes.

More specifically, when an operation command is input, the display device determines that the command to display an image is input (2410), determines the type of image to be displayed, and determines whether the video image is included in the determined type of image (2420).

Upon determining that the type of image to be displayed includes a video image, the display device drives the first display unit 1200 to display the video image (2430) and drives the second display unit 1300 in a transparent state or a non-transparent state.

That is, the display device of FIG. 31 drives the second display unit 1300 in a transparent state and the display devices of FIGS. 27 and 32 may drive the second display unit 1300 in a transparent state or a non-transparent state.

In this example, light of the video image displayed on the first display unit 1200 is reflected by the light guide unit 1400 to move to the user's eyes.

Otherwise, upon determining that the type of image to be displayed does not include a video image but includes a still image only, the display device controls operation of the detector 1532 to detect a current charge amount of the battery (2440) and compares the detected charge amount of the battery to the reference battery charge amount. In this example, the display device determines whether the detected charge amount of the battery is equal to or greater than the reference battery charge amount (2450).

If the detected charge amount of the battery is less than the reference battery charge amount, the display device does not drive the first display unit 1200 and drives the second display unit 1300 to display a still image (2460).

In this example, light of the image displayed on the second display unit 1300 passes through the light guide unit and then the light is transmitted to the user's eyes.

Otherwise, if the detected charge amount of the battery is equal to or greater than the reference battery charge amount, the display device displays the still image on the first display unit 1200 (2470).

In this example, light of the still image displayed on the first display unit 1200 is reflected by the light guide unit 1400 to move to the user's eyes.

As described above, when the still image is displayed, the display device may execute a power saving mode based on the charge amount of the battery.

Figure 40:
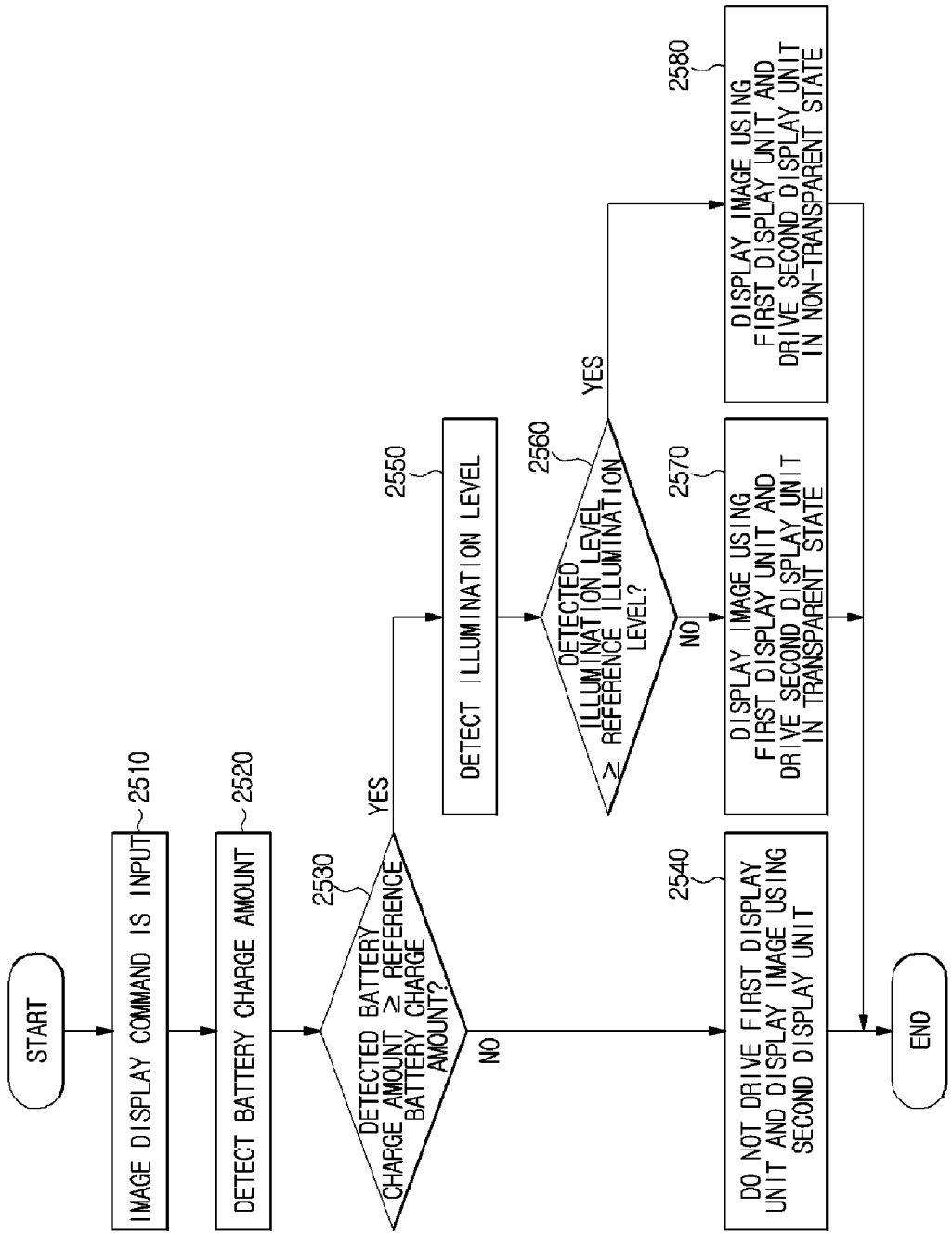

FIG. 40 is a flowchart of a further method for controlling the display device shown in FIG. 37, according to an embodiment.

When the display device is powered on, and an operation command is input to the input unit or to the communication unit, the display device executes the operation command.

The display device drives any one of the first display unit 1200 and the second display unit 1300 to display an image related to the operation command and guides light of the image displayed on the display unit in operation to the user's eyes.

More specifically, the display device determines that the command to display an image is input (2510), controls operation of the detector 1532 to detect a current charge amount of the battery (2520), and compares the detected charge amount of the battery to the reference battery charge amount. In this example, the display device determines whether the detected charge amount of the battery is equal to or greater than the reference battery charge amount (2530).

If the detected charge amount of the battery is less than the reference battery charge amount, the display device does not drive the first display unit 1200 and drives the second display unit 1300 to display a still image (2540).

In this example, light of the image displayed on the second display unit 1300 passes through the light guide unit and then the light is transmitted to the user's eyes.

Otherwise, if the detected charge amount of the battery is equal to or greater than the reference battery charge amount, the display device controls operation of the detector 1532 to detect a current illumination level (2550) and compares the detected illumination level to a reference illumination level.

In this example, the display device determines whether the detected illumination level is equal to or greater than the reference illumination level (2560).

If the detected illumination level is less than the reference illumination level, the display device drives the first display unit 1200 to display the image and drives the second display unit 1300 in a transparent state (2570).

As described above, the display device drives the second display unit 1300 in a transparent state and thus external light is transmitted to the light guide unit 1400 to be guided to the user's eyes.

Otherwise, if the detected charge amount of the battery is equal to or greater than the reference battery charge amount and the detected illumination level is equal to or greater than the reference illumination level, the display device drives the first display unit 1200 to display the image and drives the second display unit 1300 in a non-transparent state (2580).

In this example, light of the image displayed on the first display unit 1200 of the display device passes through the light guide unit and then the light is transmitted to the user's eyes.

Alternatively, if the detected illumination level is equal to or greater than the reference illumination level, the display device may adjust opacity of the second display unit 1300 based on the detected illumination level.

That is, the display device checks a difference between the detected illumination level and the reference illumination level, sets the opacity of the second display unit 1300 higher as the checked difference is increased, and thus drives an amount of external light blocked by the second display unit 1300 to increase as a current illumination level is increased.

As such, the display device drives the amount of external light incident on the light guide unit to reduce as the illumination level is increased and thus reduces effects on the light of the image displayed on the first display unit by the external light and increases resolution of the image.

As described above, the display device may reduce power consumption by displaying the image through the second display unit having a reflective display panel based on the illumination level. Further, the display device may minimize power consumption by displaying the image on the second display unit in a power saving mode if the charge amount of the battery is less than the reference battery charge amount.

As is apparent from the above description, since a display device according to an embodiment operates as a reflective display device which uses external light without separate power supply at an illumination level equal to or greater than a certain illumination level, and operates as a transmissive display device which uses internal light at an illumination level less than the certain illumination level, a clear image may be provided in an outdoor environment and a dark indoor environment. Since a display mode is automatically switchable according to the illumination level as described above, power consumption may be minimized.

Furthermore, since a first display panel or a second display panel operates depending on the type of content, power consumption may be reduced when a still image is displayed, and response time and resolution may be increased when a video image is displayed.

That is, power consumption may be minimized by implementing an image memory function without applying a voltage using cholesteric liquid crystals of the second display panel which is a reflective display panel.

In addition, since the second display panel is formed using two substrates and one liquid crystal layer only, a material cost to manufacture the liquid crystal layer may be reduced, a process may be simplified, and energy consumption may be reduced to drive one layer. Furthermore, the liquid crystal layer may be manufactured with a small thickness and thus a flexible display device may be achieved.

Besides, since liquid crystals are not stacked in multiple layers nor is an intermediate film used, transmittance may be improved and parallax generated due to a large thickness may be solved.

As is apparent from the above description, since a display device according to an embodiment operates as a reflective display device which uses external light without a separate power supply at an illumination level equal to or greater than a certain illumination level, and operates as a projective display device which uses internal light at an illumination level less than the certain illumination level, a clear image may be provided in an outdoor environment and a dark indoor environment. Since a display mode is automatically switchable according to the illumination level as described above, power consumption may be minimized.

Furthermore, since a reflective display panel operates in a power saving mode and a projective display device operates in a normal mode, an image may be displayed with low power.

Furthermore, since a reflective display panel or a projective display panel operates depending on the type of content, power consumption may be reduced when a still image is displayed, and response time and resolution may be increased when a video image is displayed.

As such, the display device is applicable to various IT devices which require a high level of transmittance.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A display device comprising:
a light source;
a detector to detect an illumination level;
a projective display configured to display a first image;
a reflective display configured to display a second image by reflecting external light; and
a controller to:
receive an image display command;
determine whether the image display command is a video image display command or a still image display command,
control the projective display to display a video image if the image display command is the video image display command,
control the reflective display to display a still image by reflecting external light if the image display command is the still image display command and the detected illumination level is equal to or greater than a reference illumination level,
turn on the light source if the image display command is the still image display command and the detected illumination level is less than the reference illumination level, and
control the reflective display to display the still image by reflecting light of the light source.

2. The display device according to claim 1, further comprising an input to receive a command of a user,
wherein the controller controls the reflective display to place the reflective display in a transparent state and controls the projective display to display the still image based on the received command if the image display command is the still image display command and the detected illumination level is less than the reference illumination level.

3. The display device according to claim 2, wherein the still image comprises one or any combination of a photograph and a text image.

4. The display device according to claim 1, further comprising:
a battery to supply power to the projective display and the reflective display, and
a detector to detect a charge amount of the battery,
wherein the controller compares the charge amount of the battery to a reference battery charge amount and the controller controls the reflective display to display the still image while the detected charge amount of the battery is less than the reference battery charge amount.

5. The display device according to claim 1, further comprising a glasses-shaped body,
wherein the projective display is included in the body, and the reflective display is included in the body and installed to be separated from the projective display.

6. The display device according to claim 1, wherein:
the projective display comprises a micro display panel and the reflective display comprises a reflective display panel, and
the micro display panel is disposed adjacent to the reflective display panel.

7. The display device according to claim 1, wherein the controller applies a voltage to the reflective display to display the still image and cuts off the voltage applied to the reflective display after a certain period of time has elapsed to stop the display of the still image.

8. A display device comprising:
a glasses-shaped body;
a projective display included in the glass-shaped body and configured to display a video image;
a light guide disposed adjacent to the projective display, the light guide configured to guide light of the video image displayed on the projective display to one or two eyes of the user;
a reflective display disposed adjacent to the light guide and configured to display a still image by reflecting external light; and
a controller to:
determine whether an image display command is a video image display command or a still image display command,
control the projective display to display the video image if the image display command is a video image display command, and
control the reflective display to display the still image if the image display command is the still image display command.

9. The display device according to claim 8, wherein the projective display comprises a light source and an optical device to generate the video image based on the light source and an image signal.

10. A display device comprising:
a projective display configured to display at least one of a video image and a still image;
a reflective display configured to display the still image by reflecting external light;
a detector to detect an illumination level; and
a controller to:
compare the illumination level detected by the detector to a reference illumination level,
control the projective display to display at least one of the video image and the still image while the detected illumination level is less than the reference illumination level, and
control the reflective display to display the still image and control the projective display to display the video image while the detected illumination level is equal to or greater than the reference illumination level.

11. The display device according to claim 10, wherein the controller controls the reflective display to place the reflective display in a transparent state while the detected illumination level is less than the reference illumination level.

12. The display device according to claim 10, wherein the controller controls the projective display to prevent the projective display from being driven while the detected illumination level is equal to or greater than the reference illumination level, when only the still image is displayed.

13. A display device comprising:
a mountable body configured to be mounted on a head of a user;
a projective display including in the mountable body and the projective display configured to display a first image;
a reflective display included in the mountable body and separated from the projective display in the mountable body, and the reflective display configured to display a second image by reflecting external light;
a battery to supply a driving power to the projective display and the reflective display;
a detector to detect a charge amount of the battery; and
a controller to:
  compare the charge amount of the battery to a reference battery charge amount,
  control the reflective display to display the second image while the detected charge amount of the battery is less than the reference battery charge amount, and
  control the projective display to display the second image while the detected charge amount of the battery is equal to or greater than the reference battery charge amount.

* * * * *